(12) United States Patent
Khoshnevisan et al.

(10) Patent No.: US 11,974,284 B2
(45) Date of Patent: Apr. 30, 2024

(54) HANDLING OF NON-NUMERIC DATA TO FLOW CONTROL FEEDBACK TIMING

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/243,553

(22) Filed: Apr. 28, 2021

(65) Prior Publication Data

US 2021/0345382 A1    Nov. 4, 2021

Related U.S. Application Data

(60) Provisional application No. 63/019,197, filed on May 1, 2020.

(51) Int. Cl.
*H04W 72/21* (2023.01)
*H04W 28/10* (2009.01)
*H04W 72/23* (2023.01)

(52) U.S. Cl.
CPC .......... *H04W 72/21* (2023.01); *H04W 72/23* (2023.01); *H04W 28/10* (2013.01)

(58) Field of Classification Search
None
See application file for complete search history.

(56) References Cited

U.S. PATENT DOCUMENTS

| | | | | |
|---|---|---|---|---|
| 2017/0285177 | A1* | 10/2017 | Jin | H04L 67/104 |
| 2018/0212720 | A1* | 7/2018 | Kim | H04L 1/1893 |
| 2019/0020987 | A1* | 1/2019 | Khoryaev | H04W 76/14 |
| 2019/0116490 | A1* | 4/2019 | Chang | H04W 72/1268 |

(Continued)

OTHER PUBLICATIONS

International Search Report and Written Opinion—PCT/US2021/030019—ISA/EPO—dated Jul. 26, 2021 (204160WO).

(Continued)

*Primary Examiner* — Phirin Sam
(74) *Attorney, Agent, or Firm* — QUALCOMM Incorporated

(57) ABSTRACT

Methods, systems, and devices for wireless communication are described. Generally, the described techniques provide for efficiently scheduling downlink data transmissions and flow control feedback for the downlink data transmissions to allow for efficient pipelining at a user equipment (UE). In one aspect, a UE and a base station may follow preconfigured rules for facilitating downlink data transmissions while avoiding confusion (e.g., confusion due to being scheduled to report flow control feedback for downlink data transmissions in a different order from which the downlink data transmissions are received). In another aspect, the UE may be configured to report flow control feedback for a downlink data transmission in a next uplink control channel to avoid confusion (e.g., in the event that the UE misses downlink control information (DCI) used to indicate the timing for reporting flow control feedback for a downlink data transmission).

30 Claims, 31 Drawing Sheets

(56) References Cited

U.S. PATENT DOCUMENTS

| | | | | |
|---|---|---|---|---|
| 2019/0149305 A1* | 5/2019 | Zhou | .................... | H04L 5/0023 370/330 |
| 2019/0208444 A1* | 7/2019 | Wigren | ................ | H04W 28/10 |
| 2020/0389878 A1* | 12/2020 | Karaki | ...................... | H04L 5/14 |
| 2021/0337536 A1* | 10/2021 | Li | ........................ | H04W 72/569 |
| 2021/0345373 A1* | 11/2021 | Li | ........................ | H04L 5/0053 |
| 2022/0007399 A1* | 1/2022 | Rastegardoost | ...... | H04L 1/1854 |
| 2022/0078823 A1* | 3/2022 | Li | .................... | H04W 72/1268 |
| 2022/0124720 A1* | 4/2022 | Novlan | ................ | H04W 72/23 |
| 2022/0183104 A1* | 6/2022 | Babaei | ................ | H04L 5/0094 |
| 2022/0225369 A1* | 7/2022 | Park | ...................... | H04W 72/23 |
| 2022/0353853 A1* | 11/2022 | Wu | ...................... | H04W 72/23 |
| 2023/0011110 A1* | 1/2023 | Shi | .................... | H04W 72/1273 |
| 2023/0075364 A1* | 3/2023 | Zhou | .................... | H04L 1/1822 |

OTHER PUBLICATIONS

Qualcomm Incorporated: "Enhancements to Scheduling and HARQ Operation for Nr-U", 3GPP TSG RAN WG1 Meeting #98bis, 3GPP Draft, R1-1911099 7.2.2.2.3 Enhancements To Scheduling and Harq Operation for NR-U, 3rd Generation Partnership Project (3GPP), Mobile Competence Centre, 650, Route Des Lucioles, F-06921 Sophia-, vol. RAN WG1, No. Chongqing, CN, Oct. 14, 2019-Oct. 20, 2019, 17 Pages, Oct. 5, 2019 (Oct. 5, 2019), XP051808838, Retrieved from the Internet: URL: https://ftp.3gpp.org/tsg_ran/WG1_RL1/TSGR1_98b/Docs/R1-1911099.zip R1-19110997.2.2.2.3 Enhancements to Scheduling and HARQ Operation for NR-U.docx [retrieved on Oct. 5, 2019] Section 2.3—Handling non-numeric value of K1, pp. 7, 8, figure 8.

Qualcomm Incorporated: "TP for Enhancements to Scheduling and HARQ Operation for NR-U", 3GPP Draft, 3GPP TSG RAN WG1 Meeting #100bis-e, R1-2002532, 3rd Generation Partnership Project (3GPP), Mobile Competence Centre, 650, Route Des Lucioles, F-06921, Sophia-Antipolis Cedex, France, vol. RAN WG1. No. Online Meeting, Apr. 20, 2020-Apr. 30, 2020, Apr. 11, 2020 (Apr. 11, 2020), XP051875646, 8 Pages, Retrieved from the Internet: URL: https://ftp.3gpp.org/tsg_ran/WG1_RL1/TSGR1_100b_e/Docs/R1-2002532.zip R1-20025327.2.2.2.3 TP for Enhancements to Scheduling and HARQ Operation for NR-U.docx [retrieved on Apr. 11, 2020] p. 1-p. 2, Section 4—Non-numeric K1 for SPS, p. 7, figures 3, 4.

* cited by examiner

HANDLING OF NON-NUMERIC DATA TO FLOW CONTROL FEEDBACK TIMING

CROSS REFERENCE

The present application for patent claims the benefit of U.S. Provisional Patent Application No. 63/019,197 by Khoshnevisan et al., entitled "HANDLING OF NON-NUMERIC DATA TO FLOW CONTROL FEEDBACK TIMING," filed May 1, 2020, assigned to the assignee hereof, and expressly incorporated by reference herein.

FIELD OF TECHNOLOGY

The following relates generally to wireless communications and more specifically to handling of non-numeric data to flow control feedback timing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may transmit downlink data to a UE, and the UE may be configured to report flow control feedback (e.g., hybrid automatic repeat request (HARQ) feedback) for the downlink data. Improved techniques at a UE for receiving downlink data and reporting flow control feedback for the downlink data and at a base station for transmitting downlink data and receiving flow control feedback for the downlink data may be desirable.

SUMMARY

The present disclosure relates to methods, systems, devices, and apparatuses that support handling of non-numeric data to flow control feedback timing. Generally, the described techniques provide for efficiently scheduling downlink data transmissions and flow control feedback for the downlink data transmissions to allow for efficient pipelining at a user equipment (UE). In one aspect, a UE and a base station may follow preconfigured rules for facilitating downlink data transmissions while avoiding confusion at the UE and the base station (e.g., confusion due to being scheduled to report flow control feedback for downlink data transmissions in a different order from which the downlink data transmissions are received). In another aspect, the UE may be configured to report flow control feedback for a downlink data transmission in a next uplink control channel to avoid confusion at the UE and the base station (e.g., in the event that the UE misses downlink control information used to indicate the timing for reporting flow control feedback for a downlink data transmission).

A method for wireless communication implemented by a UE is described. The method may include receiving, from a base station, first downlink control information scheduling a first downlink data transmission, the first downlink control information indicating a non-numeric data-to-flow control feedback timing, receiving, from the base station, second downlink control information scheduling a second downlink data transmission, the second downlink control information indicating a numeric data-to-flow control feedback timing, identifying resources of a first uplink channel allocated for flow control feedback for a semi-persistent scheduling downlink data transmission, and managing flow control feedback for the first downlink data transmission based on a second uplink channel corresponding to the numeric data-to-flow control feedback timing and the first uplink channel.

An apparatus for wireless communication implemented by a UE is described. The apparatus may include a processor, memory coupled with the processor, and instructions stored in the memory. The instructions may be executable by the processor to cause the apparatus to receive, from a base station, first downlink control information scheduling a first downlink data transmission, the first downlink control information indicating a non-numeric data-to-flow control feedback timing, receive, from the base station, second downlink control information scheduling a second downlink data transmission, the second downlink control information indicating a numeric data-to-flow control feedback timing, identify resources of a first uplink channel allocated for flow control feedback for a semi-persistent scheduling downlink data transmission, and manage flow control feedback for the first downlink data transmission based on a second uplink channel corresponding to the numeric data-to-flow control feedback timing and the first uplink channel.

Another apparatus for wireless communication implemented by a UE is described. The apparatus may include means for receiving, from a base station, first downlink control information scheduling a first downlink data transmission, the first downlink control information indicating a non-numeric data-to-flow control feedback timing, means for receiving, from the base station, second downlink control information scheduling a second downlink data transmission, the second downlink control information indicating a numeric data-to-flow control feedback timing, means for identifying resources of a first uplink channel allocated for flow control feedback for a semi-persistent scheduling downlink data transmission, and means for managing flow control feedback for the first downlink data transmission based on a second uplink channel corresponding to the numeric data-to-flow control feedback timing and the first uplink channel.

A non-transitory computer-readable medium storing code for wireless communication implemented by a UE is described. The code may include instructions executable by a processor to receive, from a base station, first downlink control information scheduling a first downlink data transmission, the first downlink control information indicating a non-numeric data-to-flow control feedback timing, receive, from the base station, second downlink control information scheduling a second downlink data transmission, the second downlink control information indicating a numeric data-to-flow control feedback timing, identify resources of a first uplink channel allocated for flow control feedback for a semi-persistent scheduling downlink data transmission, and manage flow control feedback for the first downlink data transmission based on a second uplink channel corresponding to the numeric data-to-flow control feedback timing and the first uplink channel.

In some examples of the method, apparatuses, and non-transitory computer-readable medium described herein, the managing the flow control feedback for the first downlink data transmission may include operations, features, means, or instructions for multiplexing the flow control feedback for the first downlink data transmission with flow control feedback for the second downlink data transmission in resources of the second uplink channel based on the second uplink channel occurring at a same time as or before the first uplink channel.

In some examples of the method, apparatuses, and non-transitory computer-readable medium described herein, a time between the first downlink data transmission and the second uplink channel may be greater than or equal to a duration of time configured for processing the first downlink data transmission.

In some examples of the method, apparatuses, and non-transitory computer-readable medium described herein, the managing the flow control feedback for the first downlink data transmission may include operations, features, means, or instructions for determining not to multiplex the flow control feedback for the first downlink data transmission with flow control feedback for the second downlink data transmission in resources of the second uplink channel based on the second uplink channel occurring after the first uplink channel.

In some examples of the method, apparatuses, and non-transitory computer-readable medium described herein, the managing the flow control feedback for the first downlink data transmission may include operations, features, means, or instructions for discarding the flow control feedback for the first downlink data transmission based on the second uplink channel occurring after the first uplink channel.

Some examples of the method, apparatuses, and non-transitory computer-readable medium described herein may further include operations, features, means, or instructions for reporting a negative acknowledgment for the first downlink data transmission in an uplink channel different from the second uplink channel based on the discarding the flow control feedback for the first downlink data transmission.

In some examples of the method, apparatuses, and non-transitory computer-readable medium described herein, the second downlink control information may be received in a downlink control channel monitoring occasion after the first downlink control information.

Some examples of the method, apparatuses, and non-transitory computer-readable medium described herein may further include operations, features, means, or instructions for receiving the first downlink data transmission prior to the second downlink data transmission.

Some examples of the method, apparatuses, and non-transitory computer-readable medium described herein may further include operations, features, means, or instructions for receiving the first downlink data transmission prior to the semi-persistent scheduling downlink data transmission.

Some examples of the method, apparatuses, and non-transitory computer-readable medium described herein may further include operations, features, means, or instructions for receiving third downlink control information activating semi-persistent scheduling downlink data transmissions including the semi-persistent scheduling downlink data transmission from the base station.

Some examples of the method, apparatuses, and non-transitory computer-readable medium described herein may further include operations, features, means, or instructions for receiving a control message indicating that the non-numeric data-to-flow control feedback timing may be configured in a set of data-to-flow control feedback timings for downlink data transmissions from the base station to the UE.

In some examples of the method, apparatuses, and non-transitory computer-readable medium described herein, the control message may be a radio resource control (RRC) message including the set of data-to-flow control feedback timings.

In some examples of the method, apparatuses, and non-transitory computer-readable medium described herein, the second downlink control information indicates a downlink assignment index associated with a downlink data transmission group that may be a same downlink data transmission group as indicated by the first downlink control information and the managing the flow control feedback for the first downlink data transmission includes multiplexing the flow control feedback for the first downlink data transmission with flow control feedback for the second downlink data transmission in resources of the second uplink channel based on the downlink assignment index associated with the downlink data transmission group being the same downlink data transmission group as indicated by the first downlink control information.

In some examples of the method, apparatuses, and non-transitory computer-readable medium described herein, the managing the flow control feedback for the first downlink data transmission may include operations, features, means, or instructions for determining not to multiplex the flow control feedback for the first downlink data transmission in the second uplink channel based on the second uplink channel occurring within a duration of time configured for processing the first downlink data transmission.

In some examples of the method, apparatuses, and non-transitory computer-readable medium described herein, the managing the flow control feedback for the first downlink data transmission may include operations, features, means, or instructions for multiplexing the flow control feedback for the first downlink data transmission with flow control feedback for the semi-persistent scheduling downlink data transmission in the resources of the first uplink channel based on the second uplink channel occurring after the first uplink channel.

Some examples of the method, apparatuses, and non-transitory computer-readable medium described herein may further include operations, features, means, or instructions for receiving the first downlink data transmission and the second downlink data transmission in a first component carrier.

Some examples of the method, apparatuses, and non-transitory computer-readable medium described herein may further include operations, features, means, or instructions for receiving the first downlink data transmission in a first component carrier and receiving the second downlink data transmission in a second component carrier different from the first component carrier.

Some examples of the method, apparatuses, and non-transitory computer-readable medium described herein may further include operations, features, means, or instructions for receiving a configuration for a flow control feedback codebook, and where the managing the flow control feedback for the first downlink data transmission may be based on the configuration for the flow control feedback codebook.

In some examples of the method, apparatuses, and non-transitory computer-readable medium described herein, the flow control feedback codebook includes an enhanced dynamic flow control feedback codebook.

In some examples of the method, apparatuses, and non-transitory computer-readable medium described herein, the first uplink channel includes an uplink control channel, and the second uplink channel includes an uplink control channel or an uplink shared channel.

A method for wireless communication implemented by a base station is described. The method may include transmitting, to a UE, first downlink control information scheduling a first downlink data transmission, the first downlink control information indicating a non-numeric data-to-flow control feedback timing, transmitting, to the UE, second downlink control information scheduling a second downlink data transmission, the second downlink control information indicating a numeric data-to-flow control feedback timing, transmitting, to the UE, third downlink control information activating semi-persistent scheduling downlink data transmissions from the base station and indicating resources of a first uplink channel allocated for flow control feedback for a semi-persistent scheduling downlink data transmission of the semi-persistent scheduling downlink data transmissions, and receiving flow control feedback for the first downlink data transmission based on a second uplink channel corresponding to the numeric data-to-flow control feedback timing and the first uplink channel.

An apparatus for wireless communication implemented by a base station is described. The apparatus may include a processor, memory coupled with the processor, and instructions stored in the memory. The instructions may be executable by the processor to cause the apparatus to transmit, to a UE, first downlink control information scheduling a first downlink data transmission, the first downlink control information indicating a non-numeric data-to-flow control feedback timing, transmit, to the UE, second downlink control information scheduling a second downlink data transmission, the second downlink control information indicating a numeric data-to-flow control feedback timing, transmit, to the UE, third downlink control information activating semi-persistent scheduling downlink data transmissions from the base station and indicating resources of a first uplink channel allocated for flow control feedback for a semi-persistent scheduling downlink data transmission of the semi-persistent scheduling downlink data transmissions, and receive flow control feedback for the first downlink data transmission based on a second uplink channel corresponding to the numeric data-to-flow control feedback timing and the first uplink channel.

Another apparatus for wireless communication implemented by a base station is described. The apparatus may include means for transmitting, to a UE, first downlink control information scheduling a first downlink data transmission, the first downlink control information indicating a non-numeric data-to-flow control feedback timing, means for transmitting, to the UE, second downlink control information scheduling a second downlink data transmission, the second downlink control information indicating a numeric data-to-flow control feedback timing, means for transmitting, to the UE, third downlink control information activating semi-persistent scheduling downlink data transmissions from the base station and indicating resources of a first uplink channel allocated for flow control feedback for a semi-persistent scheduling downlink data transmission of the semi-persistent scheduling downlink data transmissions, and means for receiving flow control feedback for the first downlink data transmission based on a second uplink channel corresponding to the numeric data-to-flow control feedback timing and the first uplink channel.

A non-transitory computer-readable medium storing code for wireless communication implemented by a base station is described. The code may include instructions executable by a processor to transmit, to a UE, first downlink control information scheduling a first downlink data transmission, the first downlink control information indicating a non-numeric data-to-flow control feedback timing, transmit, to the UE, second downlink control information scheduling a second downlink data transmission, the second downlink control information indicating a numeric data-to-flow control feedback timing, transmit, to the UE, third downlink control information activating semi-persistent scheduling downlink data transmissions from the base station and indicating resources of a first uplink channel allocated for flow control feedback for a semi-persistent scheduling downlink data transmission of the semi-persistent scheduling downlink data transmissions, and receive flow control feedback for the first downlink data transmission based on a second uplink channel corresponding to the numeric data-to-flow control feedback timing and the first uplink channel.

In some examples of the method, apparatuses, and non-transitory computer-readable medium described herein, the second downlink control information may be transmitted in a downlink control channel monitoring occasion after the first downlink control information.

Some examples of the method, apparatuses, and non-transitory computer-readable medium described herein may further include operations, features, means, or instructions for transmitting, to the UE, a control message indicating that the non-numeric data-to-flow control feedback timing may be configured in a set of data-to-flow control feedback timings for downlink data transmissions from the base station to the UE.

Some examples of the method, apparatuses, and non-transitory computer-readable medium described herein may further include operations, features, means, or instructions for transmitting, to the UE, a configuration for a flow control feedback codebook, and where the managing the flow control feedback for the first downlink data transmission may be based on the configuration for the flow control feedback codebook.

DETAILED DESCRIPTION

Figure 1:
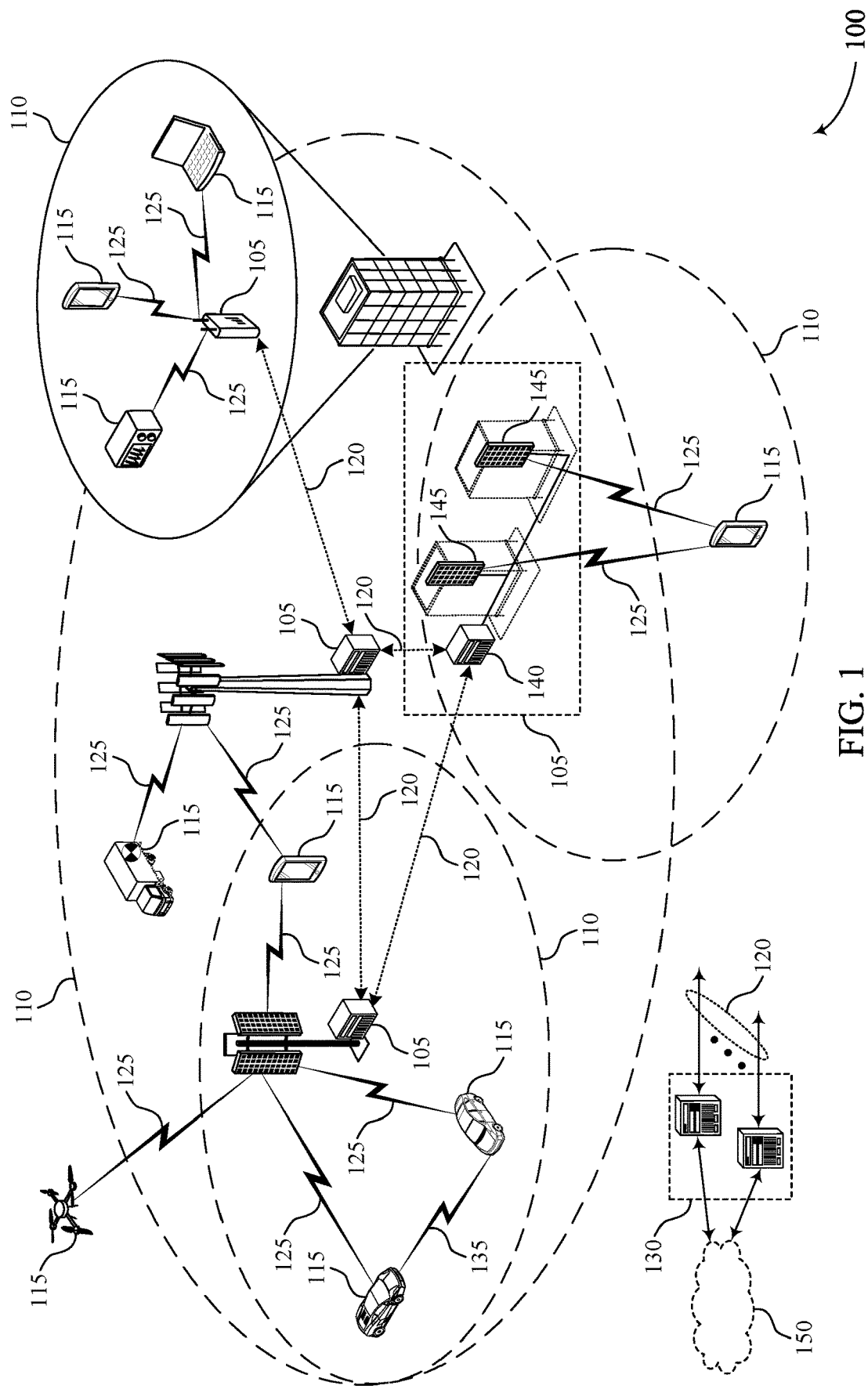
FIG. 1 illustrates a non-limiting implementation of a system for wireless communications that supports handling of non-numeric data to flow control feedback timing in accordance with aspects of the present disclosure.

In some wireless communications systems, a base station may transmit downlink data to a user equipment (UE) in multiple downlink data channels (e.g., multiple allocated resources of a downlink physical data channel). In some cases, the UE may be configured to report flow control feedback to the base station for one or more of the downlink data channels. The base station may use the flow control feedback for a downlink data channel to determine whether to schedule a retransmission of downlink data previously transmitted in the downlink data channel (e.g., if the UE failed to receive the downlink data). Additionally, when a UE is configured to report flow control feedback to a base station for downlink data in multiple downlink data channels, a wireless communications system may establish rules to prevent confusion at the UE or the base station.

In one aspect, if a UE is scheduled for a first downlink data transmission, the UE may not be expected to receive a second downlink data transmission before transmitting flow control feedback for the first downlink data transmission if the first downlink data transmission and the second downlink data transmission are associated with a same flow control feedback process. In another aspect, if a UE is scheduled for a first downlink data transmission, the UE may not be expected to receive a second downlink data transmission after the first downlink data transmission and report flow control feedback for the second downlink data transmission before reporting flow control feedback for the first downlink data transmission.

In accordance with these aspects, when the base station receives flow control feedback, the base station may be able to identify that the flow control feedback is for the first downlink data transmission. That is, based on the rules described above, the base station may avoid misinterpreting flow control feedback for one downlink data transmission as flow control feedback for another downlink data transmission. Because such confusion may be prevented, the base station may avoid mistakenly scheduling retransmissions unnecessarily or miss opportunities for scheduling retransmissions for downlink data transmissions. Further, the established rules may allow for efficient pipelining at a UE since the UE may be able to handle downlink data transmissions in the order that the downlink data transmissions are received.

In some cases, a UE may not receive a timing value (e.g., numeric timing value) for reporting flow control feedback for a downlink data transmission in downlink control information (DCI) that schedules the first downlink data transmission. Instead, the UE may receive the timing for reporting flow control feedback for the first downlink data transmission in a next DCI. In such cases, if the UE misses the DCI that includes the timing value for reporting flow control feedback for the first downlink data transmission, the flow control feedback for the first downlink data transmission may be delayed. As a result, the UE may be scheduled to receive a second downlink data transmission and report flow control feedback for the second downlink data transmission before the flow control feedback for the first downlink data transmission. Thus, the UE may report flow control feedback for downlink data transmissions in a different order from the order in which the downlink data transmissions were received, resulting in confusion at the UE and the base station and inefficient pipelining at the UE.

As described herein, a wireless communications system may support efficient techniques for scheduling downlink data transmissions and flow control feedback for the downlink data transmissions to allow for efficient pipelining at a UE and prevent confusion at the UE and a base station. In one aspect, a UE and a base station may follow preconfigured rules for facilitating downlink data transmissions while avoiding confusion at the UE and the base station (e.g., confusion due to being scheduled to report flow control feedback for downlink data transmissions in a different order from which the downlink data transmissions are received). In another aspect, the UE may be configured to report flow control feedback for a downlink data transmission in a next uplink control channel to avoid confusion at the UE and the base station (e.g., in the event that the UE misses DCI used to indicate the timing for reporting flow control feedback for a downlink data transmission).

Aspects of the disclosure introduced above are described below in the context of a wireless communications system. Non-limiting implementations of processes and signaling exchanges that support handling of non-numeric data to flow control feedback timing are then described. Aspects of the disclosure are further illustrated by and described with reference to apparatus diagrams, system diagrams, and flowcharts that relate to handling of non-numeric data to flow control feedback timing.

FIG. 1 illustrates a non-limiting implementation of a wireless communications system 100 that supports handling of non-numeric data to flow control feedback timing in accordance with aspects of the present disclosure. The wireless communications system 100 may include one or more base stations 105, one or more UEs 115, and a core network 130. In some aspects, the wireless communications system 100 may be a Long-Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For instance, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other aspects, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For instance, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Transmitting downlink data in a PDSCH or on resources of a PDSCH may be referred to as transmitting the PDSCH, transmitting control information on a PDCCH or on resources of a PDCCH may be referred to as transmitting the PDCCH, transmitting uplink data in a PUSCH or on resources of a PUSCH may be referred to as transmitting the PUSCH, and transmitting uplink control information in a PUCCH or on resources of a PUCCH may be referred to as transmitting the PUCCH. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For instance, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

A base station 105 and a UE 115 may support communications using one or more numerologies on a carrier, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, in some aspects, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, in accordance with some aspects, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For instance, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, in accordance with some aspects, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For instance, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an access node controller (ANC) or the like. Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For instance, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For instance, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Flow control feedback is one technique for increasing the likelihood that data is received correctly over a communication link 125. Flow control feedback may include an acknowledgment (ACK) indicating that a receiving device successfully decoded a transmission and a negative ACK (NACK) indicating that a receiving device failed to decode a transmission. Flow control feedback (i.e., feedback controlling the flow of communications between a base station 105 and a UE 115) may include hybrid automatic repeat request (HARQ) feedback. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may use semi-static grants to schedule multiple downlink transmissions to a UE 115. Such scheduling may be referred to as semi-persistent scheduling (SPS) and may be used to limit overhead and processing latency (e.g., since semi-static grants may be transmitted less frequently than dynamic grants).

Figure 2:
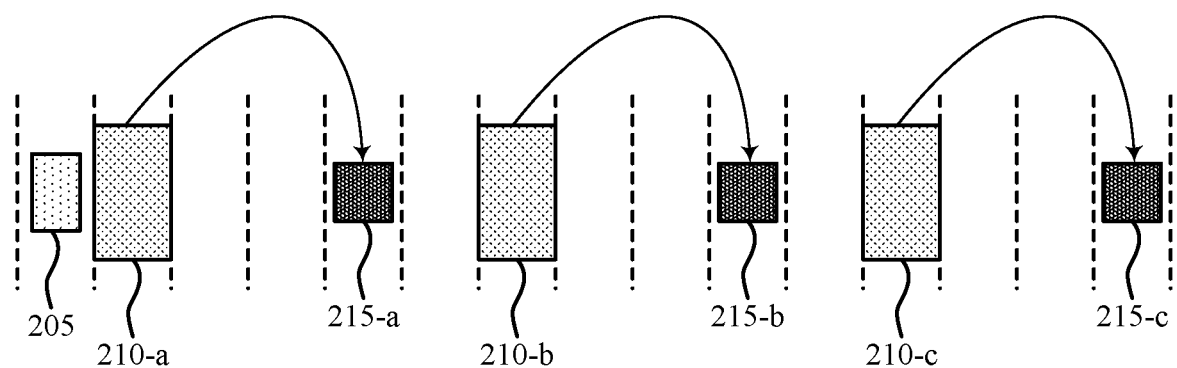
FIG. 2 illustrates a block diagram showing semi-persistent scheduling (SPS) in accordance with aspects of the present disclosure.

FIG. 2 illustrates a block diagram 200 showing SPS in accordance with aspects of the present disclosure. SPS downlink transmissions in PDSCHs may be referred to as SPS PDSCHs 210, and a base station 105 may transmit higher layer (e.g., RRC) signaling to a UE 115 to configure parameters for SPS. For instance, the base station 105 may transmit RRC signaling to the UE 115 to indicate a periodicity of SPS PDSCHs 210, a number of flow control feedback processes associated with SPS PDSCHs, etc. The base station 105 may then transmit an activation DCI 205 to activate SPS or activate an SPS configuration (e.g., DCI with a cyclic redundancy check (CRC) scrambled by a cell-specific radio network temporary identifier (CS-RNTI)). The activation DCI 205 may also indicate time or frequency resources for each SPS PDSCH 210, a modulation and coding scheme (MCS) used for the SPS PDSCHs 210, a timing for reporting flow control feedback in a PUCCH 215 for each SPS PDSCH 210, etc.

Once an SPS configuration is activated by the activation DCI 205, a UE 115 may receive SPS PDSCHs 210 based on a periodicity indicated by a base station 105 until another DCI releases the SPS configuration. The timing for reporting flow control feedback for a PDSCH may be referred to as a K1 value (e.g., a number of time intervals such as slots between a PDSCH and a PUCCH allocated for reporting flow control feedback for the PDSCH). The UE 115 may use the K1 value for all SPS PDSCHs 210 indicated in the activation DCI 205. In FIG. 2, the K1 value for SPS PDSCHs 210 may be three, and the UE 115 may receive three or more SPS PDSCHs 210 and report flow control feedback for the three or more SPS PDSCHs 210. For instance, the UE 115 may receive a first SPS PDSCH 210 and report flow control feedback for the first SPS PDSCH 210 three slots later in a first PUCCH 215, the UE 115 may receive a second SPS PDSCH 210 and report flow control feedback for the second SPS PDSCH 210 three slots later in a second PUCCH 215, and the UE 115 may receive a third SPS PDSCH 210 and report flow control feedback for the third SPS PDSCH 210 three slots later in a third PUCCH 215.

In addition to supporting SPS downlink transmissions and flow control feedback for the SPS downlink transmissions, base stations 105 and UEs 115 may support downlink transmissions or PDSCHs in different downlink transmission groups or PDSCH groups. A base station 105 may transmit DCI to a UE 115 that schedules a PDSCH and indicates a value (e.g., zero or one) of the PDSCH group for the scheduled PDSCH (e.g., in a PDSCH group indicator field). The base station 105 may increment a downlink assignment index (DAI) for each PDSCH group (e.g., a counter DAI (C-DAI) or a total DAI (T-DAI)). The DCI may also include a bit (e.g., a number of requested PDSCH groups field) indicating whether flow control feedback for another PDSCH group is requested (e.g., a PDSCH group different from the PDSCH group that includes the scheduled PDSCH).

Further, the DCI may include a new feedback indicator (NFI) field that indicates whether a UE 115 is to report flow control feedback for previous PDSCHs. That is, the NFI may operate as a toggle bit, and, when the NFI is toggled, the DAI for a PDSCH group may be reset, and the UE 115 may suppress transmitting flow control feedback (e.g., ACK or NACKs) for PDSCHs in the PDSCH group received before the DAI is reset (e.g., only PDSCHs received after the reset are considered). If multiple PDSCH groups are supported by a base station 105 and a UE 115, a flow control codebook may be generated separately for each PDSCH group. The flow control codebook may be referred to as an enhanced type-two codebook, and the grouping of PDSCHs with flow control feedback reported for each PDSCH group may be referred to as a type-two HARQ codebook grouping and HARQ retransmission. Thus, the UE 115 may report flow control feedback separately for different PDSCH groups. In some cases, the UE 115 may multiplex flow control feedback for different PDSCH groups in the same PUCCH.

In the aspects described above, a base station 105 may configure a K1 value for a PDSCH, and a UE 115 may report flow control feedback for the PDSCH in a PUCCH allocated K1 time intervals after receiving the PDSCH. That is, the UE 115 may determine a time interval (e.g., slot) for transmitting flow control feedback for a PDSCH from a PDSCH-to-flow-control-feedback-timing-indicator field indicating a K1 value in the DCI scheduling the PDSCH. Such a K1 value may be referred to as a numeric K1 value as it indicates a number of time intervals (e.g., slots) after the PDSCH that the flow control feedback is to be reported. In some aspects, a UE 115 may receive DCI (e.g., DCI 1_0 or fallback downlink DCI) including a field with three bits indicating a K1 value for a PDSCH (e.g., one of the values in the set: {1, 2, . . . , 8}). In other aspects, a UE 115 may receive a higher layer message indicating a set of K1 values (e.g., a higher layer parameter downlink-data-to-uplink-ACK timing set configured by RRC), and the UE 115 may receive DCI including a field with up to three bits indicating one of the K1 values in the set of K1 values configured in the higher layer message.

In some cases, however, a base station 105 may transmit an indication of a non-numeric K1 value (e.g., inapplicable value) for reporting flow control feedback for a PDSCH. The non-numeric K1 value may be configured as one of the values in the set of K1 values indicated by a higher layer message. When the base station 105 indicates the non-numeric K1 value in first DCI for a PDSCH (e.g., when the PDSCH-to-HARQ-feedback timing indicator field indicates the non-numeric K1 value), the flow control feedback for the PDSCH may be postponed until a timing and resource for the flow control feedback is provided by the base station 105 in second DCI. In the case of type one (e.g., semi-static) or type two (e.g., dynamic) HARQ codebooks, the second DCI may be the next detected DCI in any PDCCH monitoring occasion after the first DCI that indicates a numeric K1 value.

Figure 3:
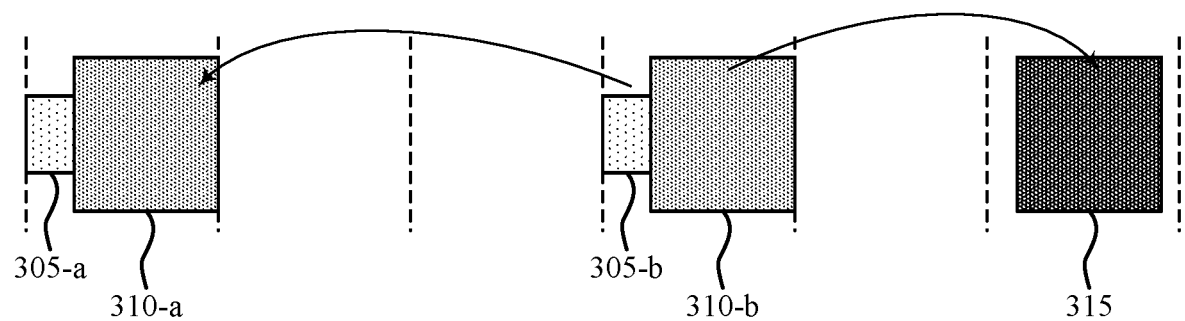
FIG. 3 illustrates a block diagram showing flow control feedback reported for a physical downlink shared channel (PDSCH) associated with a non-numeric K1 value in accordance with aspects of the present disclosure.

FIG. 3 illustrates a block diagram 300 showing flow control feedback reported for a PDSCH associated with a non-numeric K1 value in accordance with aspects of the present disclosure. In FIG. 3, a UE 115 may receive a DCI 305-*a* from a base station 105 scheduling a PDSCH 310-*a* and indicating a non-numeric K1 value for the PDSCH 310-*a*. Thus, the UE 115 may postpone reporting flow control feedback for the PDSCH 310-*a* until a timing and resource for the flow control feedback is provided by the base station 105 in a next DCI. The UE 115 may then receive DCI 305-*b* scheduling a PDSCH 310-*b* and indicating a numeric K1 value for the PDSCH 310-*b*. Because the DCI 305-*b* may indicate a numeric K1 value, the UE 115 may determine to transmit flow control feedback for the PDSCH 310-*a* in accordance with the numeric K1 value (e.g., in a PUCCH allocated two time intervals later as illustrated if the numeric K1 value is two). Thus, the UE 115 may report flow control feedback for the PDSCH 310-*a* and the PDSCH 310-*b* in the PUCCH 315 in accordance with the numeric K1 value. That is, the UE 115 may report flow control feedback for the PDSCH 310-*a* and the PDSCH 310-*b* K1 time intervals after the PDSCH 310-*b* (e.g., where K1 is the numeric K1 value indicated in the DCI 305-*b*).

In some cases, however, if a UE 115 receives a non-numeric K1 value for reporting flow control feedback for a first PDSCH, the UE 115 may miss a next DCI indicating a numeric K1 value for reporting flow control feedback for the PDSCH. In such cases, the flow control feedback for the first PDSCH may be delayed, and the UE 115 may be scheduled to receive a second PDSCH and report flow control feedback for the second PDSCH before the flow control feedback for the first PDSCH. Thus, the UE 115 may report flow control feedback for PDSCHs in a different order from the order in which the PDSCHs were received. Reporting flow control feedback for PDSCHs in a different order from the order in which the PDSCHs were received may be referred to as out-of-order operation.

Figure 4:
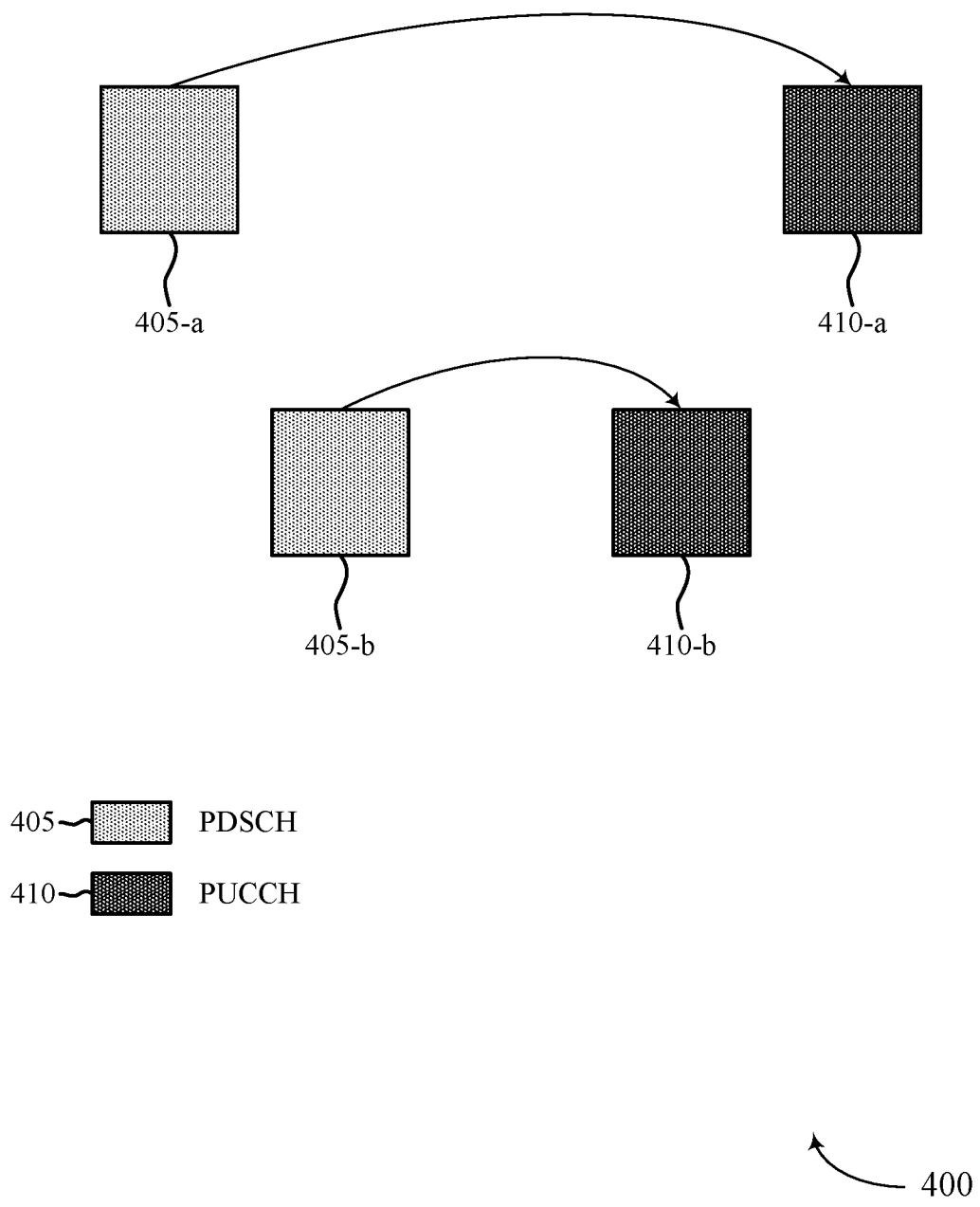
FIG. 4 illustrates a block diagram showing out-of-order operation in accordance with aspects of the present disclosure.

FIG. 4 illustrates a block diagram 400 showing out-of-order operation in accordance with aspects of the present disclosure. In FIG. 4, a UE 115 may receive a first PDSCH 405-*a* and a second PDSCH 405-*b* after the first PDSCH 405-*b*, and the UE 115 may be scheduled to report flow control feedback for PDSCH 405-*b* in a PUCCH 410-*b* before reporting flow control feedback for PDSCH 405-*a* in a PUCCH 410-*a*. Out-of-order operation may be allowed if DSCH 405-*a* and PDSCH 405-*b* are in different component carriers and PUCCH 410-*a* and PUCCH 410-*b* are in the same uplink component carriers. In some cases, however, out-of-order operation may lead to inefficient pipelining at a UE 115 and confusion at a base station 105 and a UE 115 (e.g., confusion in determining which PDSCH corresponds to received flow control feedback). Thus, a UE 115 may not be expected to support out-of-order operation. Wireless communications system 100 may support efficient techniques for scheduling PDSCHs and flow control feedback for the PDSCHs to allow for efficient pipelining at a UE 115 and prevent confusion at the UE 115 and a base station 105.

Figure 5:
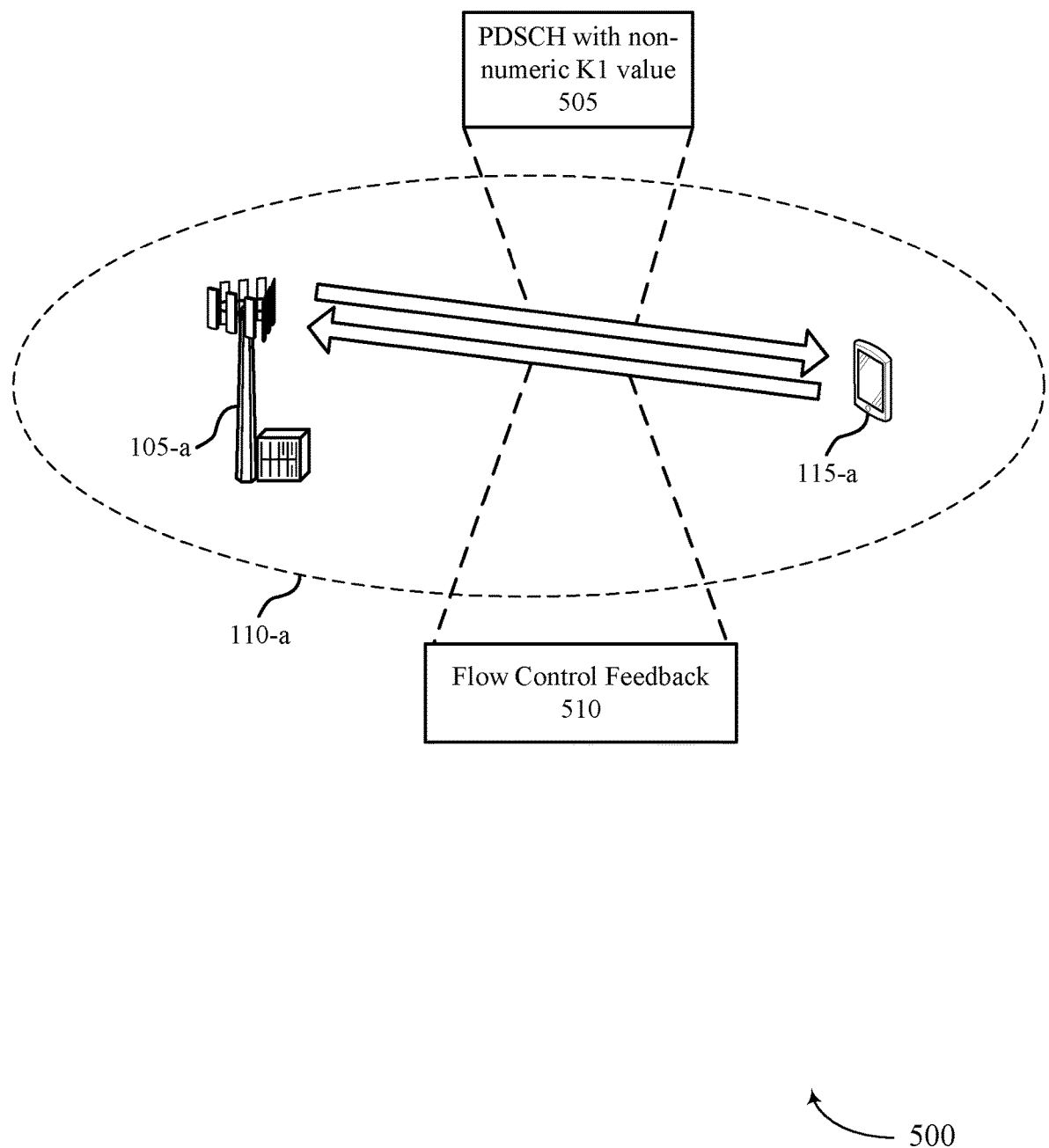
FIG. 5 illustrates a non-limiting implementation of a wireless communications system that supports handling of non-numeric data to flow control feedback timing in accordance with aspects of the present disclosure.

FIG. 5 illustrates a non-limiting implementation of a wireless communications system 500 that supports handling of non-numeric data to flow control feedback timing in accordance with aspects of the present disclosure. The wireless communications system 500 includes a UE 115-*a*, which may include one or more aspects of a UE 115 described with reference to FIG. 1. The wireless communications system 200 also includes a base station 105-*a*, which may include one or more aspects of a base station 105 described with reference to FIG. 1. The base station 105-*a* may provide communication coverage for a coverage area 110-*a*. The wireless communications system 200 may implement aspects of wireless communications system 100. In accordance with some aspects, the wireless communications system 500 supports efficient techniques for scheduling PDSCHs and flow control feedback for the PDSCHs.

In FIG. 5, the base station 105-*a* may transmit DCI to the UE 115-*a* scheduling a PDSCH 505 with a non-numeric K1 value, and the UE 115-*a* may use the techniques described herein to report flow control feedback 510 to the base station 105-*a* for the PDSCH 505. In one aspect, the UE 115-*a* and the base station 105-*a* may follow preconfigured rules for receiving the PDSCH 505 and reporting flow control feedback 505 for the PDSCH 505 while avoiding out-of-order operation and prevent confusion at the UE 115-*a* and the base station 105-*a* (e.g., confusion due to being scheduled to report flow control feedback for downlink data transmissions in a different order from which the downlink data transmissions are received). In another aspect, the UE 115-*a* may be configured to report flow control feedback 510 for the PDSCH 505 in a next uplink control channel to avoid out-of-order operation and prevent confusion at the UE 115-*a* and the base station 105-*a* (e.g., in the event that the UE 115-*a* misses DCI indicating a numeric K1 value).

Figure 6:
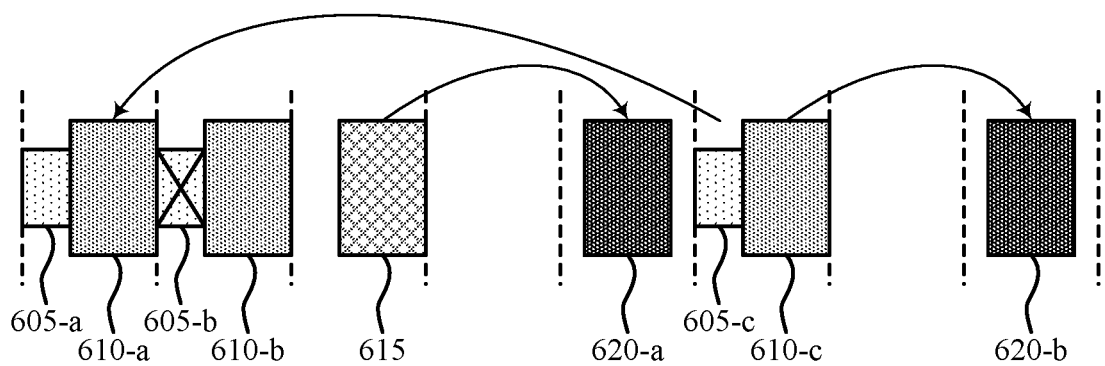
FIG. 6 illustrates a block diagram showing out-of-order operation in accordance with aspects of the present disclosure.

FIG. 6 illustrates a block diagram 600 showing out-of-order operation in accordance with aspects of the present disclosure. In FIG. 6, a UE 115 may receive DCI 605-*a* from a base station 105 scheduling a PDSCH 610-*a* and indicating a non-numeric K1 value for the PDSCH 610-*a*. Thus, the UE 115 may postpone reporting flow control feedback for the PDSCH 610-*a* until a timing and resource for the flow control feedback is provided by the base station 105 in subsequent DCI (e.g., until a numeric K1 value is indicated in the subsequent DCI). In some cases, however, before receiving DCI indicating a numeric K1 value, the UE 115 may be scheduled to receive SPS PDSCH 615 (e.g., or another type of PDSCH) and report flow control feedback in a PUCCH 620-*a* for the SPS PDSCH 615 (e.g., or the other type of PDSCH) before reporting flow control feedback for the PDSCH 610-*a*.

For instance, the UE 115 may miss (e.g., fail to receive or decode) DCI 605-*b* that schedules a PDSCH 610-*b* and includes a numeric K1 value indicating that the UE 115 is to report flow control feedback for the PDSCH 610-*a* in PUCCH 620-*a* (e.g., K1=3). The UE 115 may then receive DCI 605-*c* scheduling a PDSCH 610-*c* that includes a numeric K1 value indicating that the UE 115 is to report flow control feedback for the PDSCH 610-*c* and previous PDSCHs associated with non-numeric K1 values in PUCCH 620-*b*. That is, the UE 115 may determine that DCI 605-*c* is the second DCI indicating the numeric K1 value for PDSCH 610-*a* since the UE 115 may miss the DCI 605-*b*. Thus, the UE 115 may report flow control feedback for PDSCH 610-*a* in PUCCH 620-*b*. As a result, flow control feedback for PDSCH 610-*a* and the SPS PDSCH 615 may be out-of-order with respect to the order in which the PDSCH 610-*a* and the SPS PDSCH 615 are received. If the PDSCH 610-*a* and the SPS PDSCH 615 are in different downlink component carriers, out-of-order operation may not lead to inefficiencies. However, the base station 105 may still expect flow control feedback for PDSCH 610-*a* in PUCCH 620-*a*, but the UE 115 may transmit the flow control feedback for PDSCH 610-*a* in PUCCH 620-*b*, resulting in confusion at the base station 105.

The UE 115 and the base station 105 may use the techniques described herein to accommodate or avoid out-of-order operation. In one aspect, reporting flow control feedback for multiple PDSCHs in a different order from the order in which the multiple PDSCHs are received may be allowed if at least one of the PDSCHs is an SPS PDSCH. In a given scheduled cell, the UE 115 may receive a first PDSCH in slot i, with the corresponding flow control feedback for the first PDSCH assigned to be transmitted in slot j, and a second PDSCH with the corresponding flow control feedback for the second PDSCH assigned to be transmitted in a slot before slot j based on the first PDSCH or the second PDSCH being an SPS PDSCH (e.g., or another PDSCH without a corresponding PDCCH). In this aspect, the UE 115 may receive a first PDSCH scheduled by first DCI indicating a non-numeric K1 value and receive a second PDSCH, where respective timings of flow control feedback for the first and second PDSCHs are out-of-order relative to respective timings of receiving the first and second PDSCHs. The UE 115 may receive the first PDSCH prior to the second PDSCH or receive the second PDSCH prior to the first PDSCH. The UE 115 may then report flow control feedback for the first PDSCH based on the second PDSCH being an SPS PDSCH.

In another aspect, a wireless communications system may disallow combinations of SPS PDSCHs (e.g., active SPS) and PDSCHs scheduled by DCI indicating non-numeric K1 values. For instance, when an SPS configuration is activated (e.g., with periodic SPS PDSCH reception and corresponding periodic flow control feedback transmission) in a component carrier, a UE 115 may not be expected to receive a DCI scheduling a PDSCH in the same component carrier with a non-numeric K1 value until the SPS configuration is released. If the UE 115 receives first DCI activating SPS PDSCHs, and the UE 115 receives second DCI indicating a non-numeric K1 value for a PDSCH, the UE 115 may suppress receiving the PDSCH based on the SPS PDSCHs being activated. Alternatively, when the UE 115 is configured with non-numeric K1 values (e.g., in the set of downlink-data-to-uplink-ACK K1 values), the UE 115 may not expect to be configured with an SPS configuration, or the UE 115 may not expect to receive a DCI that activates an SPS configuration. If the UE 115 receives a control message indicating that a non-numeric K1 value is configured in a set of flow control feedback timings for PDSCHs, and the UE 115 receives DCI activating SPS PDSCHs, the UE 115 may suppress receiving the SPS PDSCHs while the non-numeric data to flow control feedback timing is configured.

In yet another aspect, when a UE 115 receives first DCI scheduling a PDSCH with a non-numeric K1 value, the UE 115 may consider transmitting flow control feedback for the PDSCH in the next PUCCH transmission with flow control feedback that starts after a PDSCH processing time (e.g., N1 time intervals or symbols) after the end of the PDSCH. Specifically, the UE 115 may consider transmitting the flow control feedback for the PDSCH in the next PUCCH transmission if the UE 115 fails to detect second DCI indicating a numeric K1 value pointing to the next PUCCH transmission or an earlier PUCCH transmission.

Figure 7:
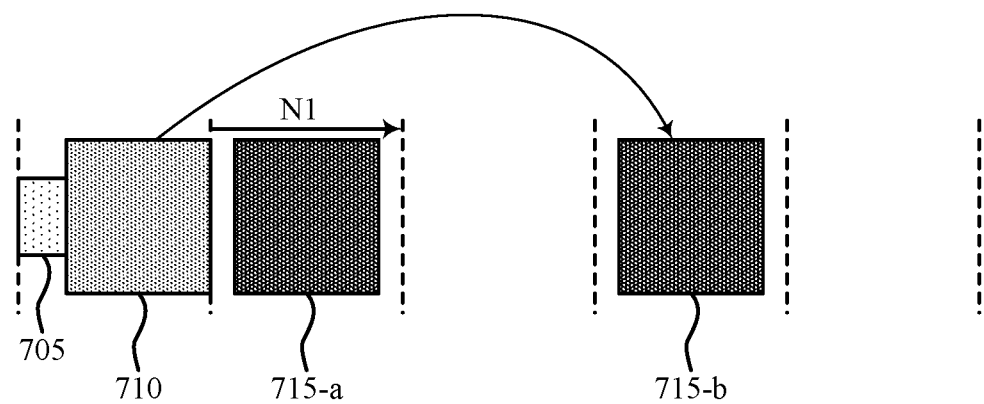
FIG. 7 illustrates a block diagram showing flow control feedback for a PDSCH scheduled with a non-numeric K1 value reported in a next physical uplink control channel (PUCCH) in accordance with aspects of the present disclosure.

FIG. 7 illustrates a block diagram 700 showing flow control feedback for a PDSCH scheduled with a non-numeric K1 value reported in a next PUCCH in accordance with aspects of the present disclosure. In FIG. 7, the UE 115 may receive DCI 705 scheduling PDSCH 710 and indicating a non-numeric K1 value for reporting flow control feedback for PDSCH 710. However, the UE 115 may fail to receive DCI indicating a numeric K1 value before PUCCH 715-*b*. Thus, the UE 115 may consider reporting flow control feedback for PDSCH 710 in PUCCH 715-*b*. PUCCH 715-*b* may be the first PUCCH (e.g., next PUCCH) that follows a duration of time (e.g., N1 symbols) configured for processing PDSCH 710 (e.g., since PUCCH 715-*a* is allocated during the duration of time configured for processing PDSCH 710).

As mentioned above, in FIG. 7, the UE 115 may determine whether to transmit flow control feedback for PDSCH 710 in the PUCCH 715-*b*. In some cases, the UE 115 may discard the flow control feedback for PDSCH 710 that is scheduled with the non-numeric K1 value. In other cases, the UE 115 may multiplex the flow control feedback for PDSCH 710 that is scheduled with the non-numeric K1 value in the PUCCH 715-*b*. Thus, determining whether to transmit flow control feedback in a PUCCH may correspond to either discarding the flow control feedback or transmitting the flow control feedback in the PUCCH (e.g., the UE 115 may optionally transmit flow control feedback for PDSCH 710 in the PUCCH 715-*b*). In both cases, a DCI that later indicates a numeric K1 value pointing to a PUCCH after PUCCH 715-*b* may not indicate the timing for reporting flow control feedback for PDSCH 710. That is, if the UE 115 receives DCI indicating a numeric K1 value pointing to a PUCCH after PUCCH 715-*b*, the UE 115 may suppress reporting flow control feedback for the PDSCH 710 in the PUCCH corresponding to the numeric K1 value.

In yet another aspect, if a UE 115 detects a first DCI scheduling a PDSCH with a non-numeric K1 value for reporting flow control feedback for the scheduled PDSCH, and there is an SPS PDSCH with corresponding flow control feedback to be transmitted in a PUCCH, the UE 115 may multiplex the flow control feedback for the scheduled PDSCH with the flow control feedback for the SPS PDSCH in the PUCCH.

Figure 8:
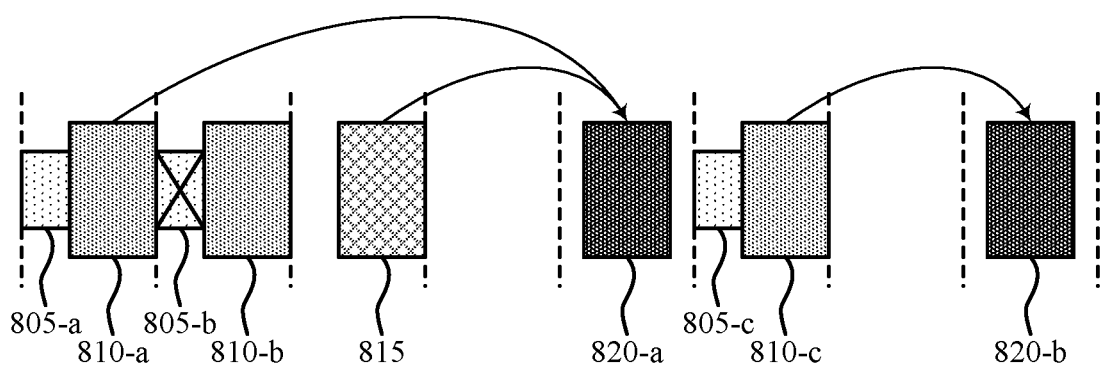
FIG. 8 illustrates a block diagram showing flow control feedback for a PDSCH scheduled with a non-numeric K1 value reported in a PUCCH allocated for an SPS PDSCH in accordance with aspects of the present disclosure.
Figure 8:
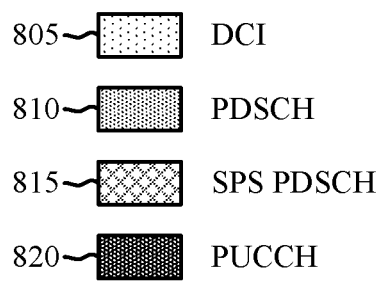

FIG. 8 illustrates a block diagram 800 showing flow control feedback for a PDSCH scheduled with a non-numeric K1 value reported in a PUCCH allocated for an SPS PDSCH in accordance with aspects of the present disclosure. In FIG. 8, the UE 115 may receive DCI 805-*a* (e.g., first DCI) scheduling PDSCH 810-*a* and indicating a non-numeric K1 value for reporting flow control feedback for PDSCH 810-*a*. However, the UE 115 may miss (e.g., fail to receive or decode) DCI 805-*b* (e.g., second DCI) scheduling PDSCH 810-*b* and indicating a numeric K1 value (e.g., corresponding to PUCCH 820-*a*) for reporting flow control feedback for the PDSCH 810-*a* and the PDSCH 810-*b*. Thus, after receiving the SPS PDSCH 815, the UE 115 may multiplex flow control feedback for PDSCH 810-*a* with flow control feedback for SPS PDSCH 815 in PUCCH 820-*a* (e.g., to avoid out-of-order operation). The UE 115 may then receive DCI 805-*c* scheduling PDSCH 810-*c* with a numeric K1 value corresponding to PUCCH 820-*b*, and the UE 115 may report flow control feedback for PDSCH 810-*c* in PUCCH 820-*b*.

In some cases, the UE 115 may multiplex flow control feedback for PDSCH 810-*a* with flow control feedback for SPS PDSCH 815 if the UE 115 fails to detect a DCI 805-*b* (e.g., second DCI) indicating a numeric K1 value pointing to a time interval for flow control feedback transmission that is before a time interval for flow control feedback transmission for the SPS PDSCH 815. The UE 115 may monitor for DCI 805-*b* indicating a numeric K1 value in any PDCCH monitoring occasion after the one corresponding to DCI 805-*a* (e.g., first DCI) indicating a non-numeric K1 value. Further, the UE 115 may multiplex the flow control feedback for PDSCH 810-*a* with flow control feedback for SPS PDSCH 815 if the SPS PDSCH is received after DCI 805-*a* or after PDSCH 810-*a* (e.g., the PDSCH scheduled by the first DCI). Alternatively, the UE 115 may multiplex the flow control feedback for PDSCH 810-*a* with flow control feedback for SPS PDSCH 815 if the time between PDSCH 810-*a* (e.g., the scheduled PDSCH) and PUCCH 820-*a* (e.g., the PUCCH allocated for reporting flow control feedback for the SPS PDSCH 815) satisfies the minimum UE PDSCH processing timeline. The UE 115 may also multiplex the flow control feedback for PDSCH 810-*a* with flow control feedback for SPS PDSCH 815 if the UE 115 receives PDSCH 810-*a* and the SPS PDSCH 815 in the same downlink component carrier. Alternatively, the UE 115 may multiplex the flow control feedback for PDSCH 810-*a* with flow control feedback for SPS PDSCH 815 if the UE 115 receives PDSCH 810-*a* and the SPS PDSCH 815 in different downlink component carriers (e.g., for different downlink component carriers and not within the same downlink component carrier, or regardless of whether PDSCH 810-*a* and the SPS PDSCH 815 are in the same or different component carriers).

As described with reference to FIG. 2, in addition to supporting SPS PDSCHs, a UE 115 may support multiple PDSCH groups (e.g., the UE 115 is configured with an enhanced dynamic codebook as the PDSCH-HARQ-ACK codebook) when communicating with a base station 105. If a first DCI schedules a PDSCH in a first PDSCH group and indicates a non-numeric K1 value, the UE 115 may monitor for a second DCI that determines the timing for reporting flow control feedback for the PDSCH in the first PDSCH group (e.g., second DCI that indicates a numeric K1 value for the PDSCH in the first group associated with the non-numeric K1 value). The second DCI may be the next detected DCI in any PDCCH monitoring occasion after the first DCI that indicates a numeric K1 value and indicates a flow control feedback information report for the first PDSCH group (e.g., the second DCI indicates a same PDSCH group index as the first DCI). For instance, the second DCI may include a PDSCH group indicator field that indicates the first PDSCH group. Alternatively, the PDSCH group indicator field may indicate a second PDSCH group but the second DCI may also request flow control feedback for PDSCHs in the first PDSCH group (e.g., the non-scheduled PDSCH group) in a field indicating the number of requested PDSCH groups. In some cases, however, because the UE 115 may be scheduled with a non-numeric K1 value for a first PDSCH, the UE 115 may receive a second PDSCH and report flow control feedback for the second PDSCH before reporting flow control feedback for the first PDSCH.

Figure 9:
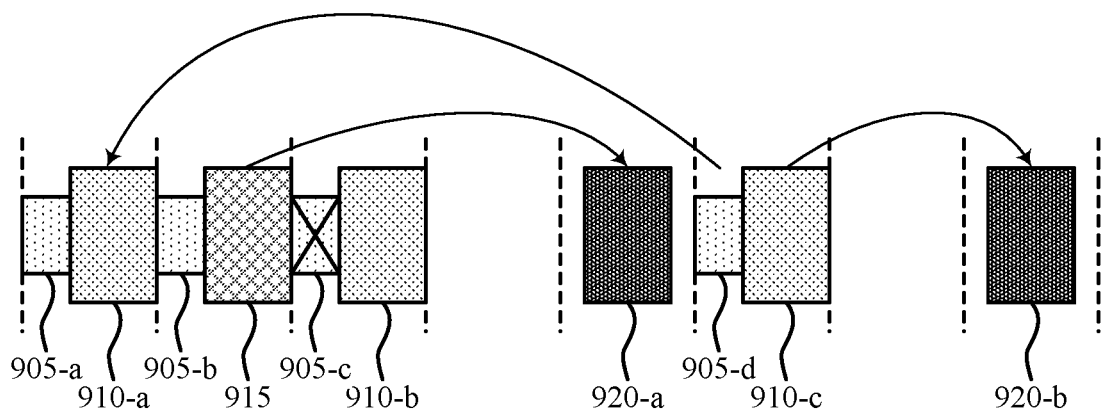
FIG. 9 illustrates a block diagram showing out-of-order operation in accordance with aspects of the present disclosure.

FIG. 9 illustrates a block diagram 900 showing out-of-order operation in accordance with aspects of the present disclosure. In FIG. 9, a UE 115 may receive DCI 905-*a* from a base station 105 scheduling a PDSCH 910-*a* in a first PDSCH group and indicating a non-numeric K1 value for the PDSCH 910-*a*. Thus, the UE 115 may postpone reporting flow control feedback for the PDSCH 910-*a* until a timing and resource for the flow control feedback is provided by the base station 105 in subsequent DCI (e.g., until a numeric K1 value is indicated in the subsequent DCI). In some cases, however, before receiving DCI indicating a numeric K1 value in subsequent DCI requesting flow control feedback for the first PDSCH group, the UE 115 may receive DCI 905-*b* scheduling a PDSCH 915 in a second PDSCH group, receive the PDSCH 915, and report flow control feedback in a PUCCH 920-*a* for PDSCH 915 before reporting flow control feedback for the PDSCH 910-*a*.

For instance, the UE 115 may miss (e.g., fail to receive or decode) DCI 905-*c* that schedules a PDSCH 910-*b* and includes a numeric K1 value and indicates that the UE 115 is to report flow control feedback for the PDSCH 910-*a* in the first group in PUCCH 910-*a* (e.g., K1=2). The UE 115 may then receive DCI 905-*d* scheduling a PDSCH 910-*c* in the first PDSCH group that includes a numeric K1 value indicating that the UE 115 is to report flow control feedback for the PDSCH 910-*c* and previous PDSCHs in the first PDSCH group associated with non-numeric KI values (e.g., PDSCH 910-*a*). That is, the UE 115 may determine that DCI 905-*d* is the second DCI indicating the numeric K1 value for PDSCH 910-*a* in the first PDSCH group since the UE 115 may miss the DCI 905-*c*. Thus, the UE 115 may report flow control feedback for PDSCH 910-*a* in PUCCH 920-*b* (e.g., a similar scenario for the case of an enhanced dynamic codebook as the scenario described with reference to FIG. 6 in the presence of SPS).

As a result, flow control feedback for PDSCH 910-*a* and PDSCH 915 may be out-of-order with respect to the order in which the PDSCH 910-*a* and the PDSCH 915 are received. If the PDSCH 910-*a* and the PDSCH 915 are in different downlink carriers, out-of-order operation may not lead to inefficiencies. However, the base station 105 may still expect flow control feedback for PDSCH 910-*a* in PUCCH 920-*a*, but the UE 115 may transmit the flow control feedback for PDSCH 910-*a* in PUCCH 920-*b*, resulting in confusion at the base station 105. The UE 115 and the base station 105 may use the techniques described herein to accommodate or avoid out-of-order operation. In particular, if a UE 115 receives first DCI scheduling a first PDSCH in a first PDSCH group with a non-numeric K1 value for reporting flow control feedback for the first PDSCH, and the UE 115 receives second DCI scheduling a second PDSCH in a second group with a numeric K1 value for reporting flow control feedback for the second PDSCH, the UE 115 may report flow control feedback for the first PDSCH with flow control feedback for the second PDSCH in a PUCCH corresponding to the numeric K1 value indicated in the second DCI.

Figure 10:
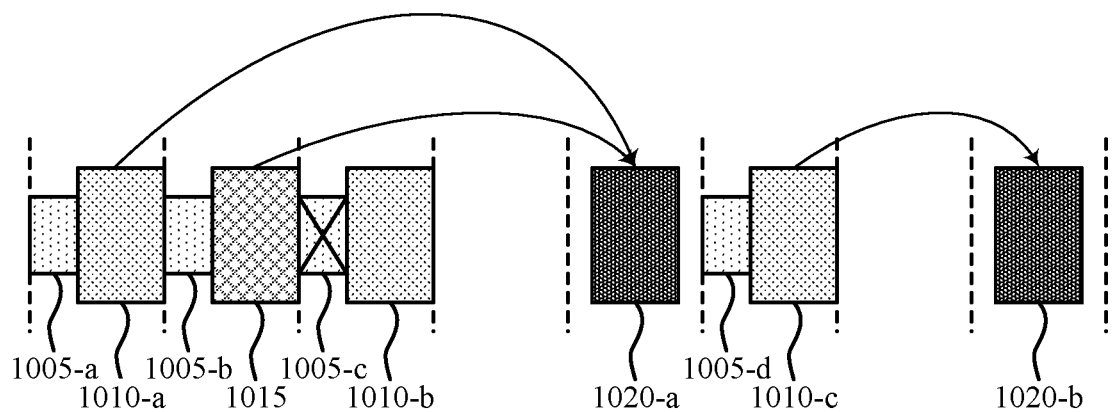
FIG. 10 illustrates a block diagram showing flow control feedback for a PDSCH in a first group scheduled with a non-numeric K1 value reported in a PUCCH allocated for flow control feedback for a PDSCH in a second group in accordance with aspects of the present disclosure.

FIG. 10 illustrates a block diagram 1000 showing flow control feedback for a PDSCH in a first group scheduled with a non-numeric K1 value reported in a PUCCH allocated for flow control feedback for a PDSCH in a second group in accordance with aspects of the present disclosure. In FIG. 10, the UE 115 may receive DCI 1005-a (e.g., first DCI) scheduling PDSCH 1010-a in a first PDSCH group and indicating a non-numeric K1 value for reporting flow control feedback for PDSCH 1010-a. The UE 115 may then receive DCI 1005-b scheduling PDSCH 1015 in a second PDSCH group and indicating a numeric K1 value for reporting flow control feedback for PDSCH 1015. However, the UE 115 may miss (e.g., fail to receive or decode) DCI 1005-c (e.g., second DCI for the first PDSCH group) scheduling PDSCH 1010-b and indicating a numeric K1 value (e.g., corresponding to PUCCH 1020-a) for reporting flow control feedback for the PDSCH 1010-a and the PDSCH 1010-b. Thus, the UE 115 may multiplex flow control feedback for PDSCH 1010-a in the first PDSCH group with flow control feedback for PDSCH 1015 in the second PDSCH group (e.g., to avoid out-of-order operation). The UE 115 may then receive DCI 1005-d scheduling PDSCH 1010-c in the first PDSCH group with a numeric K1 value corresponding to PUCCH 1020-b, and the UE 115 may report flow control feedback for PDSCH 1010-c in PUCCH 1020-b.

In one aspect, the DCI that indicates timing for flow control feedback transmission of a previously scheduled PDSCH with a non-numeric K1 value indicated by a first DCI is the next DCI (e.g., in a PDCCH monitoring occasion after the one corresponding to the first DCI) that indicates a numeric K1 value irrespective of the PDSCH groups indicated or requested in the first DCI and the next DCI. That is, in FIG. 10, the UE 115 may report flow control feedback for PDSCH 1010-a in PUCCH 1020-a corresponding to a numeric K1 value for PDSCH 1015 indicated in DCI 1005-b. In some cases, the UE 115 may multiplex the flow control feedback for PDSCH 1010-a with flow control feedback for PDSCH 1015 in PUCCH 1020-a if PDSCH 1010-a (e.g., the first PDSCH scheduled by the first DCI) and PDSCH 1015 (e.g., the second PDSCH scheduled by the next DCI) are received in a same downlink component carrier.

In another aspect, when a UE 115 is configured with an enhanced dynamic flow control feedback codebook, if a DCI scheduling a PDSCH indicates a non-numeric K1 value, the UE 115 may determine that the scheduled PDSCH is in multiple PDSCH groups (e.g., both PDSCH group 1 and PDSCH group 2 in FIG. 10). In this aspect, the DCI that determines the timing for flow control feedback for the scheduled PDSCH is the next DCI that indicates a numeric K1 value irrespective of the PDSCH groups indicated or requested in the DCI (e.g., as described with reference to FIG. 10). Similar to the aspect described above, in FIG. 10, the UE 115 may report flow control feedback for PDSCH 1010-a in PUCCH 1020-a corresponding to a numeric K1 value for PDSCH 1015 indicated in DCI 1005-b. That is, when flow control feedback for one or more PDSCHs in the second group is transmitted in the PUCCH 1020-a, the UE 115 may also report flow control feedback for the PDSCH 1010-a in the first group scheduled by DCI 1005-a indicating the non-numeric K1 value. When the UE 115 is scheduled to report flow control feedback for PDSCH 1010-a (and other PDSCHs) in the first group in a later PUCCH (or the same PUCCH 1020-a), the UE 115 may report a NACK corresponding to the PDSCH 1010-a associated with the non-numeric K1 value. The UE 115 may report the NACK because the PDSCH 1010-a associated with the non-numeric K1 value may belong to both PDSCH groups (e.g., the first and second PDSCH groups), but flow control feedback for the PDSCH 1010-a may already be reported in the flow control feedback for the first PDSCH group (e.g., in PUCCH 1020-a).

The base station 105 may increment a first DAI associated with the first PDSCH group and a second DAI associated with the second PDSCH group based on the PDSCH 1010-a being in the first and second PDSCH groups. The DAI may indicate a number of PDSCHs for which a UE 115 is to report flow control feedback to the base station 105 for a PDSCH group. If the UE 115 fails to receive as many PDSCHs as indicated by the DAI from the base station 105, the UE 115 may report NACKs for the remaining PDSCHs that the UE 115 failed to receive. In some cases, the base station 105 may transmit the first DAI and the second DAI to the UE 115, and, in other cases, the base station 105 may transmit a maximum of the first DAI and the second DAI to the UE 115 (e.g., resulting in some NACKs in the flow control feedback codebook for one of the PDSCH groups). The UE 115 may then generate flow control feedback for PDSCHs in the first group based on the first DAI and generate flow control feedback for PDSCHs in the second group based on the second DAI. Alternatively, the UE 115 may generate flow control feedback for PDSCHs in the first group and flow control feedback for PDSCHs in the second group based on the maximum of the first DAI and the second DAI.

In FIG. 10, because the second DAI associated with the second group may be incremented for the PDSCH 1010-a in the first group, the UE 115 may report flow control feedback for the PDSCH 1010-a in PUCCH 1020-a with flow control feedback for PDSCHs in the second group, and the base station 105 may expect the flow control feedback for the PDSCH 1010-a in PUCCH 1020-a. In particular, the first DAI may be one and the second DAI may be two, and the UE 115 may report flow control feedback for PDSCH 1010-a and PDSCH 1015 in PUCCH 1020-a based on the second DAI. If the base station 105-a indicates the maximum of the first DAI and the second DAI to the UE 115, and the first DAI is lower than the second DAI, the UE 115 may determine that a PDSCH in the first PDSCH group is missing when the UE 115 is scheduled to report flow control feedback for the first PDSCH group. That is, the base station 105 may transmit less PDSCHs to the UE 115 than the number of PDSCHs indicated in the DAI (e.g., since the base station 105 may indicate the second DAI to the UE 115 and the second DAI is greater than the first DAI). Thus, the UE 115 may report a NACK for the missing PDSCH, and the base station 105 may ignore the NACK for the missing PDSCH (e.g., since the base station 105 may be able to determine that the missing PDSCH corresponding to the NACK was not transmitted).

In yet another aspect, when a UE 115 receives DCI scheduling a PDSCH in a PDSCH group with a non-numeric K1 value, the UE 115 may determine whether to transmit flow control feedback for the PDSCH in the next PUCCH transmission with flow control feedback that starts after a PDSCH processing time after the end of the PDSCH. In some cases, the UE 115 may discard the flow control feedback for the PDSCH that is scheduled with the non-numeric K1 value. In other cases, the UE 115 may multiplex the flow control feedback for the PDSCH that is scheduled with the non-numeric K1 value in the next PUCCH transmission. Thus, determine whether to transmit flow control feedback in a PUCCH may correspond to either discarding the flow control feedback or transmitting the flow control feedback in the PUCCH. If the UE 115 discards the flow control feedback for the PDSCH, the UE 115 may report a NACK for the PDSCH with the non-numeric K1 value the next time that flow control feedback for the PDSCH group that includes the PDSCH is requested. Further, the UE 115 may report the flow control feedback in the next PUCCH if the NFI field is toggled in the DCI that allocates the next PUCCH for flow control feedback.

In the aspects described above with reference to FIGS. 5-10, a UE 115 may report flow control feedback for one PDSCH in a PUCCH allocated for reporting flow control feedback for a different PDSCH. Thus, it may be challenging for a base station 105 to map the flow control feedback received in a PUCCH to the corresponding PDSCHs. In particular, reporting flow control feedback for PDSCHs associated with non-numeric K1 values may lead to flow control feedback codebook mismatch issues.

Figure 11:
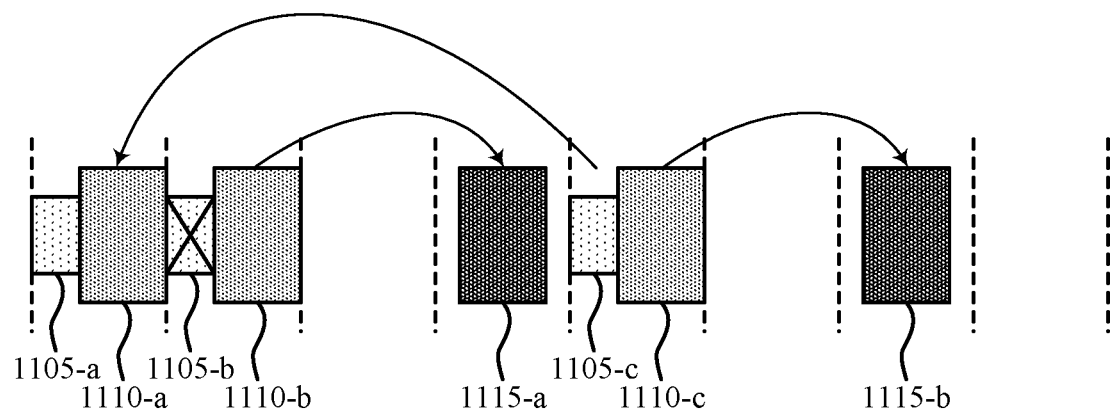
FIG. 11 illustrates a block diagram showing flow control feedback for a PDSCH being reported in an unexpected PUCCH in accordance with aspects of the present disclosure.

FIG. 11 illustrates a block diagram 1100 showing flow control feedback for a PDSCH being reported in an unexpected PUCCH in accordance with aspects of the present disclosure. In FIG. 11, a UE 115 may receive DCI 1105-*a* scheduling PDSCH 1110-*a* and indicating a non-numeric K1 value for reporting flow control feedback for PDSCH 1110-*a*. The UE 115 may then miss DCI 1105-*b* scheduling the PDSCH 1110-*b* and indicating a numeric K1 value corresponding to PUCCH 1115-*a*. The UE 115 may then receive DCI 1105-*c* scheduling PDSCH 1110-*c* and indicating a numeric K1 value corresponding to PUCCH 1115-*b*

Thus, rather than reporting flow control feedback for PDSCH 1110-*a* in PUCCH 1115-*a*, the UE 115 may report flow control feedback for PDSCH 1110-*a* in PUCCH 1115-*b*. That is, due to the missing DCI (e.g., DCI 1105-*b*), the UE 115 may avoid transmitting PUCCH 1115-*a* (or at least avoid transmitting flow control feedback for PDSCH 1110-*a* in PUCCH 1115-*a*). Instead, the UE 115 may determine that DCI 1105-*c* is the second DCI that provides the timing for reporting flow control feedback for PDSCH 1110-*a*. However, the base station 105 may expect the flow control feedback for PDSCH 1110-*a* to be received in PUCCH 1115-*a*, and there may be a flow control feedback codebook size mismatch issue with the flow control feedback received in PUCCH 1115-*b*. As a result, the base station 105 may be unable to decode PUCCH 1115-*b*. Flow control feedback codebook mismatch issues may be due to using the techniques described herein to report flow control feedback for a PDSCH associated with a non-numeric K1 value (e.g., as illustrated in FIG. 11, although FIG. 11 does not illustrate out-of-order operation).

To prevent flow control feedback codebook mismatch issues, a UE 115 may be configured to multiplex flow control feedback for a PDSCH associated with a non-numeric K1 value within all PUCCHs (e.g., PUCCH resources) that contain flow control feedback within a predefined window after a PDSCH processing time (e.g., N1 time intervals or symbols) following the end of the PDSCH. For instance, the UE 115 may transmit the flow control feedback for the PDSCH in the next M slots after N1 symbols after the PDSCH. In some cases, the UE 115 may receive an indication of a duration of the time window (e.g., M) in higher-layer signaling (e.g., RRC signaling) from a base station 105. Using these techniques, the base station 105 may be able to identify the PUCCHs that include flow control feedback for a PDSCH associated with a non-numeric K1 value (e.g., the UE 115 and the base station 105 may be on the same page). In FIG. 11, the UE 115 may multiplex flow control feedback for PDSCH 1110-*a* in PUCCH 1115-*b* even if the UE 115 does not transmit PUCCH 1115-*a* due to missing the DCI 1105-*b* (e.g., if PUCCH 1115-*b* is within the time window), and the base station 105 may identify that flow control feedback for PDSCH 1110-*a* is included in PUCCH 1115-*b*.

Figure 12:
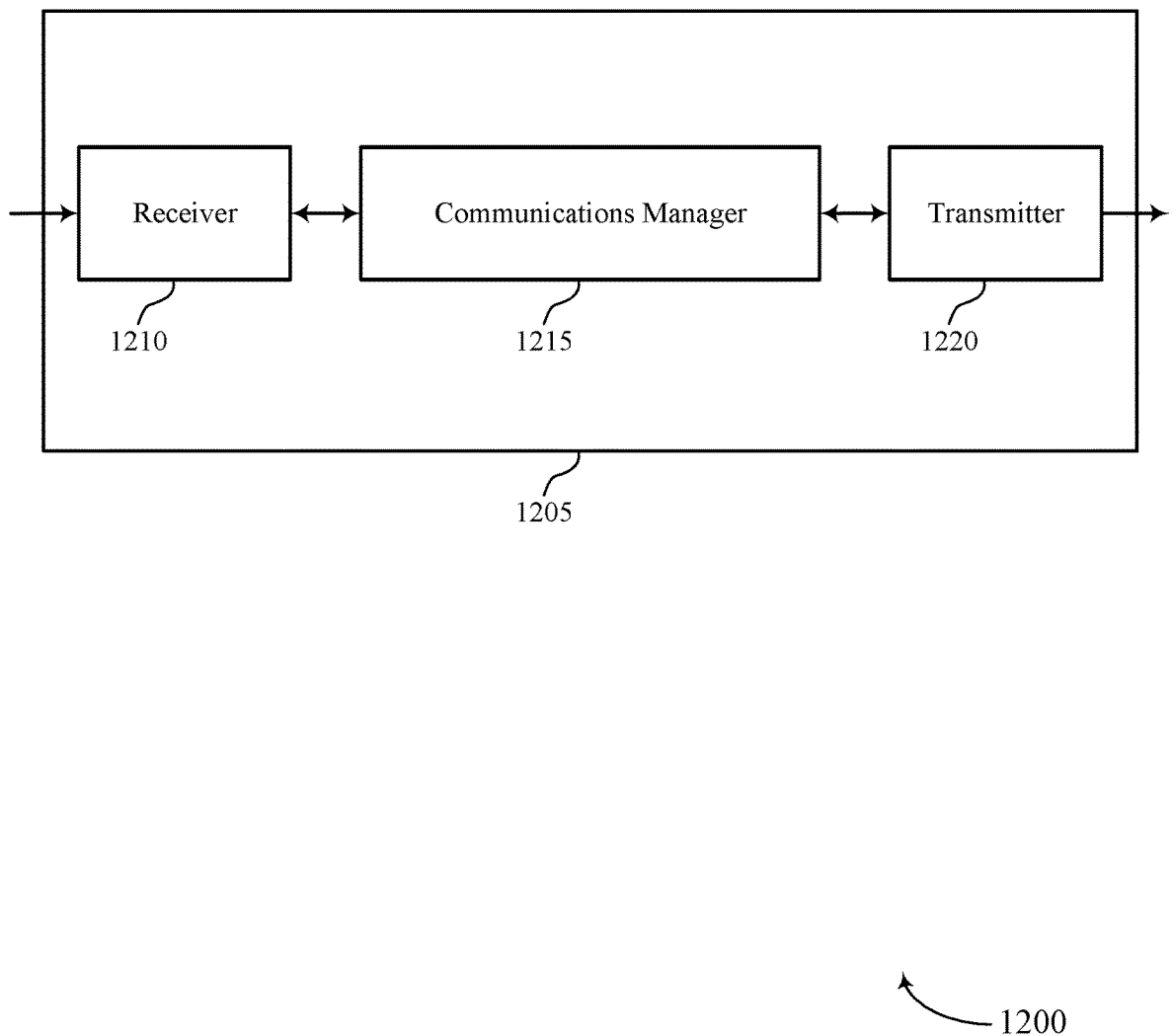
FIGS. 12 and 13 show block diagrams of devices that support handling of non-numeric data to flow control feedback timing in accordance with aspects of the present disclosure.

FIG. 12 shows a block diagram 1200 of a device 1205 that supports handling of non-numeric data to flow control feedback timing in accordance with aspects of the present disclosure. The device 1205 may include one or more aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to handling of non-numeric data to flow control feedback timing, etc.). Information may be passed on to other components of the device 1205. The receiver 1210 may include one or more aspects of the transceiver 1520 described with reference to FIG. 15. The receiver 1210 may utilize a single antenna or a set of antennas.

The communications manager 1215 may receive, from a base station, a first downlink data transmission scheduled by first DCI indicating a non-numeric data to flow control feedback timing for the first downlink data transmission, receive, from the base station, a second downlink data transmission, where respective timings of flow control feedback for the first downlink data transmission and the second downlink data transmission are out-of-order relative to respective timings of receiving the first downlink data transmission and the second downlink data transmission, and report flow control feedback to the base station for the first downlink data transmission based on the second downlink data transmission being a SPS downlink data transmission.

The communications manager 1215 may also receive first DCI activating SPS downlink data transmissions from the base station, receive second DCI indicating a non-numeric data to flow control feedback timing for a downlink data transmission, and suppress receiving the downlink data transmission based on the SPS downlink data transmissions being activated.

The communications manager 1215 may also receive a control message indicating that a non-numeric data to flow control feedback timing is configured in a set of data to flow control feedback timings for downlink data transmissions from a base station to the UE, receive DCI activating SPS downlink data transmissions to the UE, and suppress receiving the SPS downlink data transmissions from the base station while the non-numeric data to flow control feedback timing is configured.

The communications manager 1215 may also receive, from a base station, first DCI scheduling a first downlink data transmission with a non-numeric data to flow control feedback timing, determine that the UE failed to receive second DCI indicating a first numeric data to flow control feedback timing for reporting flow control feedback for the first downlink data transmission, and manage flow control feedback for the first downlink data transmission based on failing to receive the second DCI.

The communications manager 1215 may also receive, from a base station, first DCI scheduling a downlink data transmission with a non-numeric data to flow control feedback timing, identify resources of an uplink control channel allocated for flow control feedback for a SPS downlink data transmission, and multiplex flow control feedback for the downlink data transmission with flow control feedback for the SPS downlink data transmission in the resources of the uplink control channel.

The communications manager 1215 may also receive, from a base station, first DCI scheduling a first downlink data transmission in a first downlink data transmission group, the first DCI indicating a non-numeric data to flow control feedback timing, receive, from the base station, second DCI scheduling a second downlink data transmission in a second downlink data transmission group that is different from the first downlink data transmission group, the second DCI indicating a first numeric data to flow control feedback timing, and report flow control feedback for the first downlink data transmission and flow control feedback for the second downlink data transmission in a first uplink control channel corresponding to the first numeric data to flow control feedback timing.

The communications manager 1215 may also receive, from a base station, DCI scheduling a downlink data transmission with a non-numeric data to flow control feedback timing, identify one or more uplink control channels allocated within a time window for reporting flow control feedback for the downlink data transmission, and multiplex flow control feedback for the downlink data transmission in the one or more uplink control channels allocated within the time window. The communications manager 1215 may include one or more aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some aspects, the communications manager 1215, or its sub-components, may be a separate and distinct component in accordance with various aspects of the present disclosure. In some aspects, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some aspects, the transmitter 1220 may be collocated with a receiver 1210 in a transceiver module. That is, the transmitter 1220 may include one or more aspects of the transceiver 1520 described with reference to FIG. 15. The transmitter 1220 may utilize a single antenna or a set of antennas.

Figure 13:
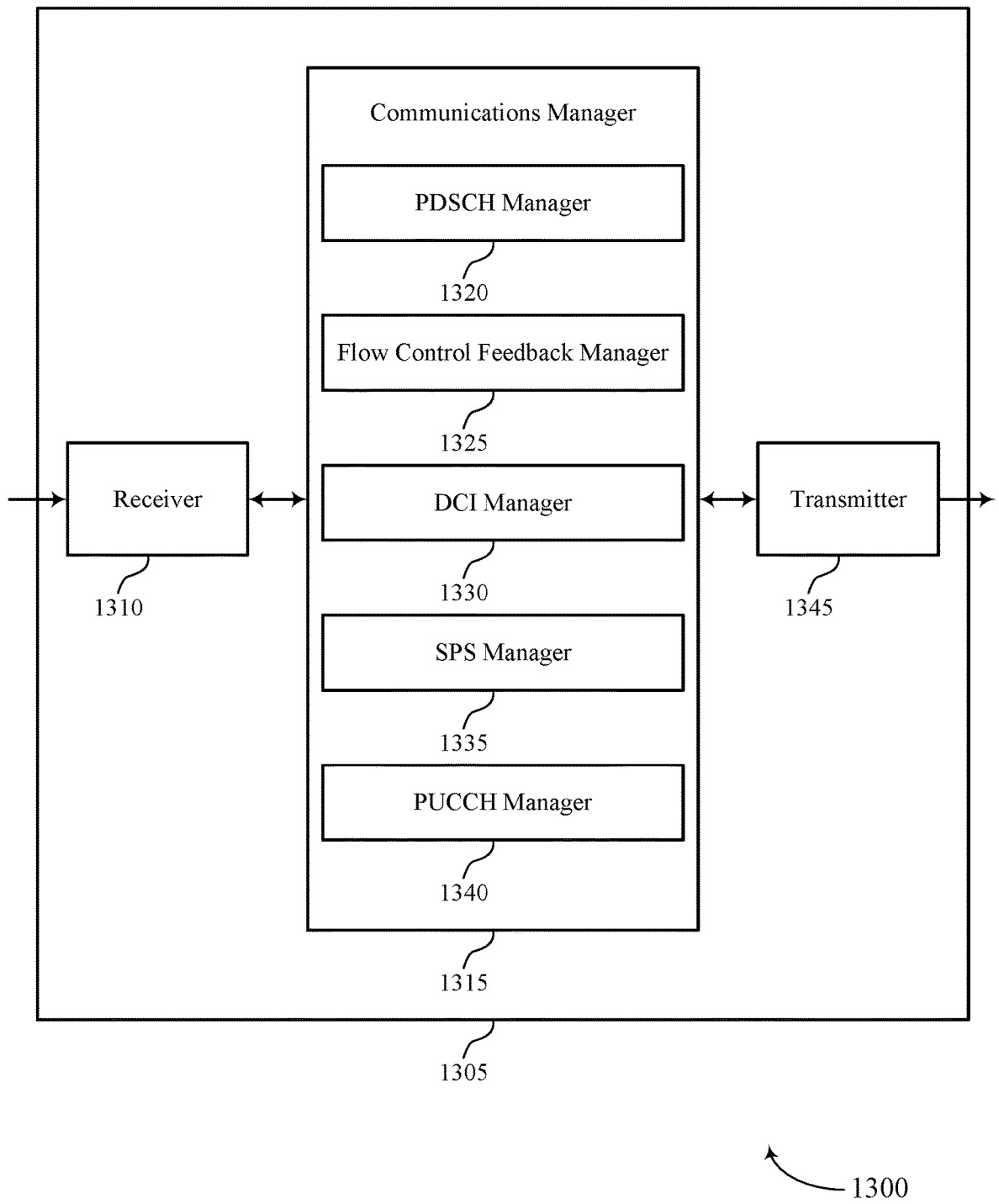

FIG. 13 shows a block diagram 1300 of a device 1305 that supports handling of non-numeric data to flow control feedback timing in accordance with aspects of the present disclosure. The device 1305 may include one or more aspects of a device 1205, or a UE 115 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to handling of non-numeric data to flow control feedback timing, etc.). Information may be passed on to other components of the device 1305. The receiver 1310 may include one or more aspects of the transceiver 1520 described with reference to FIG. 15. The receiver 1310 may utilize a single antenna or a set of antennas.

The communications manager 1315 may include one or more aspects of the communications manager 1215 as described herein. The communications manager 1315 may include a PDSCH manager 1320, a flow control feedback manager 1325, a DCI manager 1330, a SPS manager 1335, and a PUCCH manager 1340. The communications manager 1315 may include one or more aspects of the communications manager 1510 described herein.

The PDSCH manager 1320 may receive, from a base station, a first downlink data transmission scheduled by first DCI indicating a non-numeric data to flow control feedback timing for the first downlink data transmission and receive, from the base station, a second downlink data transmission, where respective timings of flow control feedback for the first downlink data transmission and the second downlink data transmission are out-of-order relative to respective timings of receiving the first downlink data transmission and the second downlink data transmission. The flow control feedback manager 1325 may report flow control feedback to the base station for the first downlink data transmission based on the second downlink data transmission being a SPS downlink data transmission.

The DCI manager 1330 may receive first DCI activating SPS downlink data transmissions from the base station and receive second DCI indicating a non-numeric data to flow control feedback timing for a downlink data transmission. The PDSCH manager 1320 may suppress receiving the downlink data transmission based on the SPS downlink data transmissions being activated.

The flow control feedback manager 1325 may receive a control message indicating that a non-numeric data to flow control feedback timing is configured in a set of data to flow control feedback timings for downlink data transmissions from a base station to the UE. The DCI manager 1330 may receive DCI activating SPS downlink data transmissions to the UE. The SPS manager 1335 may suppress receiving the SPS downlink data transmissions from the base station while the non-numeric data to flow control feedback timing is configured.

The DCI manager 1330 may receive, from a base station, first DCI scheduling a first downlink data transmission with a non-numeric data to flow control feedback timing and determine that the UE failed to receive second DCI indicating a first numeric data to flow control feedback timing for reporting flow control feedback for the first downlink data transmission. The flow control feedback manager 1325 may manage flow control feedback for the first downlink data transmission based on failing to receive the second DCI.

The DCI manager 1330 may receive, from a base station, first DCI scheduling a downlink data transmission with a non-numeric data to flow control feedback timing. The PUCCH manager 1340 may identify resources of an uplink control channel allocated for flow control feedback for a SPS downlink data transmission. The flow control feedback manager 1325 may multiplex flow control feedback for the downlink data transmission with flow control feedback for the SPS downlink data transmission in the resources of the uplink control channel.

The DCI manager 1330 may receive, from a base station, first DCI scheduling a first downlink data transmission in a first downlink data transmission group, the first DCI indicating a non-numeric data to flow control feedback timing and receive, from the base station, second DCI scheduling a second downlink data transmission in a second downlink data transmission group that is different from the first downlink data transmission group, the second DCI indicating a first numeric data to flow control feedback timing. The flow control feedback manager 1325 may report flow control feedback for the first downlink data transmission and flow control feedback for the second downlink data transmission in a first uplink control channel corresponding to the first numeric data to flow control feedback timing.

The DCI manager 1330 may receive, from a base station, DCI scheduling a downlink data transmission with a non-numeric data to flow control feedback timing. The PUCCH manager 1340 may identify one or more uplink control channels allocated within a time window for reporting flow control feedback for the downlink data transmission. The flow control feedback manager 1325 may multiplex flow control feedback for the downlink data transmission in the one or more uplink control channels allocated within the time window.

The transmitter 1345 may transmit signals generated by other components of the device 1305. In some aspects, the transmitter 1345 may be collocated with a receiver 1310 in a transceiver module. That is, the transmitter 1345 may include one or more aspects of the transceiver 1520 described with reference to FIG. 15. The transmitter 1345 may utilize a single antenna or a set of antennas.

Figure 14:
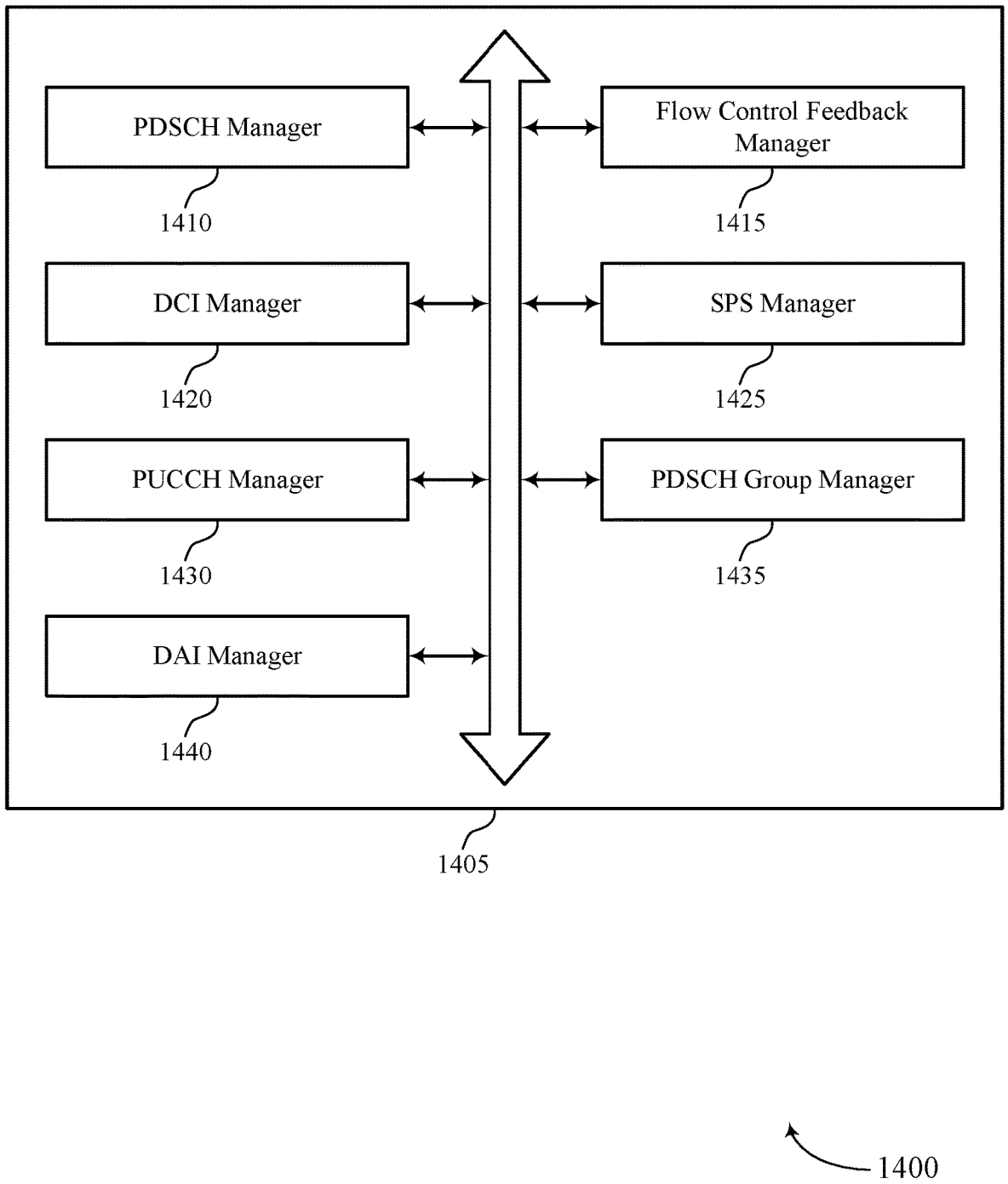
FIG. 14 shows a block diagram of a communications manager that supports handling of non-numeric data to flow control feedback timing in accordance with aspects of the present disclosure.

FIG. 14 shows a block diagram 1400 of a communications manager 1405 that supports handling of non-numeric data to flow control feedback timing in accordance with aspects of the present disclosure. The communications manager 1405 may include one or more aspects of a communications manager 1215, a communications manager 1315, or a communications manager 1510 described herein. The communications manager 1405 may include a PDSCH manager 1410, a flow control feedback manager 1415, a DCI manager 1420, a SPS manager 1425, a PUCCH manager 1430, a PDSCH group manager 1435, and a DAI manager 1440. Each of these modules may communicate, directly or indirectly, with one another (e.g., via one or more buses).

The PDSCH manager 1410 may receive, from a base station, a first downlink data transmission scheduled by first DCI indicating a non-numeric data to flow control feedback timing for the first downlink data transmission. In some aspects, the PDSCH manager 1410 may receive, from the base station, a second downlink data transmission, where respective timings of flow control feedback for the first downlink data transmission and the second downlink data transmission are out-of-order relative to respective timings of receiving the first downlink data transmission and the second downlink data transmission. The flow control feedback manager 1415 may report flow control feedback to the base station for the first downlink data transmission based on the second downlink data transmission being a SPS downlink data transmission. In some cases, the first downlink data transmission is received prior to the second downlink data transmission. In some cases, the second downlink data transmission is received prior to the first downlink data transmission.

The DCI manager 1420 may receive first DCI activating SPS downlink data transmissions from the base station. In some aspects, the DCI manager 1420 may receive second DCI indicating a non-numeric data to flow control feedback timing for a downlink data transmission. In some aspects, the PDSCH manager 1410 may suppress receiving the downlink data transmission based on the SPS downlink data transmissions being activated. In some aspects, suppressing receiving the downlink data transmission is based on the SPS downlink data transmissions and the downlink data transmission being in a same component carrier.

In some aspects, the flow control feedback manager 1415 may receive a control message indicating that a non-numeric data to flow control feedback timing is configured in a set of data to flow control feedback timings for downlink data transmissions from a base station to the UE. In some aspects, the DCI manager 1420 may receive DCI activating SPS downlink data transmissions to the UE. The SPS manager 1425 may suppress receiving the SPS downlink data transmissions from the base station while the non-numeric data to flow control feedback timing is configured. In some cases, the control message is an RRC message including the set of data to flow control feedback timings.

In some aspects, the DCI manager 1420 may receive, from a base station, first DCI scheduling a first downlink data transmission with a non-numeric data to flow control feedback timing. In some aspects, the DCI manager 1420 may determine that the UE failed to receive second DCI indicating a first numeric data to flow control feedback timing for reporting flow control feedback for the first downlink data transmission. In some aspects, the flow control feedback manager 1415 may manage flow control feedback for the first downlink data transmission based on failing to receive the second DCI.

In some aspects, the DCI manager 1420 may determine that the UE failed to receive the second DCI before a first uplink control channel that follows a duration of time configured for processing the first downlink data transmission. In some aspects, the flow control feedback manager 1415 may multiplex flow control feedback for the first downlink data transmission in the first uplink control channel. In some aspects, the flow control feedback manager 1415 may discard flow control feedback for the first downlink data transmission scheduled with the non-numeric data to flow control feedback timing based on failing to receive the second DCI.

In some aspects, the DCI manager 1420 may receive third DCI indicating a second numeric data to flow control feedback timing for reporting flow control feedback for a second downlink data transmission in a same downlink data transmission group as the first downlink data transmission. In some aspects, the flow control feedback manager 1415 may report a negative acknowledgment for the first downlink data transmission in an uplink control channel corresponding to the second numeric data to flow control feedback timing based on discarding the flow control feedback for the first downlink data transmission. In some aspects, reporting the negative acknowledgment for the first downlink data transmission is based on a new feedback indicator (NFI) for the same downlink data transmission group not being toggled in the third DCI.

In some aspects, the DCI manager 1420 may receive third DCI indicating a second numeric data to flow control feedback timing for reporting flow control feedback for the first downlink data transmission. In some aspects, the flow control feedback manager 1415 may suppress reporting flow control feedback for the first downlink data transmission in an uplink control channel corresponding to the second numeric data to flow control feedback timing based on determining that the UE failed to receive the second DCI before the first uplink control channel that follows the duration of time configured for processing the first downlink data transmission.

In some aspects, the DCI manager 1420 may receive, from a base station, first DCI scheduling a downlink data transmission with a non-numeric data to flow control feedback timing. The PUCCH manager 1430 may identify resources of an uplink control channel allocated for flow control feedback for a SPS downlink data transmission. In some aspects, the flow control feedback manager 1415 may multiplex flow control feedback for the downlink data transmission with flow control feedback for the SPS downlink data transmission in the resources of the uplink control channel. In some aspects, the DCI manager 1420 may fail to receive second DCI indicating a numeric data to flow control feedback timing that triggers the flow control feedback for the downlink data transmission before the uplink control channel, where the multiplexing is based on failing to receive the second DCI.

In some aspects, the SPS manager 1425 may receive the SPS downlink data transmission after the first DCI scheduling the downlink data transmission, where the multiplexing is based on receiving the SPS downlink data transmission after the first DCI. In some aspects, the SPS manager 1425 may receive the SPS downlink data transmission after the downlink data transmission, where the multiplexing is based on receiving the SPS downlink data transmission after the downlink data transmission. In some cases, a time between the downlink data transmission and the uplink control channel is greater than or equal to a minimum time at the UE for processing the downlink data transmission. In some cases, the downlink data transmission and the SPS downlink data transmission are received in a same component carrier or different component carriers.

In some aspects, the DCI manager 1420 may receive, from a base station, first DCI scheduling a first downlink data transmission in a first downlink data transmission group, the first DCI indicating a non-numeric data to flow control feedback timing. In some aspects, the DCI manager 1420 may receive, from the base station, second DCI scheduling a second downlink data transmission in a second downlink data transmission group that is different from the first downlink data transmission group, the second DCI indicating a first numeric data to flow control feedback timing. In some aspects, the flow control feedback manager 1415 may report flow control feedback for the first downlink data transmission and flow control feedback for the second downlink data transmission in a first uplink control channel corresponding to the first numeric data to flow control feedback timing.

The PDSCH group manager 1435 may determine that the first downlink data transmission is in the first downlink data transmission group and the second downlink data transmission group based on the first DCI indicating the non-numeric data to flow control feedback timing. In some aspects, the DCI manager 1420 may receive, from the base station, third DCI scheduling a third downlink data transmission in the first downlink data transmission group, the third DCI indicating a second numeric data to flow control feedback timing. In some aspects, the flow control feedback manager 1415 may report a negative acknowledgment for the first downlink data transmission in a second uplink control channel corresponding to the second numeric data to flow control feedback timing based on reporting the flow control feedback for the first downlink data transmission in the first uplink control channel.

The DAI manager 1440 may receive, from the base station in the first DCI, a first downlink assignment index associated with the first downlink data transmission group and a second downlink assignment index associated with the second downlink data transmission group. In some aspects, the flow control feedback manager 1415 may generate flow control feedback for one or more downlink data transmissions in the first downlink data transmission group including the first downlink data transmission based on the first downlink assignment index. In some aspects, the flow control feedback manager 1415 may generate flow control feedback for one or more downlink data transmissions in the second downlink data transmission group including the first downlink data transmission and the second downlink data transmission based on the second downlink assignment index.

In some aspects, the DAI manager 1440 may receive, from the base station in the first DCI, a maximum of a first downlink assignment index associated with the first downlink data transmission group and a second downlink assignment associated with the second downlink data transmission group. In some aspects, the flow control feedback manager 1415 may generate flow control feedback for one or more downlink data transmissions in the first downlink data transmission group including the first downlink data transmission based on the maximum of the first downlink assignment index and the second downlink assignment index. In some aspects, the flow control feedback manager 1415 may generate flow control feedback for one or more downlink data transmissions in the second downlink data transmission group including the first downlink data transmission and the second downlink data transmission based on the maximum of the first downlink assignment index and the second downlink assignment index. In some aspects, the PDSCH manager 1410 may receive the first downlink data transmission and the second downlink data transmission in a same component carrier.

In some aspects, the DCI manager 1420 may receive, from a base station, DCI scheduling a downlink data transmission with a non-numeric data to flow control feedback timing. In some aspects, the PUCCH manager 1430 may identify one or more uplink control channels allocated within a time window for reporting flow control feedback for the downlink data transmission. In some aspects, the flow control feedback manager 1415 may multiplex flow control feedback for the downlink data transmission in the one or more uplink control channels allocated within the time window. In some aspects, the PUCCH manager 1430 may receive, from the base station, a control message indicating the time window for reporting flow control feedback. In some cases, the time window for reporting flow control feedback is after a duration of time configured for processing the downlink data transmission. In some aspects, the flow control feedback manager 1415 may multiplex the flow control feedback for the downlink data transmission in a set of uplink control channels allocated within the time window.

Figure 15:
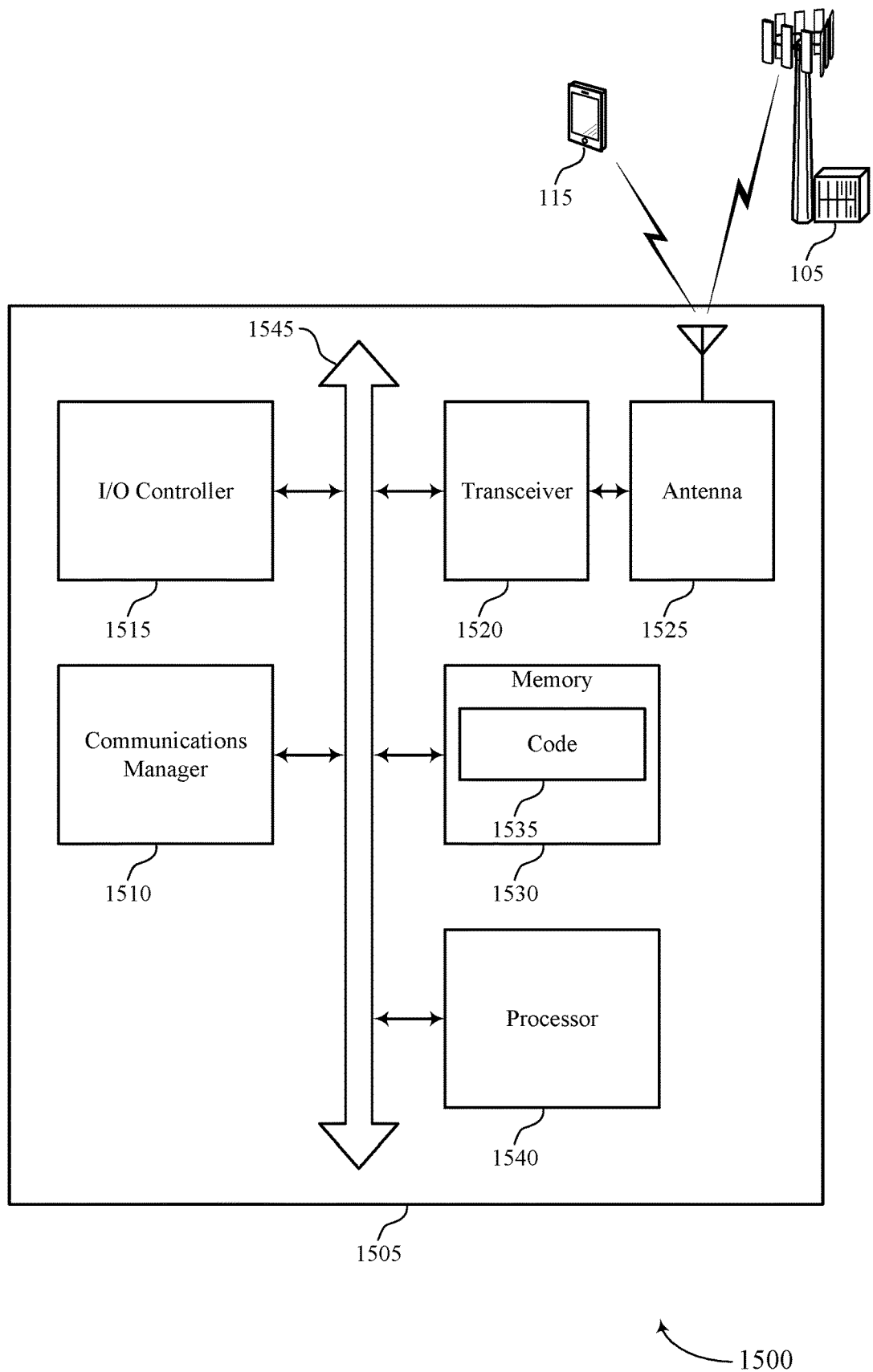
FIG. 15 shows a diagram of a system including a device that supports handling of non-numeric data to flow control feedback timing in accordance with aspects of the present disclosure.

FIG. 15 shows a diagram of a system 1500 including a device 1505 that supports handling of non-numeric data to flow control feedback timing in accordance with aspects of the present disclosure. The device 1505 may be an aspect of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may receive, from a base station, a first downlink data transmission scheduled by first DCI indicating a non-numeric data to flow control feedback timing for the first downlink data transmission, receive, from the base station, a second downlink data transmission, where respective timings of flow control feedback for the first downlink data transmission and the second downlink data transmission are out-of-order relative to respective timings of receiving the first downlink data transmission and the second downlink data transmission, and report flow control feedback to the base station for the first downlink data transmission based on the second downlink data transmission being a SPS downlink data transmission.

The communications manager 1510 may also receive first DCI activating SPS downlink data transmissions from the base station, receive second DCI indicating a non-numeric data to flow control feedback timing for a downlink data transmission, and suppress receiving the downlink data transmission based on the SPS downlink data transmissions being activated.

The communications manager 1510 may also receive a control message indicating that a non-numeric data to flow control feedback timing is configured in a set of data to flow control feedback timings for downlink data transmissions from a base station to the UE, receive DCI activating SPS downlink data transmissions to the UE, and suppress receiving the SPS downlink data transmissions from the base station while the non-numeric data to flow control feedback timing is configured.

The communications manager 1510 may also receive, from a base station, first DCI scheduling a first downlink data transmission with a non-numeric data to flow control feedback timing, determine that the UE failed to receive second DCI indicating a first numeric data to flow control feedback timing for reporting flow control feedback for the first downlink data transmission, and manage flow control feedback for the first downlink data transmission based on failing to receive the second DCI.

The communications manager 1510 may also receive, from a base station, first DCI scheduling a downlink data transmission with a non-numeric data to flow control feedback timing, identify resources of an uplink control channel allocated for flow control feedback for a SPS downlink data transmission, and multiplex flow control feedback for the downlink data transmission with flow control feedback for the SPS downlink data transmission in the resources of the uplink control channel.

The communications manager 1510 may also receive, from a base station, first DCI scheduling a first downlink data transmission in a first downlink data transmission group, the first DCI indicating a non-numeric data to flow control feedback timing, receive, from the base station, second DCI scheduling a second downlink data transmission in a second downlink data transmission group that is different from the first downlink data transmission group, the second DCI indicating a first numeric data to flow control feedback timing, and report flow control feedback for the first downlink data transmission and flow control feedback for the second downlink data transmission in a first uplink control channel corresponding to the first numeric data to flow control feedback timing.

The communications manager 1510 may also receive, from a base station, DCI scheduling a downlink data transmission with a non-numeric data to flow control feedback timing, identify one or more uplink control channels allocated within a time window for reporting flow control feedback for the downlink data transmission, and multiplex flow control feedback for the downlink data transmission in the one or more uplink control channels allocated within the time window.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. In accordance with some aspects, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting handling of non-numeric data to flow control feedback timing).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
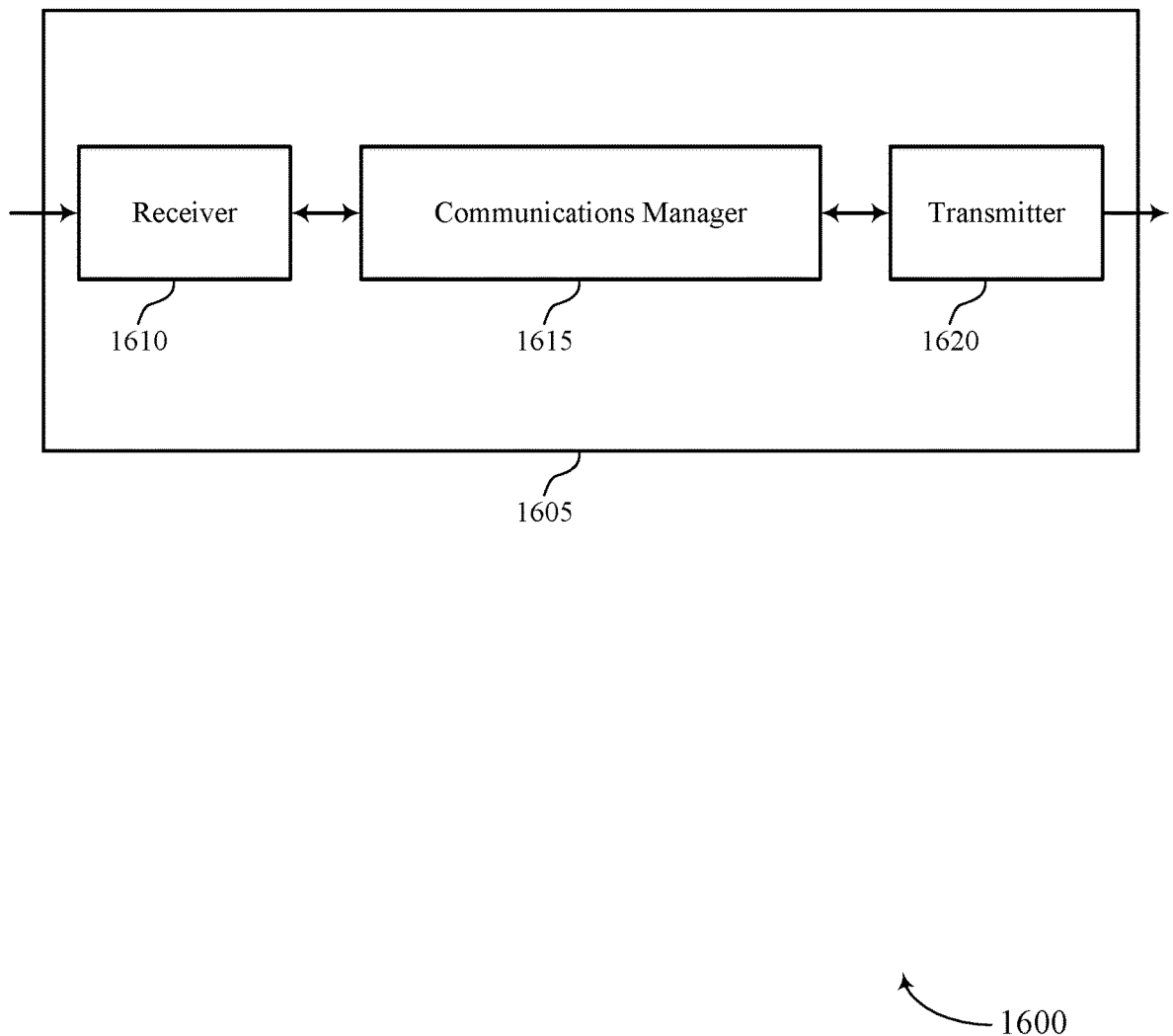
FIGS. 16 and 17 show block diagrams of devices that support handling of non-numeric data to flow control feedback timing in accordance with aspects of the present disclosure.

FIG. 16 shows a block diagram 1600 of a device 1605 that supports handling of non-numeric data to flow control feedback timing in accordance with aspects of the present disclosure. The device 1605 may include one or more aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to handling of non-numeric data to flow control feedback timing, etc.). Information may be passed on to other components of the device 1605. The receiver 1610 may include one or more aspects of the transceiver 1920 described with reference to FIG. 19. The receiver 1610 may utilize a single antenna or a set of antennas.

The communications manager 1615 may transmit, to a UE, a first downlink data transmission scheduled by first DCI indicating a non-numeric data to flow control feedback timing for the first downlink data transmission, transmit, to the UE, a second downlink data transmission, where respective timings of flow control feedback for the first downlink data transmission and the second downlink data transmission are out-of-order relative to respective timings of transmitting the first downlink data transmission and the second downlink data transmission, and receive flow control feedback from the UE for the first downlink data transmission based on the second downlink data transmission being a SPS downlink data transmission.

The communications manager 1615 may also transmit DCI activating SPS downlink data transmissions to a UE and suppress scheduling downlink data transmissions with non-numeric data to flow control feedback timings while the SPS downlink data transmissions are activated.

The communications manager 1615 may also transmit a control message indicating that a non-numeric data to flow control feedback timing is configured in a set of data to flow control feedback timings for downlink data transmissions from the base station to the UE and suppress activating SPS downlink data transmissions to the UE while the non-numeric data to flow control feedback timing is configured.

The communications manager 1615 may also transmit, to a UE, first DCI scheduling a first downlink data transmission in a first downlink data transmission group, the first DCI indicating a non-numeric data to flow control feedback timing, transmit, to the UE, second DCI scheduling a second downlink data transmission in a second downlink data transmission group that is different from the first downlink data transmission group, the second DCI indicating a first numeric data to flow control feedback timing, and receive flow control feedback for the first downlink data transmission and flow control feedback for the second downlink data transmission in a first uplink control channel corresponding to the first numeric data to flow control feedback timing.

The communications manager 1615 may also transmit, to a UE, DCI scheduling a downlink data transmission with a non-numeric data to flow control feedback timing, identify one or more uplink control channels allocated within a time window for the UE to report flow control feedback for the downlink data transmission, and monitor for flow control feedback for the downlink data transmission in the one or more uplink control channels allocated within the time window. The communications manager 1615 may include one or more aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some aspects, the communications manager 1615, or its sub-components, may be a separate and distinct component in accordance with various aspects of the present disclosure. In some aspects, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some aspects, the transmitter 1620 may be collocated with a receiver 1610 in a transceiver module. That is, the transmitter 1620 may include one or more aspects of the transceiver 1920 described with reference to FIG. 19. The transmitter 1620 may utilize a single antenna or a set of antennas.

Figure 17:
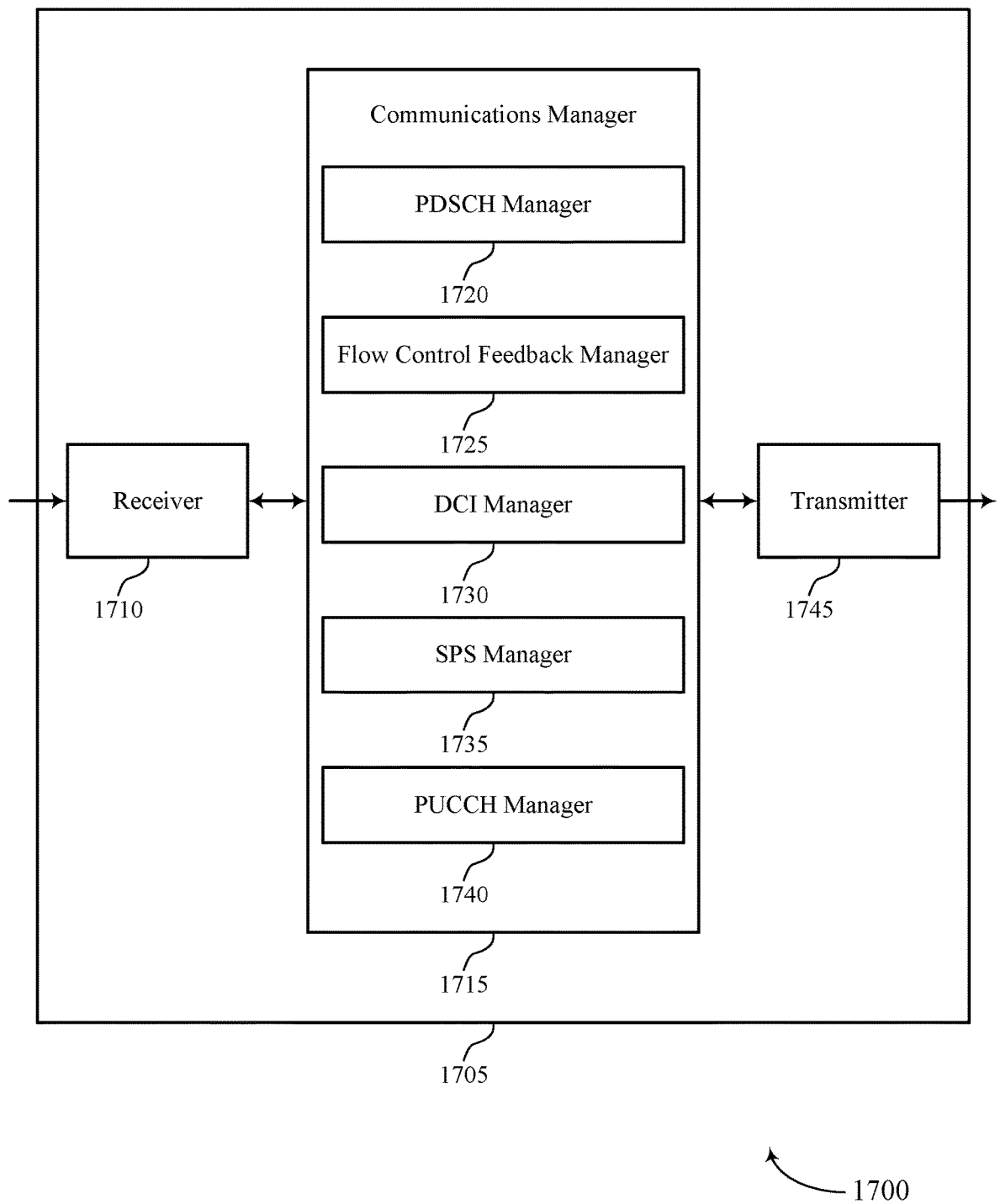

FIG. 17 shows a block diagram 1700 of a device 1705 that supports handling of non-numeric data to flow control feedback timing in accordance with aspects of the present disclosure. The device 1705 may include one or more aspects of a device 1605, or a base station 105 as described herein. The device 1705 may include a receiver 1710, a communications manager 1715, and a transmitter 1745. The device 1705 may also include a processor. Each of these components may be in communication with one another (e.g., via one or more buses).

The receiver 1710 may receive information such as packets, user data, or control information associated with various information channels (e.g., control channels, data channels, and information related to handling of non-numeric data to flow control feedback timing, etc.). Information may be passed on to other components of the device 1705. The receiver 1710 may include one or more aspects of the transceiver 1920 described with reference to FIG. 19. The receiver 1710 may utilize a single antenna or a set of antennas.

The communications manager 1715 may include one or more aspects of the communications manager 1615 as described herein. The communications manager 1715 may include a PDSCH manager 1720, a flow control feedback manager 1725, a DCI manager 1730, a SPS manager 1735, and a PUCCH manager 1740. The communications manager 1715 may include one or more aspects of the communications manager 1910 described herein.

The PDSCH manager 1720 may transmit, to a UE, a first downlink data transmission scheduled by first DCI indicating a non-numeric data to flow control feedback timing for the first downlink data transmission and transmit, to the UE, a second downlink data transmission, where respective timings of flow control feedback for the first downlink data transmission and the second downlink data transmission are out-of-order relative to respective timings of transmitting the first downlink data transmission and the second downlink data transmission. The flow control feedback manager 1725 may receive flow control feedback from the UE for the first downlink data transmission based on the second downlink data transmission being a SPS downlink data transmission.

The DCI manager 1730 may transmit DCI activating SPS downlink data transmissions to a UE. The PDSCH manager 1720 may suppress scheduling downlink data transmissions with non-numeric data to flow control feedback timings while the SPS downlink data transmissions are activated.

The flow control feedback manager 1725 may transmit a control message indicating that a non-numeric data to flow control feedback timing is configured in a set of data to flow control feedback timings for downlink data transmissions from the base station to the UE. The SPS manager 1735 may suppress activating SPS downlink data transmissions to the UE while the non-numeric data to flow control feedback timing is configured.

The DCI manager 1730 may transmit, to a UE, first DCI scheduling a first downlink data transmission in a first downlink data transmission group, the first DCI indicating a non-numeric data to flow control feedback timing and transmit, to the UE, second DCI scheduling a second downlink data transmission in a second downlink data transmission group that is different from the first downlink data transmission group, the second DCI indicating a first numeric data to flow control feedback timing. The flow control feedback manager 1725 may receive flow control feedback for the first downlink data transmission and flow control feedback for the second downlink data transmission in a first uplink control channel corresponding to the first numeric data to flow control feedback timing.

The DCI manager 1730 may transmit, to a UE, DCI scheduling a downlink data transmission with a non-numeric data to flow control feedback timing. The PUCCH manager 1740 may identify one or more uplink control channels allocated within a time window for the UE to report flow control feedback for the downlink data transmission. The flow control feedback manager 1725 may monitor for flow control feedback for the downlink data transmission in the one or more uplink control channels allocated within the time window.

The transmitter 1745 may transmit signals generated by other components of the device 1705. In some aspects, the transmitter 1745 may be collocated with a receiver 1710 in a transceiver module. That is, the transmitter 1745 may include one or more aspects of the transceiver 1920 described with reference to FIG. 19. The transmitter 1745 may utilize a single antenna or a set of antennas.

Figure 18:
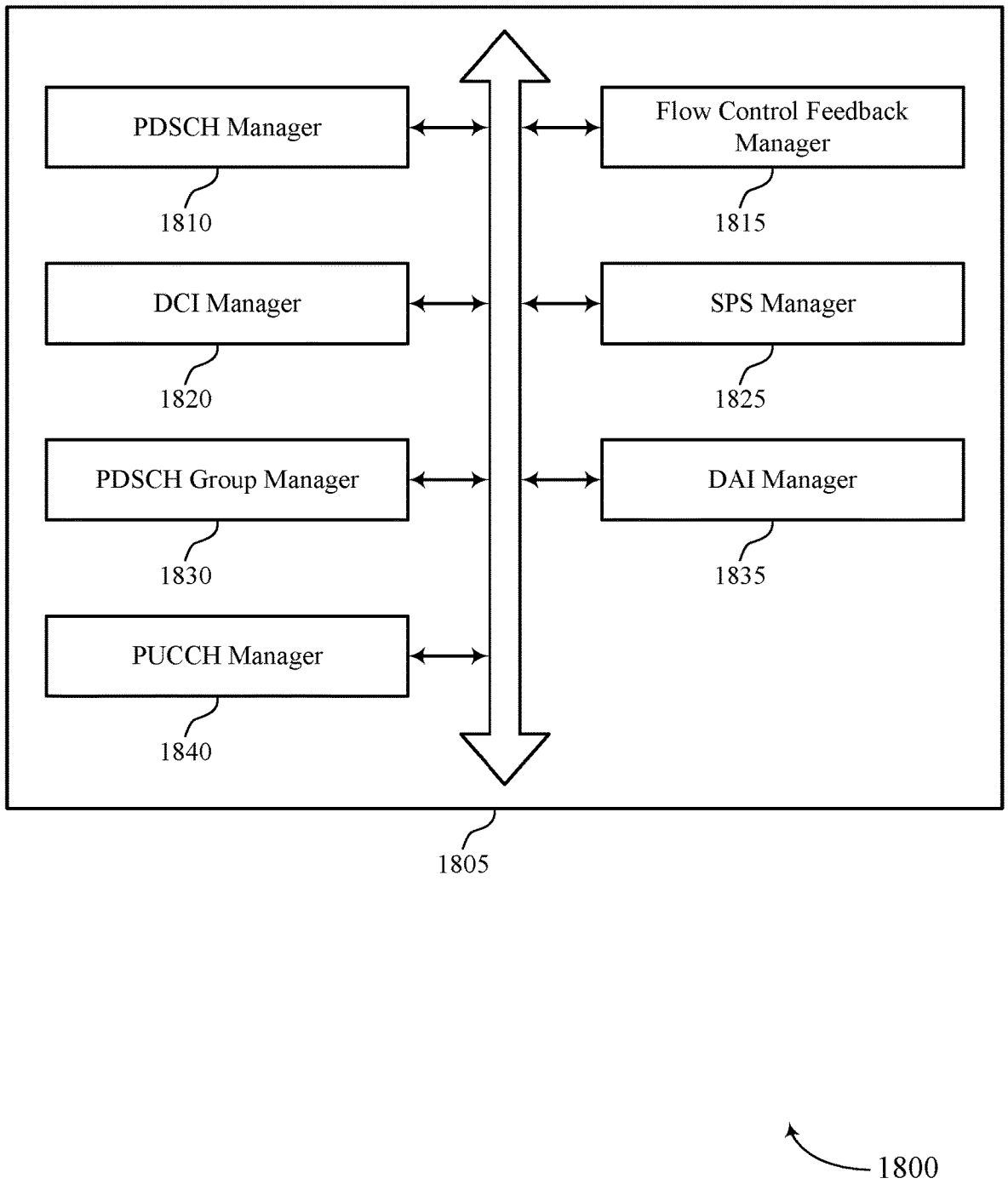
FIG. 18 shows a block diagram of a communications manager that supports handling of non-numeric data to flow control feedback timing in accordance with aspects of the present disclosure.

FIG. 18 shows a block diagram 1800 of a communications manager 1805 that supports handling of non-numeric data to flow control feedback timing in accordance with aspects of the present disclosure. The communications manager 1805 may include one or more aspects of a communications manager 1615, a communications manager 1715, or a communications manager 1910 described herein. The communications manager 1805 may include a PDSCH manager 1810, a flow control feedback manager 1815, a DCI manager 1820, a SPS manager 1825, a PDSCH group manager 1830, a DAI manager 1835, and a PUCCH manager 1840. Each of these modules may communicate, directly or indirectly, with one another (e.g., via one or more buses).

The PDSCH manager 1810 may transmit, to a UE, a first downlink data transmission scheduled by first DCI indicating a non-numeric data to flow control feedback timing for the first downlink data transmission. In some aspects, the PDSCH manager 1810 may transmit, to the UE, a second downlink data transmission, where respective timings of flow control feedback for the first downlink data transmission and the second downlink data transmission are out-of-order relative to respective timings of transmitting the first downlink data transmission and the second downlink data transmission. The flow control feedback manager 1815 may receive flow control feedback from the UE for the first downlink data transmission based on the second downlink data transmission being a SPS downlink data transmission. In some cases, the first downlink data transmission is transmitted prior to the second downlink data transmission. In some cases, the second downlink data transmission is transmitted prior to the first downlink data transmission.

The DCI manager 1820 may transmit DCI activating SPS downlink data transmissions to a UE. In some aspects, the PDSCH manager 1810 may suppress scheduling downlink data transmissions with non-numeric data to flow control feedback timings while the SPS downlink data transmissions are activated. In some aspects, the PDSCH manager 1810 may suppress scheduling the downlink data transmissions within a same component carrier as the activated SPS downlink data transmissions. In some aspects, the flow control feedback manager 1815 may transmit a control message indicating that a non-numeric data to flow control feedback timing is configured in a set of data to flow control feedback timings for downlink data transmissions from the base station to the UE. The SPS manager 1825 may suppress activating SPS downlink data transmissions to the UE while the non-numeric data to flow control feedback timing is configured. In some cases, the control message is an RRC message including the set of data to flow control feedback timings.

In some aspects, the DCI manager 1820 may transmit, to a UE, first DCI scheduling a first downlink data transmission in a first downlink data transmission group, the first DCI indicating a non-numeric data to flow control feedback timing. In some aspects, the DCI manager 1820 may transmit, to the UE, second DCI scheduling a second downlink data transmission in a second downlink data transmission group that is different from the first downlink data transmission group, the second DCI indicating a first numeric data to flow control feedback timing. In some aspects, the flow control feedback manager 1815 may receive flow control feedback for the first downlink data transmission and flow control feedback for the second downlink data transmission in a first uplink control channel corresponding to the first numeric data to flow control feedback timing.

The PDSCH group manager 1830 may determine that the first downlink data transmission is in the first downlink data transmission group and the second downlink data transmission group based on the first DCI indicating the non-numeric data to flow control feedback timing. In some aspects, the DCI manager 1820 may transmit, to the UE, third DCI scheduling a third downlink data transmission in the first downlink data transmission group, the third DCI indicating a second numeric data to flow control feedback timing. In some aspects, the flow control feedback manager 1815 may receive a negative acknowledgment for the first downlink data transmission in a second uplink control channel corresponding to the second numeric data to flow control feedback timing based on receiving the flow control feedback for the first downlink data transmission in the first uplink control channel.

The DAI manager 1835 may increment a first downlink assignment index associated with the first downlink data transmission group and a second downlink assignment index associated with the second downlink data transmission group based on indicating the non-numeric data to flow control feedback timing in the first DCI. In some aspects, the DAI manager 1835 may transmit the first downlink assignment index and the second downlink assignment index to the UE in the first DCI. In some aspects, the DAI manager 1835 may transmit a maximum of the first downlink assignment index and the second downlink assignment index to the UE in the first DCI. In some aspects, the PDSCH manager 1810 may transmit the first downlink data transmission and the second downlink data transmission in a same component carrier.

In some aspects, the DCI manager 1820 may transmit, to a UE, DCI scheduling a downlink data transmission with a non-numeric data to flow control feedback timing. The PUCCH manager 1840 may identify one or more uplink control channels allocated within a time window for the UE to report flow control feedback for the downlink data transmission. In some aspects, the flow control feedback manager 1815 may monitor for flow control feedback for the downlink data transmission in the one or more uplink control channels allocated within the time window.

In some aspects, the PUCCH manager 1840 may transmit, to the UE, a control message indicating the time window for reporting flow control feedback. In some cases, the time window for reporting flow control feedback is after a duration of time configured for the UE to process the downlink data transmission. In some aspects, the flow control feedback manager 1815 may monitor for the flow control feedback for the downlink data transmission in a set of uplink control channels allocated within the time window.

Figure 19:
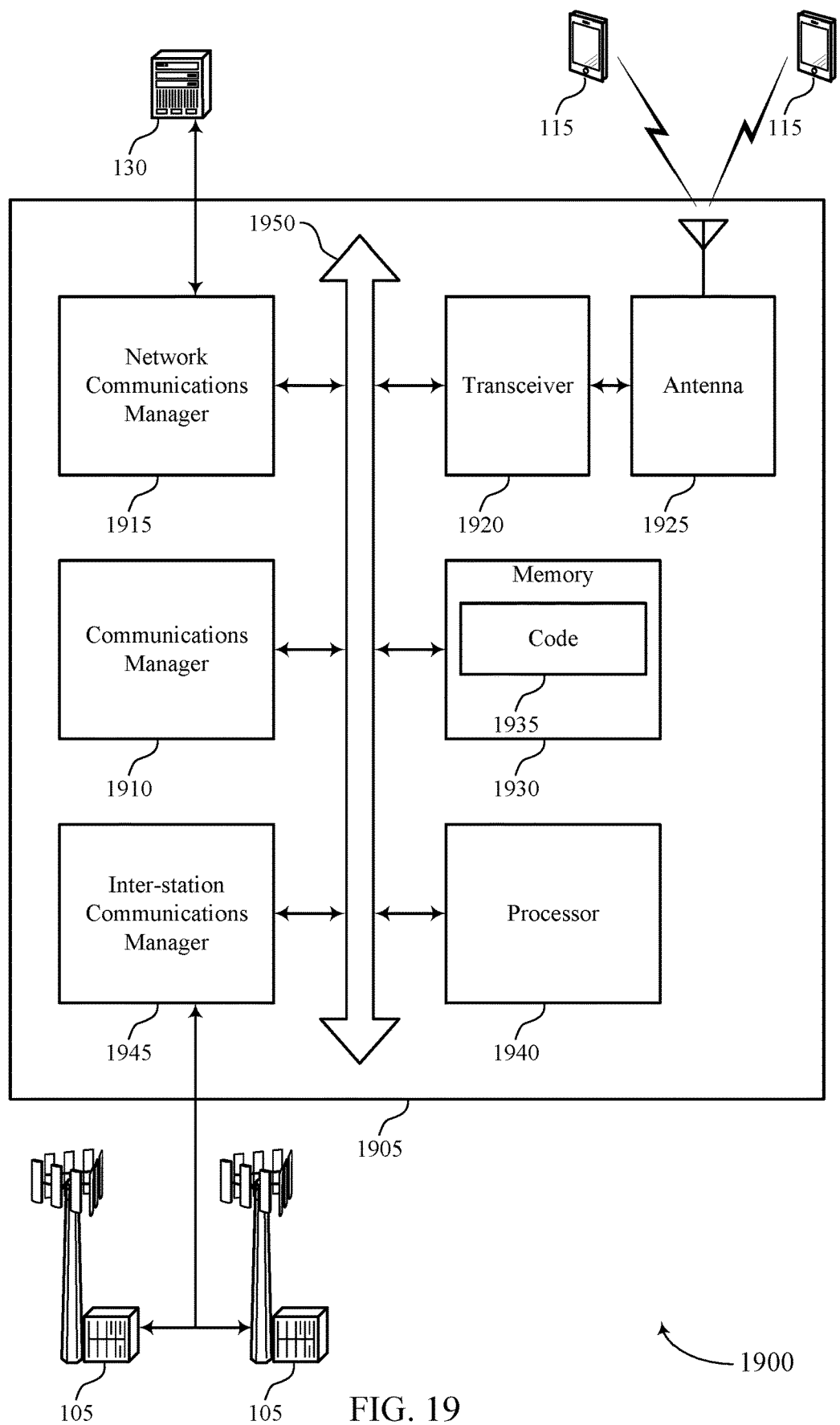
FIG. 19 shows a diagram of a system including a device that supports handling of non-numeric data to flow control feedback timing in accordance with aspects of the present disclosure.

FIG. 19 shows a diagram of a system 1900 including a device 1905 that supports handling of non-numeric data to flow control feedback timing in accordance with aspects of the present disclosure. The device 1905 may include one or more aspects of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may transmit, to a UE, a first downlink data transmission scheduled by first DCI indicating a non-numeric data to flow control feedback timing for the first downlink data transmission, transmit, to the UE, a second downlink data transmission, where respective timings of flow control feedback for the first downlink data transmission and the second downlink data transmission are out-of-order relative to respective timings of transmitting the first downlink data transmission and the second downlink data transmission, and receive flow control feedback from the UE for the first downlink data transmission based on the second downlink data transmission being a SPS downlink data transmission.

The communications manager 1910 may also transmit DCI activating SPS downlink data transmissions to a UE and suppress scheduling downlink data transmissions with non-numeric data to flow control feedback timings while the SPS downlink data transmissions are activated.

The communications manager 1910 may also transmit a control message indicating that a non-numeric data to flow control feedback timing is configured in a set of data to flow control feedback timings for downlink data transmissions from the base station to the UE and suppress activating SPS downlink data transmissions to the UE while the non-numeric data to flow control feedback timing is configured.

The communications manager 1910 may also transmit, to a UE, first DCI scheduling a first downlink data transmission in a first downlink data transmission group, the first DCI indicating a non-numeric data to flow control feedback timing, transmit, to the UE, second DCI scheduling a second downlink data transmission in a second downlink data transmission group that is different from the first downlink data transmission group, the second DCI indicating a first numeric data to flow control feedback timing, and receive flow control feedback for the first downlink data transmission and flow control feedback for the second downlink data transmission in a first uplink control channel corresponding to the first numeric data to flow control feedback timing.

The communications manager 1910 may also transmit, to a UE, DCI scheduling a downlink data transmission with a non-numeric data to flow control feedback timing, identify one or more uplink control channels allocated within a time window for the UE to report flow control feedback for the downlink data transmission, and monitor for flow control feedback for the downlink data transmission in the one or more uplink control channels allocated within the time window.

The network communications manager 1915 may manage communications with the core network (e.g., via one or more wired backhaul links). In accordance with some aspects, the network communications manager 1915 may manage the transfer of data communications for client devices, such as one or more UEs 115.

The transceiver 1920 may communicate bi-directionally, via one or more antennas, wired, or wireless links as described above. In accordance with some aspects, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting handling of non-numeric data to flow control feedback timing).

The inter-station communications manager 1945 may manage communications with other base station 105, and may include a controller or scheduler for controlling communications with UEs 115 in cooperation with other base stations 105. In accordance with some aspects, the inter-station communications manager 1945 may coordinate scheduling for transmissions to UEs 115 for various interference mitigation techniques such as beamforming or joint transmission. In some aspects, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
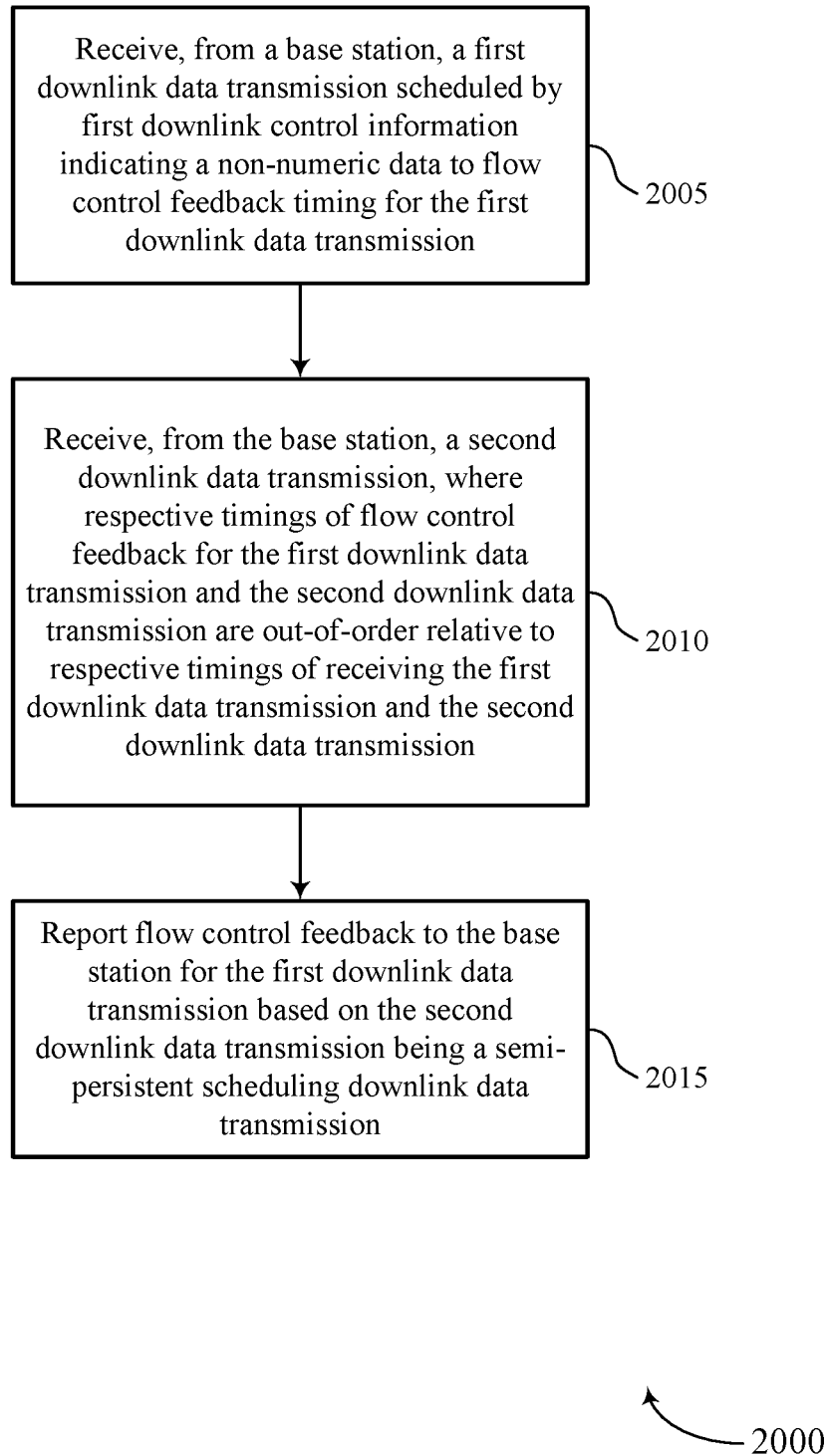
FIGS. 20 through 31 show flowcharts illustrating methods that support handling of non-numeric data to flow control feedback timing in accordance with aspects of the present disclosure.

FIG. 20 shows a flowchart illustrating a method 2000 that supports handling of non-numeric data to flow control feedback timing in accordance with aspects of the present disclosure. The operations of method 2000 may be implemented by a UE 115 or its components as described herein. In accordance with some aspects, the operations of method 2000 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2005, the UE may receive, from a base station, a first downlink data transmission scheduled by first DCI indicating a non-numeric data to flow control feedback timing for the first downlink data transmission. The operations of 2005 may be performed according to the methods described herein. In some aspects, aspects of the operations of 2005 may be performed by a PDSCH manager as described with reference to FIGS. 12 through 15.

At 2010, the UE may receive, from the base station, a second downlink data transmission, where respective timings of flow control feedback for the first downlink data transmission and the second downlink data transmission are out-of-order relative to respective timings of receiving the first downlink data transmission and the second downlink data transmission. The operations of 2010 may be performed according to the methods described herein. In some non-limiting implementations, aspects of the operations of 2010 may be performed by a PDSCH manager as described with reference to FIGS. 12 through 15.

At 2015, the UE may report flow control feedback to the base station for the first downlink data transmission based on the second downlink data transmission being a SPS downlink data transmission. The operations of 2015 may be performed according to the methods described herein. In some non-limiting implementations, aspects of the operations of 2015 may be performed by a flow control feedback manager as described with reference to FIGS. 12 through 15.

Figure 21:
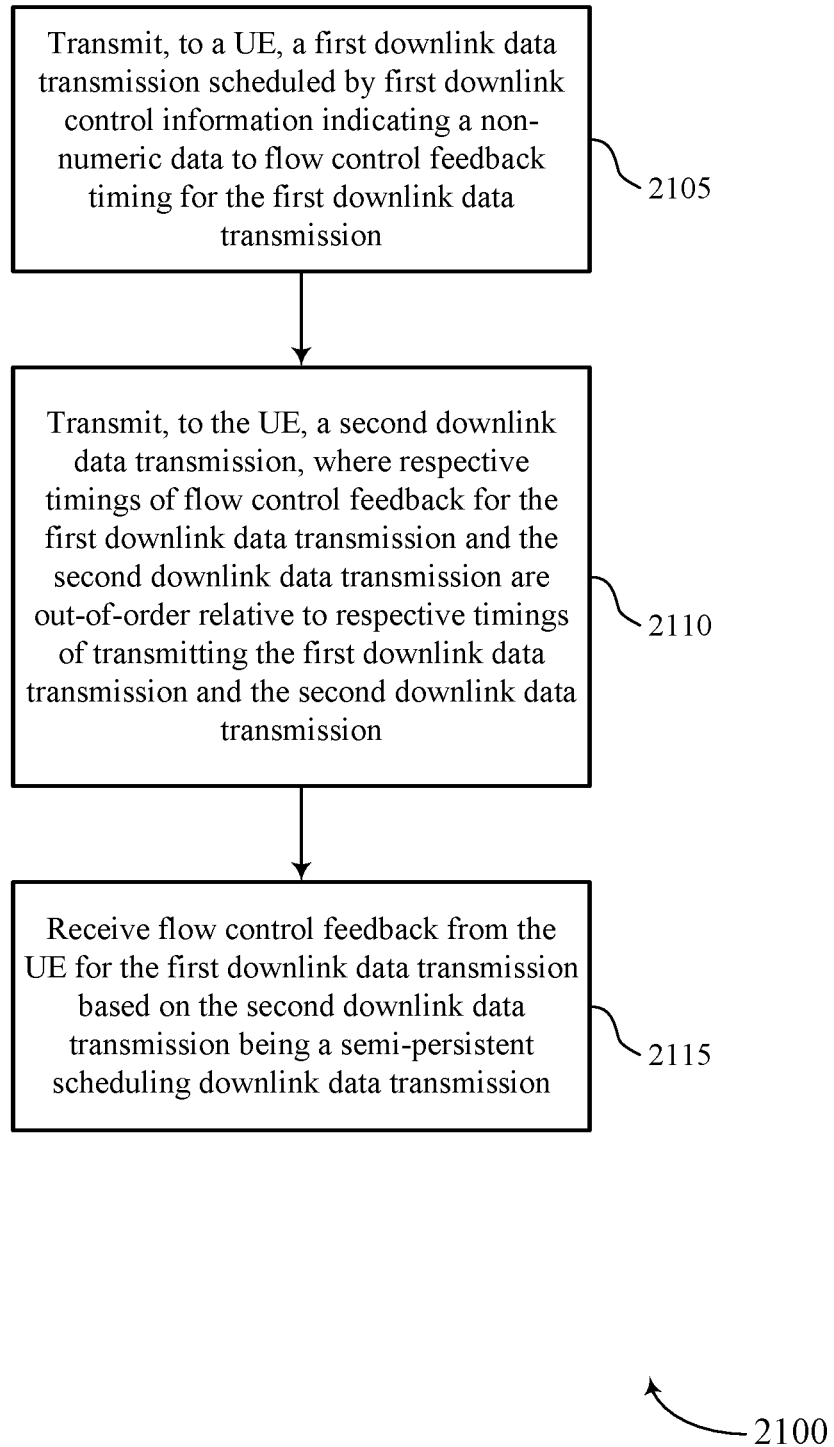

FIG. 21 shows a flowchart illustrating a method 2100 that supports handling of non-numeric data to flow control feedback timing in accordance with aspects of the present disclosure. The operations of method 2100 may be implemented by a base station 105 or its components as described herein. In accordance with some aspects, the operations of method 2100 may be performed by a communications manager as described with reference to FIGS. 16 through 19. In some aspects, a base station may execute a set of instructions to control the functional elements of the base station to perform the functions described below. Additionally, or alternatively, a base station may perform aspects of the functions described below using special-purpose hardware.

At 2105, the base station may transmit, to a UE, a first downlink data transmission scheduled by first DCI indicating a non-numeric data to flow control feedback timing for the first downlink data transmission. The operations of 2105 may be performed according to the methods described herein. In some aspects, aspects of the operations of 2105 may be performed by a PDSCH manager as described with reference to FIGS. 16 through 19.

At 2110, the base station may transmit, to the UE, a second downlink data transmission, where respective timings of flow control feedback for the first downlink data transmission and the second downlink data transmission are out-of-order relative to respective timings of transmitting the first downlink data transmission and the second downlink data transmission. The operations of 2110 may be performed according to the methods described herein. In some aspects, aspects of the operations of 2110 may be performed by a PDSCH manager as described with reference to FIGS. 16 through 19.

At 2115, the base station may receive flow control feedback from the UE for the first downlink data transmission based on the second downlink data transmission being a SPS downlink data transmission. The operations of 2115 may be performed according to the methods described herein. In some aspects, aspects of the operations of 2115 may be performed by a flow control feedback manager as described with reference to FIGS. 16 through 19.

Figure 22:
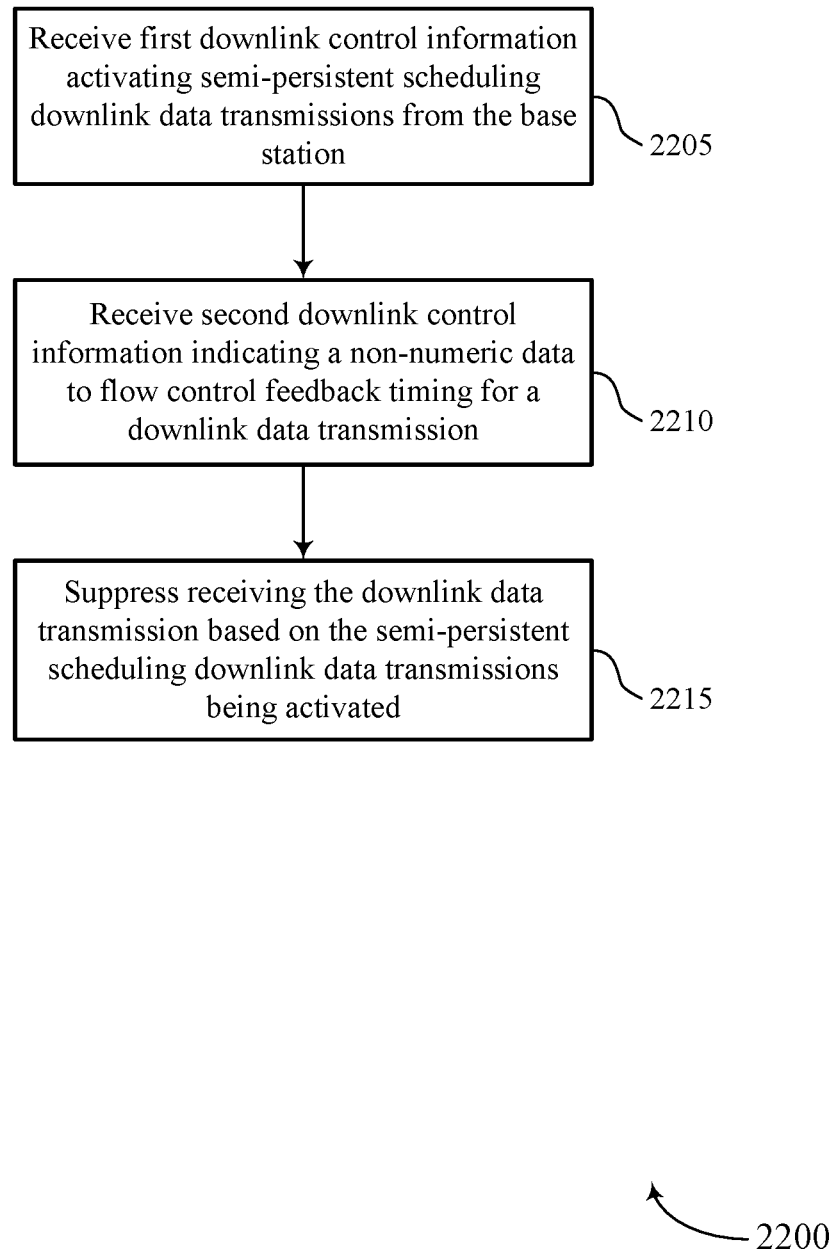

FIG. 22 shows a flowchart illustrating a method 2200 that supports handling of non-numeric data to flow control feedback timing in accordance with aspects of the present disclosure. The operations of method 2200 may be implemented by a UE 115 or its components as described herein. In accordance with some aspects, the operations of method 2200 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2205, the UE may receive first DCI activating SPS downlink data transmissions from the base station. The operations of 2205 may be performed according to the methods described herein. In some non-limiting implementations, aspects of the operations of 2205 may be performed by a DCI manager as described with reference to FIGS. 12 through 15.

At 2210, the UE may receive second DCI indicating a non-numeric data to flow control feedback timing for a downlink data transmission. The operations of 2210 may be performed according to the methods described herein. In some non-limiting implementations, aspects of the operations of 2210 may be performed by a DCI manager as described with reference to FIGS. 12 through 15.

At 2215, the UE may suppress receiving the downlink data transmission based on the SPS downlink data transmissions being activated. The operations of 2215 may be performed according to the methods described herein. In some non-limiting implementations, aspects of the operations of 2215 may be performed by a PDSCH manager as described with reference to FIGS. 12 through 15.

Figure 23:
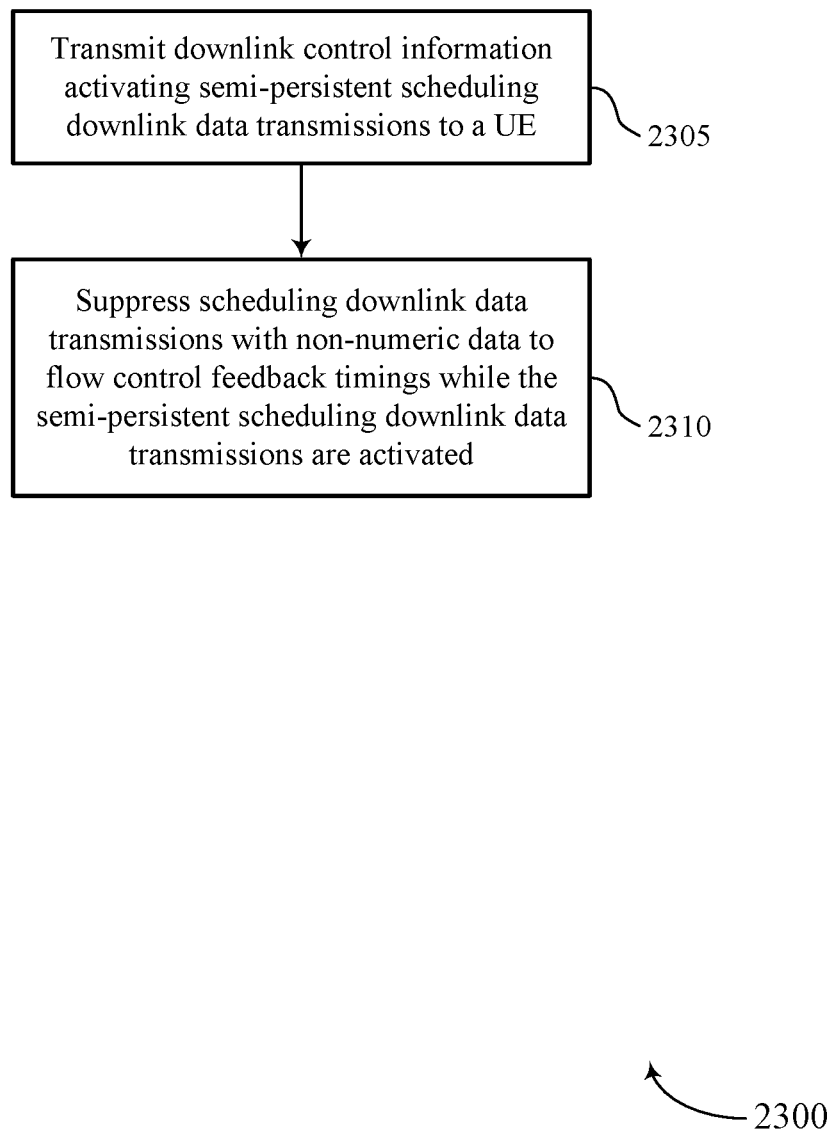

FIG. 23 shows a flowchart illustrating a method 2300 that supports handling of non-numeric data to flow control feedback timing in accordance with aspects of the present disclosure. The operations of method 2300 may be implemented by a base station 105 or its components as described herein. In accordance with some aspects, the operations of method 2300 may be performed by a communications manager as described with reference to FIGS. 16 through 19. In some aspects, a base station may execute a set of instructions to control the functional elements of the base station to perform the functions described below. Additionally, or alternatively, a base station may perform aspects of the functions described below using special-purpose hardware.

At 2305, the base station may transmit DCI activating SPS downlink data transmissions to a UE. The operations of 2305 may be performed according to the methods described herein. In some non-limiting implementations, aspects of the operations of 2305 may be performed by a DCI manager as described with reference to FIGS. 16 through 19.

At 2310, the base station may suppress scheduling downlink data transmissions with non-numeric data to flow control feedback timings while the SPS downlink data transmissions are activated. The operations of 2310 may be performed according to the methods described herein. In some non-limiting implementations, aspects of the operations of 2310 may be performed by a PDSCH manager as described with reference to FIGS. 16 through 19.

Figure 24:
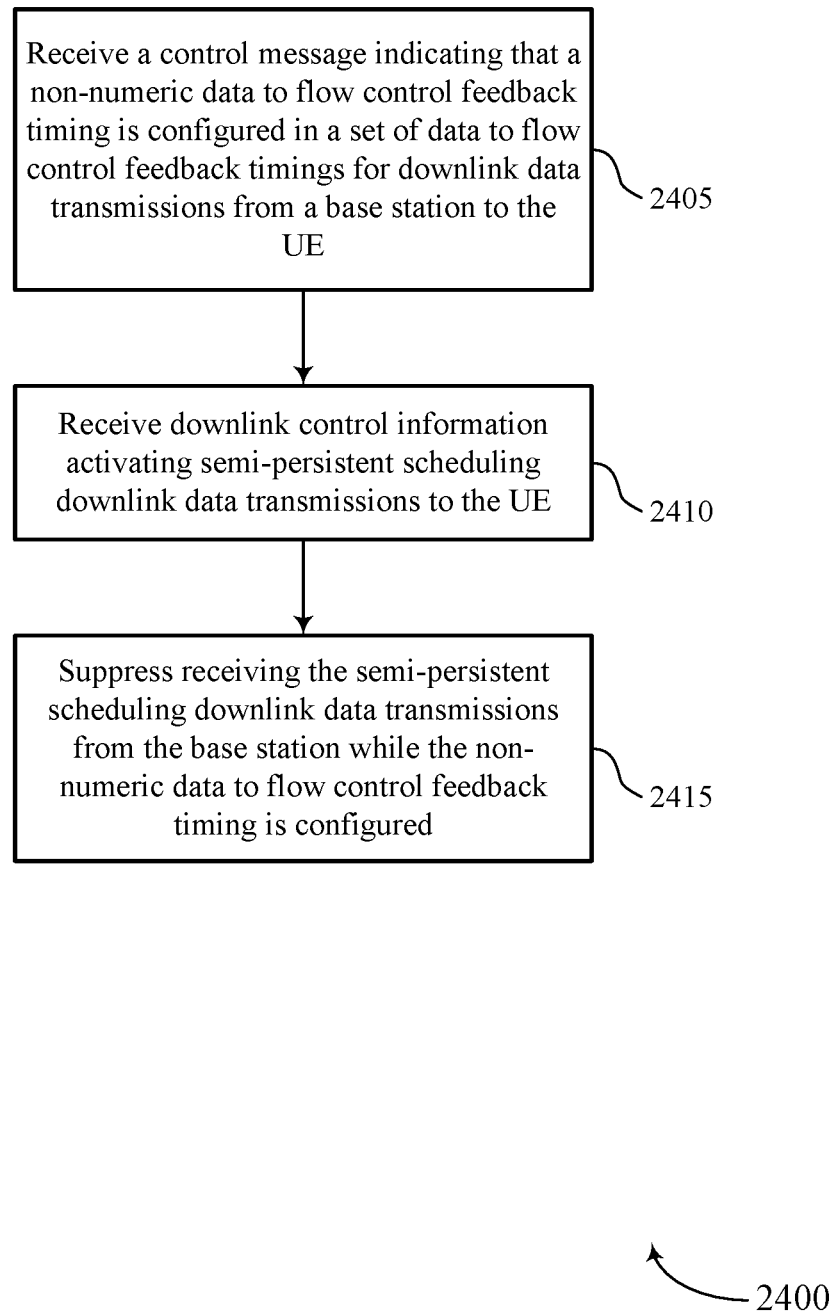

FIG. 24 shows a flowchart illustrating a method 2400 that supports handling of non-numeric data to flow control feedback timing in accordance with aspects of the present disclosure. The operations of method 2400 may be implemented by a UE 115 or its components as described herein. In accordance with some aspects, the operations of method 2400 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2405, the UE may receive a control message indicating that a non-numeric data to flow control feedback timing is configured in a set of data to flow control feedback timings for downlink data transmissions from a base station to the UE. The operations of 2405 may be performed according to the methods described herein. In some non-limiting implementations, aspects of the operations of 2405 may be performed by a flow control feedback manager as described with reference to FIGS. 12 through 15.

At 2410, the UE may receive DCI activating SPS downlink data transmissions to the UE. The operations of 2410 may be performed according to the methods described herein. In some non-limiting implementations, aspects of the operations of 2410 may be performed by a DCI manager as described with reference to FIGS. 12 through 15.

At 2415, the UE may suppress receiving the SPS downlink data transmissions from the base station while the non-numeric data to flow control feedback timing is configured. The operations of 2415 may be performed according to the methods described herein. In some non-limiting implementations, aspects of the operations of 2415 may be performed by a SPS manager as described with reference to FIGS. 12 through 15.

Figure 25:
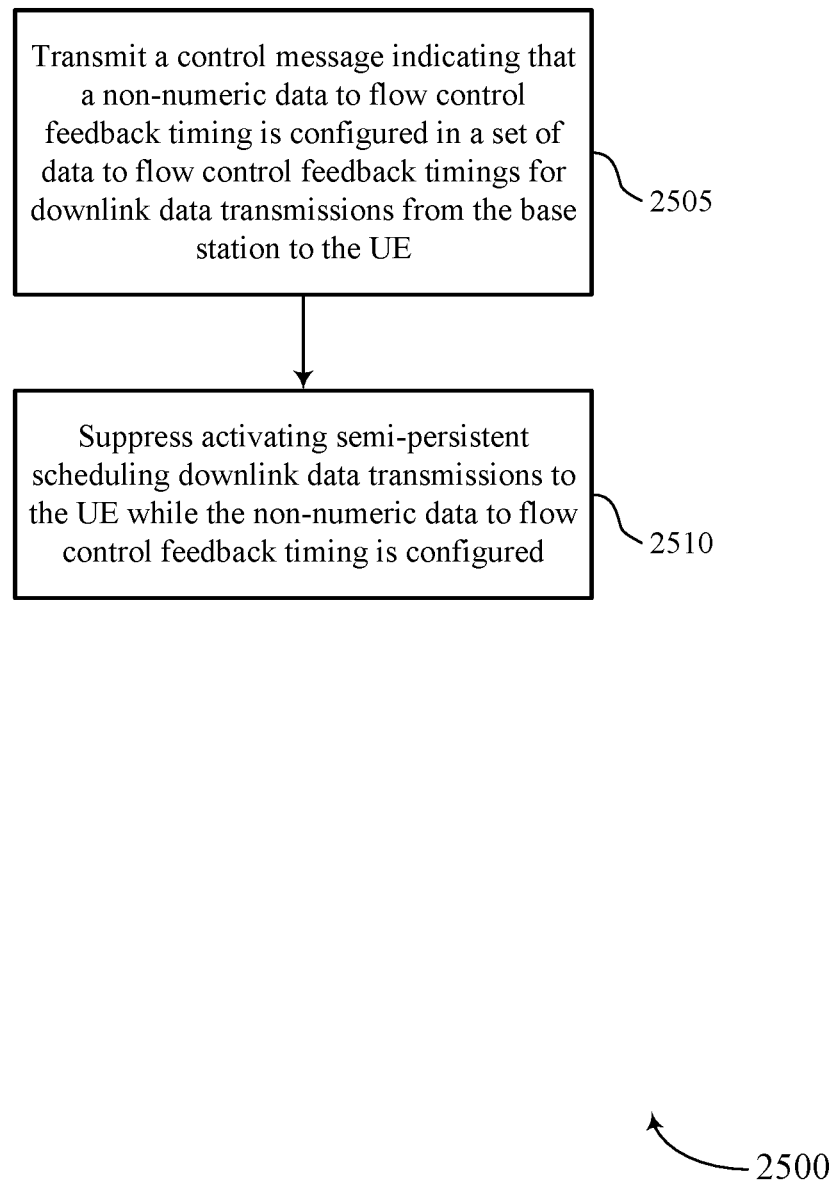

FIG. 25 shows a flowchart illustrating a method 2500 that supports handling of non-numeric data to flow control feedback timing in accordance with aspects of the present disclosure. The operations of method 2500 may be implemented by a base station 105 or its components as described herein. In accordance with some aspects, the operations of method 2500 may be performed by a communications manager as described with reference to FIGS. 16 through 19. In some aspects, a base station may execute a set of instructions to control the functional elements of the base station to perform the functions described below. Additionally, or alternatively, a base station may perform aspects of the functions described below using special-purpose hardware.

At 2505, the base station may transmit a control message indicating that a non-numeric data to flow control feedback timing is configured in a set of data to flow control feedback timings for downlink data transmissions from the base station to the UE. The operations of 2505 may be performed according to the methods described herein. In some non-limiting implementations, aspects of the operations of 2505 may be performed by a flow control feedback manager as described with reference to FIGS. 16 through 19.

At 2510, the base station may suppress activating SPS downlink data transmissions to the UE while the non-numeric data to flow control feedback timing is configured. The operations of 2510 may be performed according to the methods described herein. In some non-limiting implementations, aspects of the operations of 2510 may be performed by a SPS manager as described with reference to FIGS. 16 through 19.

Figure 26:
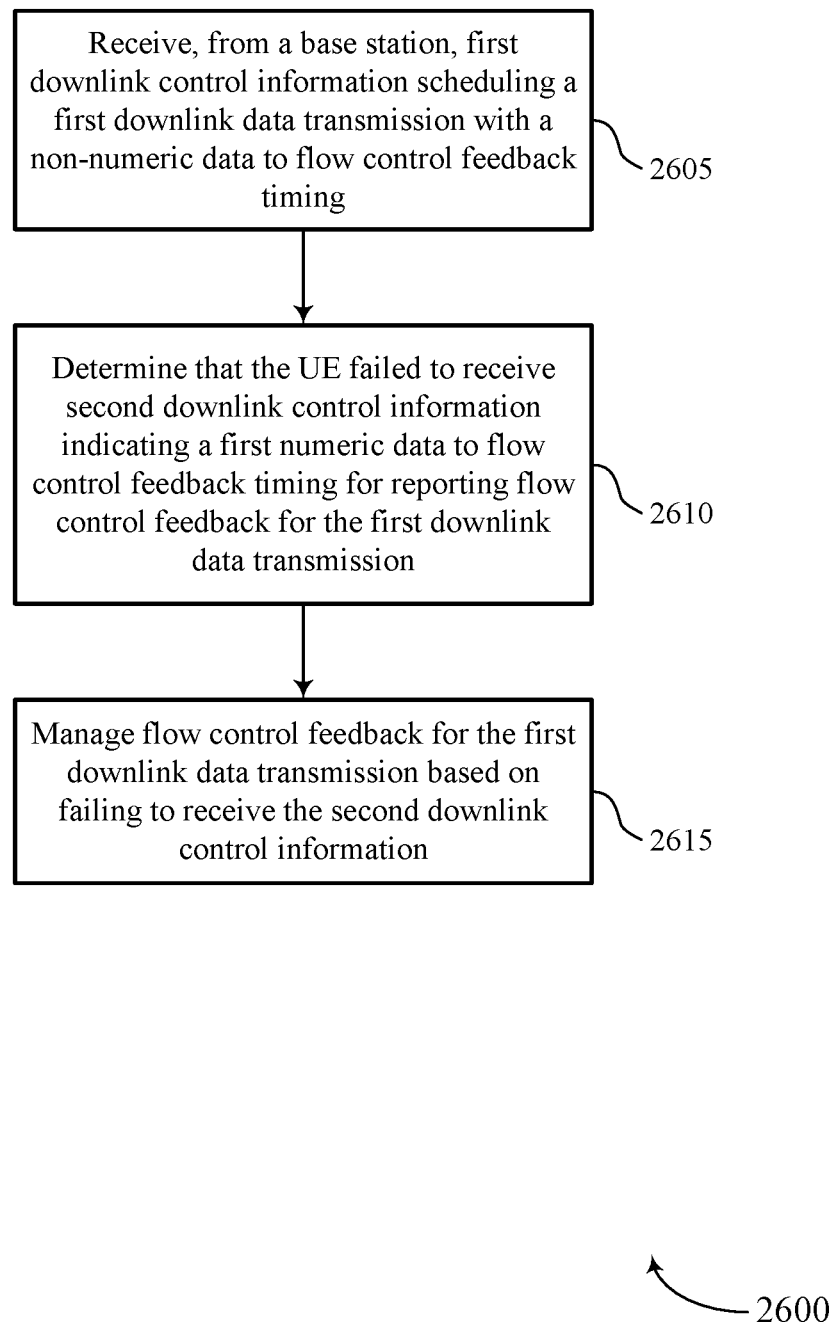

FIG. 26 shows a flowchart illustrating a method 2600 that supports handling of non-numeric data to flow control feedback timing in accordance with aspects of the present disclosure. The operations of method 2600 may be implemented by a UE 115 or its components as described herein. In accordance with some aspects, the operations of method 2600 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2605, the UE may receive, from a base station, first DCI scheduling a first downlink data transmission with a non-numeric data to flow control feedback timing. The operations of 2605 may be performed according to the methods described herein. In some non-limiting implementations, aspects of the operations of 2605 may be performed by a DCI manager as described with reference to FIGS. 12 through 15.

At 2610, the UE may determine that the UE failed to receive second DCI indicating a first numeric data to flow control feedback timing for reporting flow control feedback for the first downlink data transmission. The operations of 2610 may be performed according to the methods described herein. In some non-limiting implementations, aspects of the operations of 2610 may be performed by a DCI manager as described with reference to FIGS. 12 through 15.

At 2615, the UE may manage flow control feedback for the first downlink data transmission based on failing to receive the second DCI. The operations of 2615 may be performed according to the methods described herein. In some non-limiting implementations, aspects of the operations of 2615 may be performed by a flow control feedback manager as described with reference to FIGS. 12 through 15.

Figure 27:
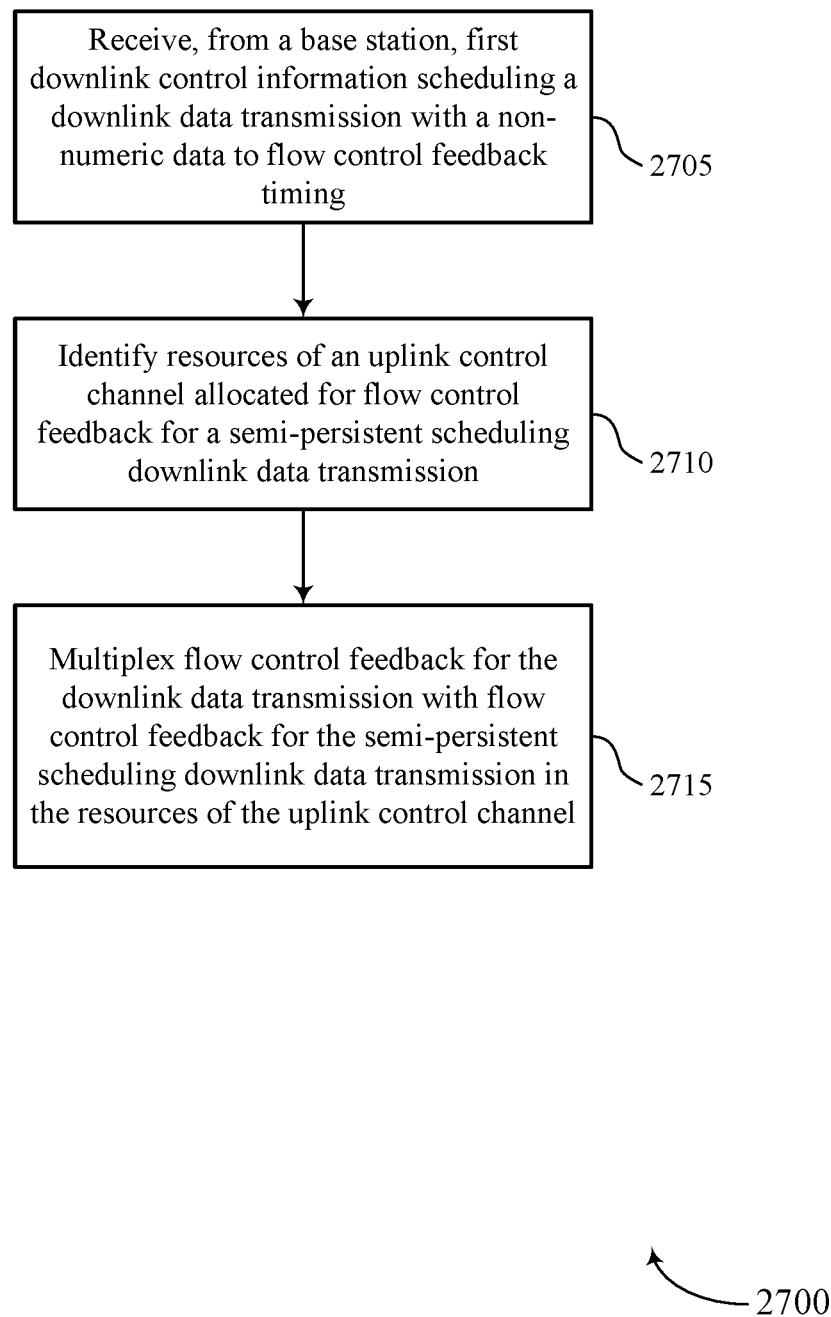

FIG. 27 shows a flowchart illustrating a method 2700 that supports handling of non-numeric data to flow control feedback timing in accordance with aspects of the present disclosure. The operations of method 2700 may be implemented by a UE 115 or its components as described herein. In accordance with some aspects, the operations of method 2700 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2705, the UE may receive, from a base station, first DCI scheduling a downlink data transmission with a non-numeric data to flow control feedback timing. The operations of 2705 may be performed according to the methods described herein. In some non-limiting implementations, aspects of the operations of 2705 may be performed by a DCI manager as described with reference to FIGS. 12 through 15.

At 2710, the UE may identify resources of an uplink control channel allocated for flow control feedback for a SPS downlink data transmission. The operations of 2710 may be performed according to the methods described herein. In some non-limiting implementations, aspects of the operations of 2710 may be performed by a PUCCH manager as described with reference to FIGS. 12 through 15.

At 2715, the UE may multiplex flow control feedback for the downlink data transmission with flow control feedback for the SPS downlink data transmission in the resources of the uplink control channel. The operations of 2715 may be performed according to the methods described herein. In some non-limiting implementations, aspects of the operations of 2715 may be performed by a flow control feedback manager as described with reference to FIGS. 12 through 15.

Figure 28:
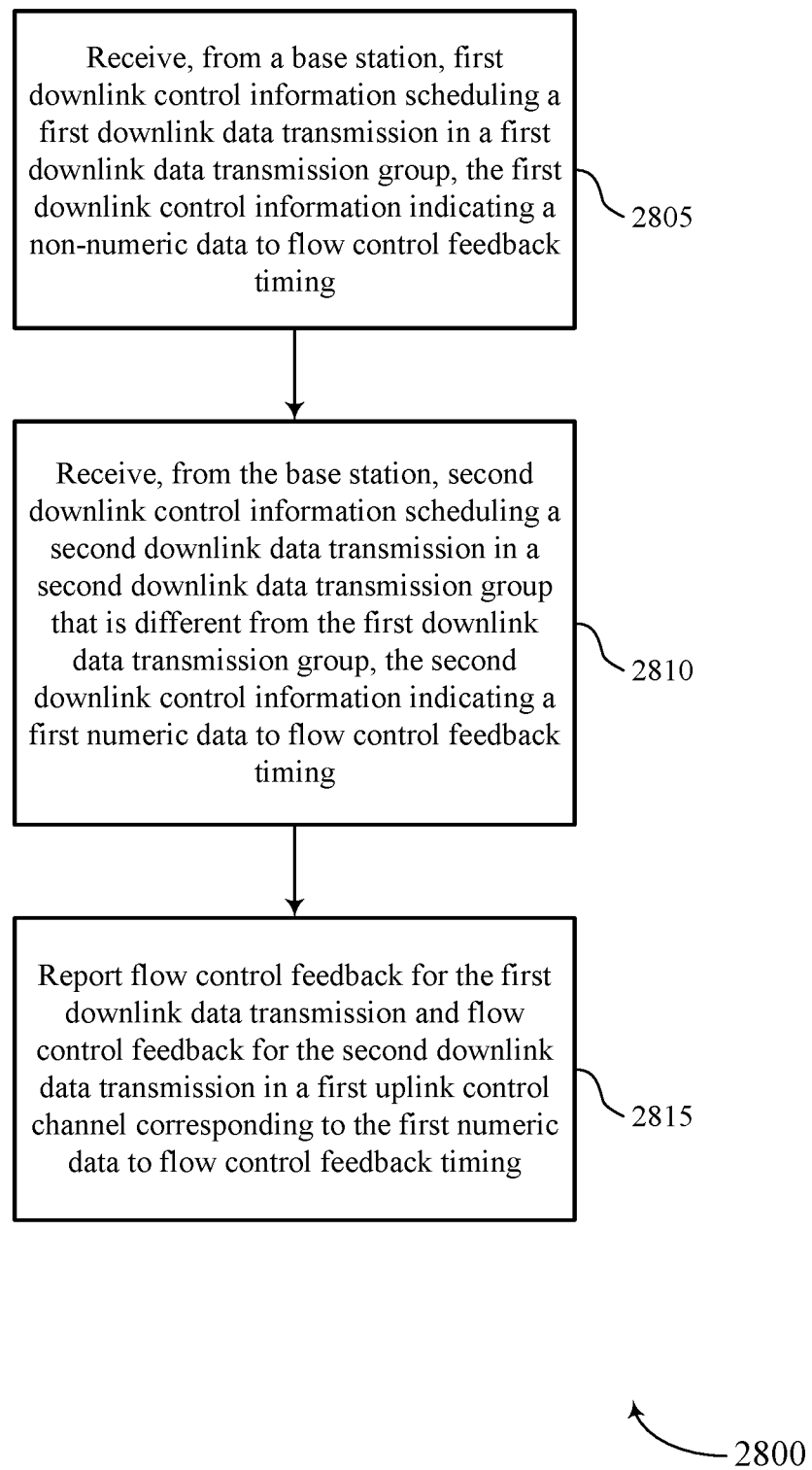

FIG. 28 shows a flowchart illustrating a method 2800 that supports handling of non-numeric data to flow control feedback timing in accordance with aspects of the present disclosure. The operations of method 2800 may be implemented by a UE 115 or its components as described herein. In accordance with some aspects, the operations of method 2800 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 2805, the UE may receive, from a base station, first DCI scheduling a first downlink data transmission in a first downlink data transmission group, the first DCI indicating a non-numeric data to flow control feedback timing. The operations of 2805 may be performed according to the methods described herein. In some non-limiting implementations, aspects of the operations of 2805 may be performed by a DCI manager as described with reference to FIGS. 12 through 15.

At 2810, the UE may receive, from the base station, second DCI scheduling a second downlink data transmission in a second downlink data transmission group that is different from the first downlink data transmission group, the second DCI indicating a first numeric data to flow control feedback timing. The operations of 2810 may be performed according to the methods described herein. In some non-limiting implementations, aspects of the operations of 2810 may be performed by a DCI manager as described with reference to FIGS. 12 through 15.

At 2815, the UE may report flow control feedback for the first downlink data transmission and flow control feedback for the second downlink data transmission in a first uplink control channel corresponding to the first numeric data to flow control feedback timing. The operations of 2815 may be performed according to the methods described herein. In some non-limiting implementations, aspects of the operations of 2815 may be performed by a flow control feedback manager as described with reference to FIGS. 12 through 15.

Figure 29:
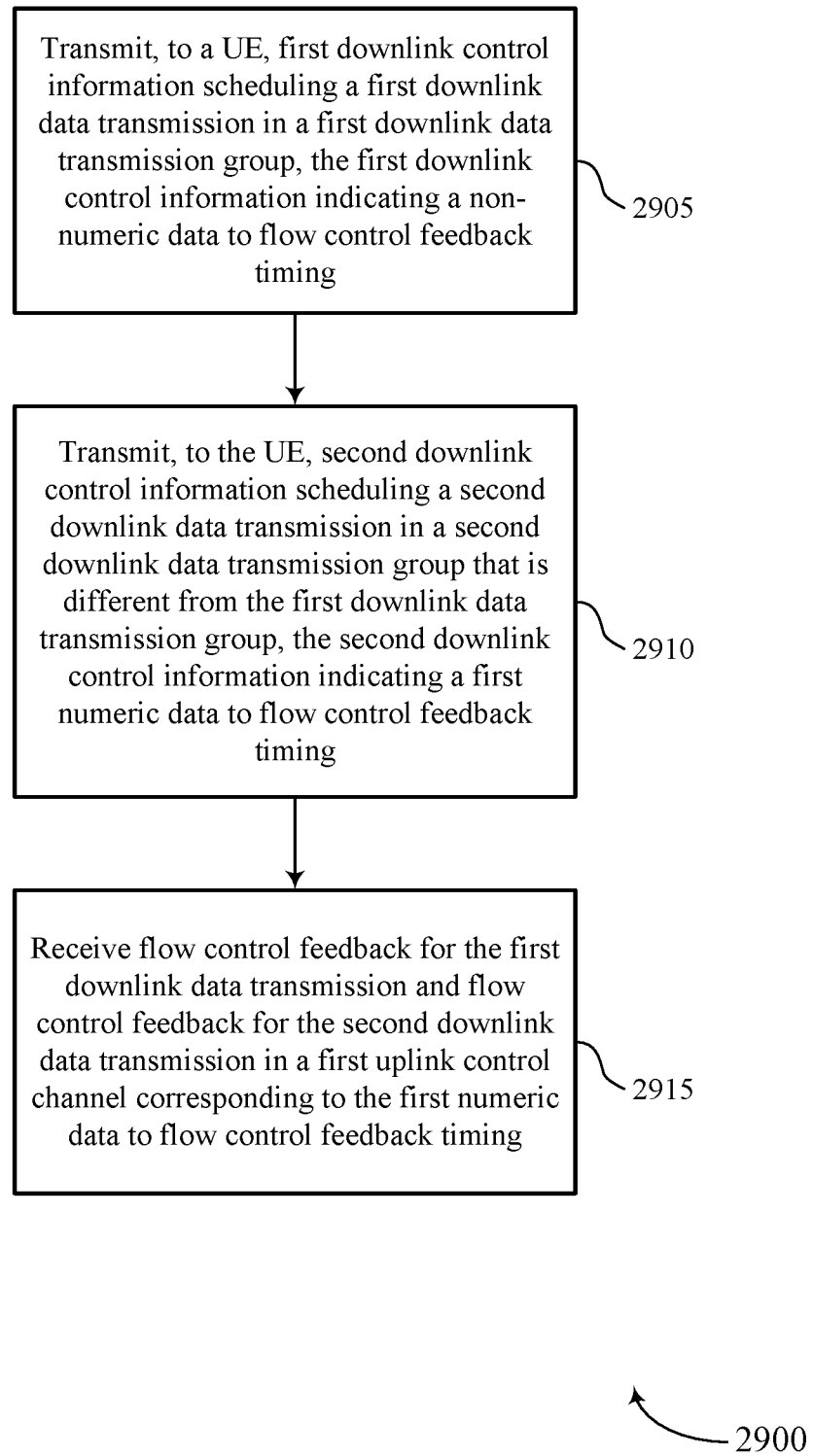

FIG. 29 shows a flowchart illustrating a method 2900 that supports handling of non-numeric data to flow control feedback timing in accordance with aspects of the present disclosure. The operations of method 2900 may be implemented by a base station 105 or its components as described herein. In accordance with some aspects, the operations of method 2900 may be performed by a communications manager as described with reference to FIGS. 16 through 19. In some aspects, a base station may execute a set of instructions to control the functional elements of the base station to perform the functions described below. Additionally, or alternatively, a base station may perform aspects of the functions described below using special-purpose hardware.

At 2905, the base station may transmit, to a UE, first DCI scheduling a first downlink data transmission in a first downlink data transmission group, the first DCI indicating a non-numeric data to flow control feedback timing. The operations of 2905 may be performed according to the methods described herein. In some non-limiting implementations, aspects of the operations of 2905 may be performed by a DCI manager as described with reference to FIGS. 16 through 19.

At 2910, the base station may transmit, to the UE, second DCI scheduling a second downlink data transmission in a second downlink data transmission group that is different from the first downlink data transmission group, the second DCI indicating a first numeric data to flow control feedback timing. The operations of 2910 may be performed according to the methods described herein. In some nonlimiting implementations, aspects of the operations of 2910 may be performed by a DCI manager as described with reference to FIGS. 16 through 19.

At 2915, the base station may receive flow control feedback for the first downlink data transmission and flow control feedback for the second downlink data transmission in a first uplink control channel corresponding to the first numeric data to flow control feedback timing. The operations of 2915 may be performed according to the methods described herein. In some non-limiting implementations, aspects of the operations of 2915 may be performed by a flow control feedback manager as described with reference to FIGS. 16 through 19.

Figure 30:
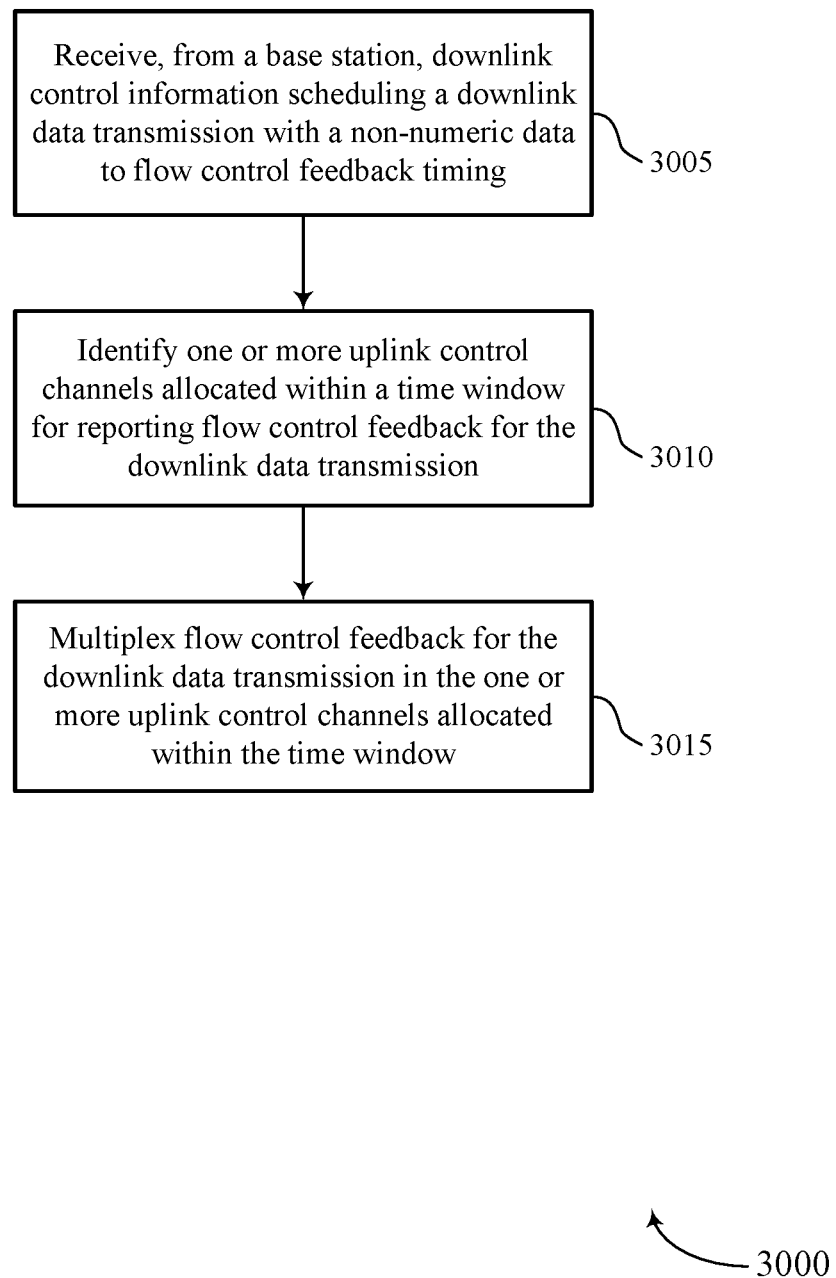

FIG. 30 shows a flowchart illustrating a method 3000 that supports handling of non-numeric data to flow control feedback timing in accordance with aspects of the present disclosure. The operations of method 3000 may be implemented by a UE 115 or its components as described herein.

In accordance with some aspects, the operations of method 3000 may be performed by a communications manager as described with reference to FIGS. 12 through 15. In some aspects, a UE may execute a set of instructions to control the functional elements of the UE to perform the functions described below. Additionally, or alternatively, a UE may perform aspects of the functions described below using special-purpose hardware.

At 3005, the UE may receive, from a base station, DCI scheduling a downlink data transmission with a non-numeric data to flow control feedback timing. The operations of 3005 may be performed according to the methods described herein. In some non-limiting implementations, aspects of the operations of 3005 may be performed by a DCI manager as described with reference to FIGS. 12 through 15.

At 3010, the UE may identify one or more uplink control channels allocated within a time window for reporting flow control feedback for the downlink data transmission. The operations of 3010 may be performed according to the methods described herein. In some non-limiting implementations, aspects of the operations of 3010 may be performed by a PUCCH manager as described with reference to FIGS. 12 through 15.

At 3015, the UE may multiplex flow control feedback for the downlink data transmission in the one or more uplink control channels allocated within the time window. The operations of 3015 may be performed according to the methods described herein. In some non-limiting implementations, aspects of the operations of 3015 may be performed by a flow control feedback manager as described with reference to FIGS. 12 through 15.

Figure 31:
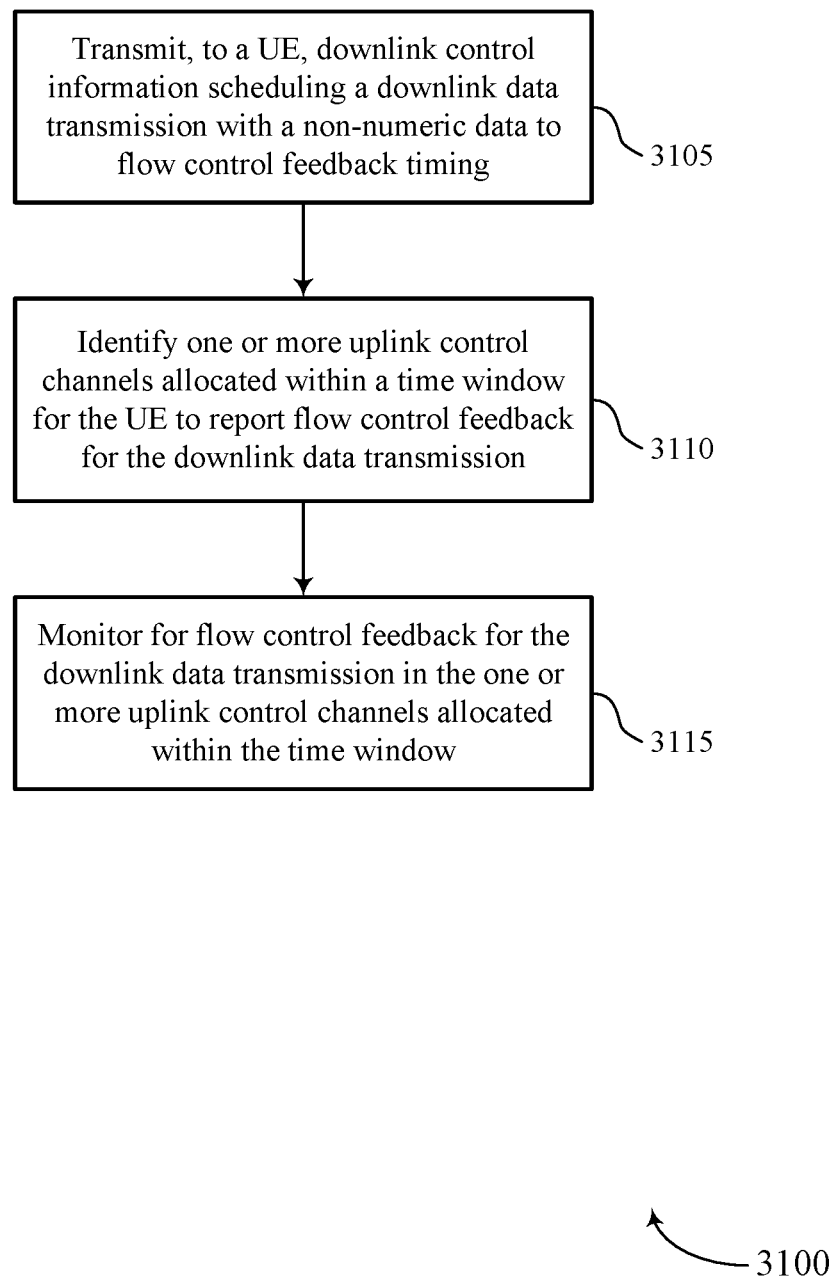

FIG. 31 shows a flowchart illustrating a method 3100 that supports handling of non-numeric data to flow control feedback timing in accordance with aspects of the present disclosure. The operations of method 3100 may be implemented by a base station 105 or its components as described herein. In accordance with some aspects, the operations of method 3100 may be performed by a communications manager as described with reference to FIGS. 16 through 19. In some aspects, a base station may execute a set of instructions to control the functional elements of the base station to perform the functions described below. Additionally, or alternatively, a base station may perform aspects of the functions described below using special-purpose hardware.

At 3105, the base station may transmit, to a UE, DCI scheduling a downlink data transmission with a non-numeric data to flow control feedback timing. The operations of 3105 may be performed according to the methods described herein. In some non-limiting implementations, aspects of the operations of 3105 may be performed by a DCI manager as described with reference to FIGS. 16 through 19.

At 3110, the base station may identify one or more uplink control channels allocated within a time window for the UE to report flow control feedback for the downlink data transmission. The operations of 3110 may be performed according to the methods described herein. In some non-limiting implementations, aspects of the operations of 3110 may be performed by a PUCCH manager as described with reference to FIGS. 16 through 19.

At 3115, the base station may monitor for flow control feedback for the downlink data transmission in the one or more uplink control channels allocated within the time window. The operations of 3115 may be performed according to the methods described herein. In some non-limiting implementations, aspects of the operations of 3115 may be performed by a flow control feedback manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication implemented by a UE, comprising: receiving, from a base station, first downlink control information scheduling a first downlink data transmission, the first downlink control information indicating a non-numeric data-to-flow control feedback timing; receiving, from the base station, second downlink control information scheduling a second downlink data transmission, the second downlink control information indicating a numeric data-to-flow control feedback timing; identifying resources of a first uplink channel allocated for flow control feedback for a semi-persistent scheduling downlink data transmission; and managing flow control feedback for the first downlink data transmission based at least in part on a second uplink channel corresponding to the numeric data-to-flow control feedback timing and the first uplink channel.

Aspect 2: The method of aspect 1, wherein the managing the flow control feedback for the first downlink data transmission comprises: multiplexing the flow control feedback for the first downlink data transmission with flow control feedback for the second downlink data transmission in resources of the second uplink channel based at least in part on the second uplink channel occurring at a same time as or before the first uplink channel.

Aspect 3: The method of aspect 2, wherein a time between the first downlink data transmission and the second uplink channel is greater than or equal to a duration of time configured for processing the first downlink data transmission.

Aspect 4: The method of any of aspects 1 through 3, wherein the managing the flow control feedback for the first downlink data transmission comprises: determining not to multiplex the flow control feedback for the first downlink data transmission with flow control feedback for the second downlink data transmission in resources of the second uplink channel based at least in part on the second uplink channel occurring after the first uplink channel.

Aspect 5: The method of any of aspects 1 through 4, wherein the managing the flow control feedback for the first downlink data transmission comprises: discarding the flow control feedback for the first downlink data transmission based at least in part on the second uplink channel occurring after the first uplink channel.

Aspect 6: The method of aspect 5, further comprising: reporting a negative acknowledgment for the first downlink data transmission in an uplink channel different from the second uplink channel based at least in part on the discarding the flow control feedback for the first downlink data transmission.

Aspect 7: The method of any of aspects 1 through 6, wherein the second downlink control information is received in a downlink control channel monitoring occasion after the first downlink control information.

Aspect 8: The method of any of aspects 1 through 7, further comprising: receiving the first downlink data transmission prior to the second downlink data transmission.

Aspect 9: The method of any of aspects 1 through 8, further comprising: receiving the first downlink data transmission prior to the semi-persistent scheduling downlink data transmission.

Aspect 10: The method of any of aspects 1 through 9, further comprising: receiving third downlink control information activating semi-persistent scheduling downlink data transmissions including the semi-persistent scheduling downlink data transmission from the base station.

Aspect 11: The method of any of aspects 1 through 10, further comprising: receiving a control message indicating that the non-numeric data-to-flow control feedback timing is configured in a set of data-to-flow control feedback timings for downlink data transmissions from the base station to the UE.

Aspect 12: The method of aspect 11, wherein the control message is an RRC message comprising the set of data-to-flow control feedback timings.

Aspect 13: The method of any of aspects 1 through 12, wherein the second downlink control information indicates a downlink assignment index associated with a downlink data transmission group that is a same downlink data transmission group as indicated by the first downlink control information; and the managing the flow control feedback for the first downlink data transmission comprises multiplexing the flow control feedback for the first downlink data transmission with flow control feedback for the second downlink data transmission in resources of the second uplink channel based at least in part on the downlink assignment index associated with the downlink data transmission group being the same downlink data transmission group as indicated by the first downlink control information.

Aspect 14: The method of any of aspects 1 through 13, wherein the managing the flow control feedback for the first downlink data transmission comprises: determining not to multiplex the flow control feedback for the first downlink data transmission in the second uplink channel based at least in part on the second uplink channel occurring within a duration of time configured for processing the first downlink data transmission.

Aspect 15: The method of any of aspects 1 through 14, wherein the managing the flow control feedback for the first downlink data transmission comprises: multiplexing the flow control feedback for the first downlink data transmission with flow control feedback for the semi-persistent scheduling downlink data transmission in the resources of the first uplink channel based at least in part on the second uplink channel occurring after the first uplink channel.

Aspect 16: The method of any of aspects 1 through 15, further comprising: receiving the first downlink data transmission and the second downlink data transmission in a first component carrier.

Aspect 17: The method of any of aspects 1 through 16, further comprising: receiving the first downlink data transmission in a first component carrier; and receiving the second downlink data transmission in a second component carrier different from the first component carrier.

Aspect 18: The method of any of aspects 1 through 17, further comprising: receiving a configuration for a flow control feedback codebook, and wherein the managing the flow control feedback for the first downlink data transmission is based at least in part on the configuration for the flow control feedback codebook.

Aspect 19: The method of aspect 18, wherein the flow control feedback codebook comprises an enhanced dynamic flow control feedback codebook.

Aspect 20: The method of any of aspects 1 through 19, wherein the first uplink channel comprises an uplink control channel, and the second uplink channel comprises an uplink control channel or an uplink shared channel.

Aspect 21: A method for wireless communication implemented by a base station, comprising: transmitting, to a UE, first downlink control information scheduling a first downlink data transmission, the first downlink control information indicating a non-numeric data-to-flow control feedback timing; transmitting, to the UE, second downlink control information scheduling a second downlink data transmission, the second downlink control information indicating a numeric data-to-flow control feedback timing; transmitting, to the UE, third downlink control information activating semi-persistent scheduling downlink data transmissions from the base station and indicating resources of a first uplink channel allocated for flow control feedback for a semi-persistent scheduling downlink data transmission of the semi-persistent scheduling downlink data transmissions; and receiving flow control feedback for the first downlink data transmission based at least in part on a second uplink channel corresponding to the numeric data-to-flow control feedback timing and the first uplink channel.

Aspect 22: The method of aspect 21, wherein the second downlink control information is transmitted in a downlink control channel monitoring occasion after the first downlink control information.

Aspect 23: The method of any of aspects 21 through 22, further comprising: transmitting, to the UE, a control message indicating that the non-numeric data-to-flow control feedback timing is configured in a set of data-to-flow control feedback timings for downlink data transmissions from the base station to the UE.

Aspect 24: The method of any of aspects 21 through 23, further comprising: transmitting, to the UE, a configuration for a flow control feedback codebook, and wherein the managing the flow control feedback for the first downlink data transmission is based at least in part on the configuration for the flow control feedback codebook.

Aspect 25: A method for wireless communication implemented by a UE, comprising: receiving, from a base station, a first downlink data transmission scheduled by first downlink control information indicating a non-numeric data to flow control feedback timing for the first downlink data transmission; receiving, from the base station, a second downlink data transmission, wherein respective timings of flow control feedback for the first downlink data transmission and the second downlink data transmission are out-of-order relative to respective timings of receiving the first downlink data transmission and the second downlink data transmission; and reporting flow control feedback to the base station for the first downlink data transmission based at least in part on the second downlink data transmission being a semi-persistent scheduling downlink data transmission.

Aspect 26: The method of aspect 25, wherein the first downlink data transmission is received prior to the second downlink data transmission.

Aspect 27: The method of any of aspects 25 through 26, wherein the second downlink data transmission is received prior to the first downlink data transmission.

Aspect 28: A method for wireless communication at a base station, comprising: transmitting, to a UE, a first downlink data transmission scheduled by first downlink control information indicating a non-numeric data to flow control feedback timing for the first downlink data transmission; transmitting, to the UE, a second downlink data transmission, wherein respective timings of flow control feedback for the first downlink data transmission and the second downlink data transmission are out-of-order relative to respective timings of transmitting the first downlink data transmission and the second downlink data transmission; and receiving flow control feedback from the UE for the first downlink data transmission based at least in part on the second downlink data transmission being a semi-persistent scheduling downlink data transmission.

Aspect 29: The method of aspect 28, wherein the first downlink data transmission is transmitted prior to the second downlink data transmission.

Aspect 30: The method of any of aspects 28 through 29, wherein the second downlink data transmission is transmitted prior to the first downlink data transmission.

Aspect 31: A method for wireless communication implemented by a UE, comprising: receiving first downlink control information activating semi-persistent scheduling downlink data transmissions from the base station; receiving second downlink control information indicating a non-numeric data to flow control feedback timing for a downlink data transmission; and suppressing receiving the downlink data transmission based at least in part on the semi-persistent scheduling downlink data transmissions being activated.

Aspect 32: The method of aspect 31, wherein suppressing receiving the downlink data transmission is based at least in part on the semi-persistent scheduling downlink data transmissions and the downlink data transmission being in a same component carrier.

Aspect 33: A method for wireless communication at a base station, comprising: transmitting downlink control information activating semi-persistent scheduling downlink data transmissions to a UE; and suppressing scheduling downlink data transmissions with non-numeric data to flow control feedback timings while the semi-persistent scheduling downlink data transmissions are activated.

Aspect 34: The method of aspect 33, wherein the suppressing scheduling downlink data transmissions comprises: suppressing scheduling the downlink data transmissions within a same component carrier as the activated semi-persistent scheduling downlink data transmissions.

Aspect 35: A method for wireless communication implemented by a UE, comprising: receiving a control message indicating that a non-numeric data to flow control feedback timing is configured in a set of data to flow control feedback timings for downlink data transmissions from a base station to the UE; receiving downlink control information activating semi-persistent scheduling downlink data transmissions to the UE; and suppressing receiving the semi-persistent scheduling downlink data transmissions from the base station while the non-numeric data to flow control feedback timing is configured.

Aspect 36: The method of aspect 35, wherein the control message is an RRC message comprising the set of data to flow control feedback timings.

Aspect 37: A method for wireless communication at a base station, comprising: transmitting a control message indicating that a non-numeric data to flow control feedback timing is configured in a set of data to flow control feedback timings for downlink data transmissions from the base station to the UE; and suppressing activating semi-persistent scheduling downlink data transmissions to the UE while the non-numeric data to flow control feedback timing is configured.

Aspect 38: The method of aspect 37, wherein the control message is an RRC message comprising the set of data to flow control feedback timings.

Aspect 39: A method for wireless communication implemented by a UE, comprising: receiving, from a base station, first downlink control information scheduling a first downlink data transmission with a non-numeric data to flow control feedback timing; determining that the UE failed to receive second downlink control information indicating a first numeric data to flow control feedback timing for reporting flow control feedback for the first downlink data transmission; and managing flow control feedback for the first downlink data transmission based at least in part on failing to receive the second downlink control information.

Aspect 40: The method of aspect 39, wherein determining that the UE failed to receive the second downlink control information comprises: determining that the UE failed to receive the second downlink control information before a first uplink control channel that follows a duration of time configured for processing the first downlink data transmission.

Aspect 41: The method of aspect 40, further comprising: multiplexing flow control feedback for the first downlink data transmission in the first uplink control channel.

Aspect 42: The method of any of aspects 40 through 41, further comprising: discarding flow control feedback for the first downlink data transmission scheduled with the non-numeric data to flow control feedback timing based at least in part on failing to receive the second downlink control information.

Aspect 43: The method of aspect 42, further comprising: receiving third downlink control information indicating a second numeric data to flow control feedback timing for reporting flow control feedback for a second downlink data transmission in a same downlink data transmission group as the first downlink data transmission; and reporting a negative acknowledgment for the first downlink data transmission in an uplink control channel corresponding to the second numeric data to flow control feedback timing based at least in part on discarding the flow control feedback for the first downlink data transmission.

Aspect 44: The method of aspect 43, wherein reporting the negative acknowledgment for the first downlink data transmission is based at least in part on an NFI for the same downlink data transmission group not being toggled in the third downlink control information.

Aspect 45: The method of any of aspects 40 through 44, further comprising: receiving third downlink control information indicating a second numeric data to flow control feedback timing for reporting flow control feedback for the first downlink data transmission; and suppressing reporting flow control feedback for the first downlink data transmission in an uplink control channel corresponding to the second numeric data to flow control feedback timing based at least in part on determining that the UE failed to receive the second downlink control information before the first uplink control channel that follows the duration of time configured for processing the first downlink data transmission.

Aspect 46: A method for wireless communication implemented by a UE, comprising: receiving, from a base station, first downlink control information scheduling a downlink data transmission with a non-numeric data to flow control feedback timing; identifying resources of an uplink control channel allocated for flow control feedback for a semi-persistent scheduling downlink data transmission; and multiplexing flow control feedback for the downlink data transmission with flow control feedback for the semi-persistent scheduling downlink data transmission in the resources of the uplink control channel.

Aspect 47: The method of aspect 46, further comprising: failing to receive second downlink control information indicating a numeric data to flow control feedback timing that triggers the flow control feedback for the downlink data transmission before the uplink control channel, wherein the multiplexing is based at least in part on failing to receive the second downlink control information.

Aspect 48: The method of any of aspects 46 through 47, further comprising: receiving the semi-persistent scheduling downlink data transmission after the first downlink control information scheduling the downlink data transmission, wherein the multiplexing is based at least in part on receiving the semi-persistent scheduling downlink data transmission after the first downlink control information.

Aspect 49: The method of any of aspects 46 through 48, further comprising: receiving the semi-persistent scheduling downlink data transmission after the downlink data transmission, wherein the multiplexing is based at least in part on receiving the semi-persistent scheduling downlink data transmission after the downlink data transmission.

Aspect 50: The method of any of aspects 46 through 49, wherein a time between the downlink data transmission and the uplink control channel is greater than or equal to a minimum time at the UE for processing the downlink data transmission.

Aspect 51: The method of any of aspects 46 through 50, wherein the downlink data transmission and the semi-persistent scheduling downlink data transmission are received in a same component carrier or different component carriers.

Aspect 52: A method for wireless communication implemented by a UE, comprising: receiving, from a base station, first downlink control information scheduling a first downlink data transmission in a first downlink data transmission group, the first downlink control information indicating a non-numeric data to flow control feedback timing; receiving, from the base station, second downlink control information scheduling a second downlink data transmission in a second downlink data transmission group that is different from the first downlink data transmission group, the second downlink control information indicating a first numeric data to flow control feedback timing; and reporting flow control feedback for the first downlink data transmission and flow control feedback for the second downlink data transmission in a first uplink control channel corresponding to the first numeric data to flow control feedback timing.

Aspect 53: The method of aspect 52, further comprising: determining that the first downlink data transmission is in the first downlink data transmission group and the second downlink data transmission group based at least in part on the first downlink control information indicating the non-numeric data to flow control feedback timing.

Aspect 54: The method of aspect 53, further comprising: receiving, from the base station, third downlink control information scheduling a third downlink data transmission in the first downlink data transmission group, the third downlink control information indicating a second numeric data to flow control feedback timing; and reporting a negative acknowledgment for the first downlink data transmission in a second uplink control channel corresponding to the second numeric data to flow control feedback timing based at least in part on reporting the flow control feedback for the first downlink data transmission in the first uplink control channel.

Aspect 55: The method of any of aspects 53 through 54, further comprising: receiving, from the base station in the first downlink control information, a first downlink assignment index associated with the first downlink data transmission group and a second downlink assignment index associated with the second downlink data transmission group; generating flow control feedback for one or more downlink data transmissions in the first downlink data transmission group including the first downlink data transmission based at least in part on the first downlink assignment index; and generating flow control feedback for one or more downlink data transmissions in the second downlink data transmission group including the first downlink data transmission and the second downlink data transmission based at least in part on the second downlink assignment index.

Aspect 56: The method of any of aspects 53 through 55, further comprising: receiving, from the base station in the first downlink control information, a maximum of a first downlink assignment index associated with the first downlink data transmission group and a second downlink assignment associated with the second downlink data transmission group; generating flow control feedback for one or more downlink data transmissions in the first downlink data transmission group including the first downlink data transmission based at least in part on the maximum of the first downlink assignment index and the second downlink assignment index; and generating flow control feedback for one or more downlink data transmissions in the second downlink data transmission group including the first downlink data transmission and the second downlink data transmission based at least in part on the maximum of the first downlink assignment index and the second downlink assignment index.

Aspect 57: The method of any of aspects 52 through 56, further comprising: receiving the first downlink data transmission and the second downlink data transmission in a same component carrier.

Aspect 58: A method for wireless communication at a base station, comprising: transmitting, to a UE, first downlink control information scheduling a first downlink data transmission in a first downlink data transmission group, the first downlink control information indicating a non-numeric data to flow control feedback timing; transmitting, to the UE, second downlink control information scheduling a second downlink data transmission in a second downlink data transmission group that is different from the first downlink data transmission group, the second downlink control information indicating a first numeric data to flow control feedback timing; and receiving flow control feedback for the first downlink data transmission and flow control feedback for the second downlink data transmission in a first uplink control channel corresponding to the first numeric data to flow control feedback timing.

Aspect 59: The method of aspect 58, further comprising: determining that the first downlink data transmission is in the first downlink data transmission group and the second downlink data transmission group based at least in part on the first downlink control information indicating the non-numeric data to flow control feedback timing.

Aspect 60: The method of aspect 59, further comprising: transmitting, to the UE, third downlink control information scheduling a third downlink data transmission in the first downlink data transmission group, the third downlink control information indicating a second numeric data to flow control feedback timing; and receiving a negative acknowledgment for the first downlink data transmission in a second uplink control channel corresponding to the second numeric data to flow control feedback timing based at least in part on receiving the flow control feedback for the first downlink data transmission in the first uplink control channel.

Aspect 61: The method of any of aspects 59 through 60, further comprising: incrementing a first downlink assignment index associated with the first downlink data transmission group and a second downlink assignment index associated with the second downlink data transmission group based at least in part on indicating the non-numeric data to flow control feedback timing in the first downlink control information.

Aspect 62: The method of aspect 61, further comprising: transmitting the first downlink assignment index and the second downlink assignment index to the UE in the first downlink control information.

Aspect 63: The method of any of aspects 61 through 62, further comprising: transmitting a maximum of the first downlink assignment index and the second downlink assignment index to the UE in the first downlink control information.

Aspect 64: The method of any of aspects 58 through 63, further comprising: transmitting the first downlink data transmission and the second downlink data transmission in a same component carrier.

Aspect 65: A method for wireless communication implemented by a UE, comprising: receiving, from a base station, downlink control information scheduling a downlink data transmission with a non-numeric data to flow control feedback timing; identifying one or more uplink control channels allocated within a time window for reporting flow control feedback for the downlink data transmission; and multiplexing flow control feedback for the downlink data transmission in the one or more uplink control channels allocated within the time window.

Aspect 66: The method of aspect 65, further comprising: receiving, from the base station, a control message indicating the time window for reporting flow control feedback.

Aspect 67: The method of any of aspects 65 through 66, wherein the time window for reporting flow control feedback is after a duration of time configured for processing the downlink data transmission.

Aspect 68: The method of any of aspects 65 through 67, wherein multiplexing the flow control feedback for the downlink data transmission in the one or more uplink control channels allocated within the time window comprises: multiplexing the flow control feedback for the downlink data transmission in a plurality of uplink control channels allocated within the time window.

Aspect 69: A method for wireless communication at a base station, comprising: transmitting, to a UE, downlink control information scheduling a downlink data transmission with a non-numeric data to flow control feedback timing; identifying one or more uplink control channels allocated within a time window for the UE to report flow control feedback for the downlink data transmission; and monitoring for flow control feedback for the downlink data transmission in the one or more uplink control channels allocated within the time window.

Aspect 70: The method of aspect 69, further comprising: transmitting, to the UE, a control message indicating the time window for reporting flow control feedback.

Aspect 71: The method of any of aspects 69 through 70, wherein the time window for reporting flow control feedback is after a duration of time configured for the UE to process the downlink data transmission.

Aspect 72: The method of any of aspects 69 through 71, wherein monitoring for the flow control feedback for the downlink data transmission in the one or more uplink control channels allocated within the time window comprises: monitoring for the flow control feedback for the downlink data transmission in a plurality of uplink control channels allocated within the time window.

Aspect 73: An apparatus for wireless communication implemented by a UE, comprising a processor; memory coupled with the processor; and instructions stored in the memory and executable by the processor to cause the apparatus to perform a method of any of aspects 1 through 20.

Aspect 74: An apparatus for wireless communication implemented by a UE, comprising at least one means for performing a method of any of aspects 1 through 20.

Aspect 75: A non-transitory computer-readable medium storing code for wireless communication implemented by a UE, the code comprising instructions executable by a processor to perform a method of any of aspects 1 through 20.

Aspect 76: An apparatus for wireless communication implemented by a base station, comprising a processor; memory coupled with the processor; and instructions stored in the memory and executable by the processor to cause the apparatus to perform a method of any of aspects 21 through 24.

Aspect 77: An apparatus for wireless communication implemented by a base station, comprising at least one means for performing a method of any of aspects 21 through 24.

Aspect 78: A non-transitory computer-readable medium storing code for wireless communication implemented by a base station, the code comprising instructions executable by a processor to perform a method of any of aspects 21 through 24.

Aspect 79: An apparatus for wireless communication implemented by a UE, comprising a processor; memory coupled with the processor; and instructions stored in the memory and executable by the processor to cause the apparatus to perform a method of any of aspects 25 through 27.

Aspect 80: An apparatus for wireless communication implemented by a UE, comprising at least one means for performing a method of any of aspects 25 through 27.

Aspect 81: A non-transitory computer-readable medium storing code for wireless communication implemented by a UE, the code comprising instructions executable by a processor to perform a method of any of aspects 25 through 27.

Aspect 82: An apparatus for wireless communication at a base station, comprising a processor; memory coupled with the processor; and instructions stored in the memory and executable by the processor to cause the apparatus to perform a method of any of aspects 28 through 30.

Aspect 83: An apparatus for wireless communication at a base station, comprising at least one means for performing a method of any of aspects 28 through 30.

Aspect 84: A non-transitory computer-readable medium storing code for wireless communication at a base station, the code comprising instructions executable by a processor to perform a method of any of aspects 28 through 30.

Aspect 85: An apparatus for wireless communication implemented by a UE, comprising a processor; memory coupled with the processor; and instructions stored in the memory and executable by the processor to cause the apparatus to perform a method of any of aspects 31 through 32.

Aspect 86: An apparatus for wireless communication implemented by a UE, comprising at least one means for performing a method of any of aspects 31 through 32.

Aspect 87: A non-transitory computer-readable medium storing code for wireless communication implemented by a UE, the code comprising instructions executable by a processor to perform a method of any of aspects 31 through 32.

Aspect 88: An apparatus for wireless communication at a base station, comprising a processor; memory coupled with the processor; and instructions stored in the memory and executable by the processor to cause the apparatus to perform a method of any of aspects 33 through 34.

Aspect 89: An apparatus for wireless communication at a base station, comprising at least one means for performing a method of any of aspects 33 through 34.

Aspect 90: A non-transitory computer-readable medium storing code for wireless communication at a base station, the code comprising instructions executable by a processor to perform a method of any of aspects 33 through 34.

Aspect 91: An apparatus for wireless communication implemented by a UE, comprising a processor; memory coupled with the processor; and instructions stored in the memory and executable by the processor to cause the apparatus to perform a method of any of aspects 35 through 36.

Aspect 92: An apparatus for wireless communication implemented by a UE, comprising at least one means for performing a method of any of aspects 35 through 36.

Aspect 93: A non-transitory computer-readable medium storing code for wireless communication implemented by a UE, the code comprising instructions executable by a processor to perform a method of any of aspects 35 through 36.

Aspect 94: An apparatus for wireless communication at a base station, comprising a processor; memory coupled with the processor; and instructions stored in the memory and executable by the processor to cause the apparatus to perform a method of any of aspects 37 through 38.

Aspect 95: An apparatus for wireless communication at a base station, comprising at least one means for performing a method of any of aspects 37 through 38.

Aspect 96: A non-transitory computer-readable medium storing code for wireless communication at a base station, the code comprising instructions executable by a processor to perform a method of any of aspects 37 through 38.

Aspect 97: An apparatus for wireless communication implemented by a UE, comprising a processor; memory coupled with the processor; and instructions stored in the memory and executable by the processor to cause the apparatus to perform a method of any of aspects 39 through 45.

Aspect 98: An apparatus for wireless communication implemented by a UE, comprising at least one means for performing a method of any of aspects 39 through 45.

Aspect 99: A non-transitory computer-readable medium storing code for wireless communication implemented by a UE, the code comprising instructions executable by a processor to perform a method of any of aspects 39 through 45.

Aspect 100: An apparatus for wireless communication implemented by a UE, comprising a processor; memory coupled with the processor; and instructions stored in the memory and executable by the processor to cause the apparatus to perform a method of any of aspects 46 through 51.

Aspect 101: An apparatus for wireless communication implemented by a UE, comprising at least one means for performing a method of any of aspects 46 through 51.

Aspect 102: A non-transitory computer-readable medium storing code for wireless communication implemented by a UE, the code comprising instructions executable by a processor to perform a method of any of aspects 46 through 51.

Aspect 103: An apparatus for wireless communication implemented by a UE, comprising a processor; memory coupled with the processor; and instructions stored in the memory and executable by the processor to cause the apparatus to perform a method of any of aspects 52 through 57.

Aspect 104: An apparatus for wireless communication implemented by a UE, comprising at least one means for performing a method of any of aspects 52 through 57.

Aspect 105: A non-transitory computer-readable medium storing code for wireless communication implemented by a UE, the code comprising instructions executable by a processor to perform a method of any of aspects 52 through 57.

Aspect 106: An apparatus for wireless communication at a base station, comprising a processor; memory coupled with the processor; and instructions stored in the memory and executable by the processor to cause the apparatus to perform a method of any of aspects 58 through 64.

Aspect 107: An apparatus for wireless communication at a base station, comprising at least one means for performing a method of any of aspects 58 through 64.

Aspect 108: A non-transitory computer-readable medium storing code for wireless communication at a base station, the code comprising instructions executable by a processor to perform a method of any of aspects 58 through 64.

Aspect 109: An apparatus for wireless communication implemented by a UE, comprising a processor; memory coupled with the processor; and instructions stored in the memory and executable by the processor to cause the apparatus to perform a method of any of aspects 65 through 68.

Aspect 110: An apparatus for wireless communication implemented by a UE, comprising at least one means for performing a method of any of aspects 65 through 68.

Aspect 111: A non-transitory computer-readable medium storing code for wireless communication implemented by a UE, the code comprising instructions executable by a processor to perform a method of any of aspects 65 through 68.

Aspect 112: An apparatus for wireless communication at a base station, comprising a processor; memory coupled with the processor; and instructions stored in the memory and executable by the processor to cause the apparatus to perform a method of any of aspects 69 through 72.

Aspect 113: An apparatus for wireless communication at a base station, comprising at least one means for performing a method of any of aspects 69 through 72.

Aspect 114: A non-transitory computer-readable medium storing code for wireless communication at a base station, the code comprising instructions executable by a processor to perform a method of any of aspects 69 through 72.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In accordance with some aspects, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. That is, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In accordance with some aspects, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In accordance with some aspects, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. That is, a non-limiting implementation of an operation or step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes non-limiting implementations and configurations and does not represent all the aspects that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described aspects and non-limiting implementations.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein, but is to be accorded the broadest scope consistent with the principles and novel features disclosed herein.

What is claimed is:

1. A method for wireless communication implemented by a user equipment (UE), comprising:
   receiving, from a network device, first downlink control information scheduling a first downlink data transmission, the first downlink control information indicating an inapplicable value for data-to-flow control feedback timing;
   receiving, from the network device, second downlink control information scheduling a second downlink data transmission, the second downlink control information indicating a numeric value for data-to-flow control feedback timing;
   identifying resources of a first uplink channel allocated for flow control feedback for a semi-persistent scheduling downlink data transmission; and
   managing flow control feedback for the first downlink data transmission based at least in part on a relative timing of a second uplink channel associated with the numeric value and the first uplink channel.

2. The method of claim 1, wherein the managing the flow control feedback for the first downlink data transmission comprises:
   multiplexing the flow control feedback for the first downlink data transmission with flow control feedback for the second downlink data transmission in resources of the second uplink channel based at least in part on the second uplink channel occurring at a same time as or before the first uplink channel.

3. The method of claim 2, wherein a time between the first downlink data transmission and the second uplink channel is greater than or equal to a duration of time configured for processing the first downlink data transmission.

4. The method of claim 1, wherein the managing the flow control feedback for the first downlink data transmission comprises:
determining not to multiplex the flow control feedback for the first downlink data transmission with flow control feedback for the second downlink data transmission in resources of the second uplink channel based at least in part on the second uplink channel occurring after the first uplink channel.

5. The method of claim 1, wherein the managing the flow control feedback for the first downlink data transmission comprises:
discarding the flow control feedback for the first downlink data transmission based at least in part on the second uplink channel occurring after the first uplink channel.

6. The method of claim 5, further comprising:
reporting a negative acknowledgment for the first downlink data transmission in an uplink channel different from the second uplink channel based at least in part on the discarding the flow control feedback for the first downlink data transmission.

7. The method of claim 1, wherein the second downlink control information is received in a downlink control channel monitoring occasion after the first downlink control information.

8. The method of claim 1, further comprising:
receiving the first downlink data transmission prior to the second downlink data transmission.

9. The method of claim 1, further comprising:
receiving the first downlink data transmission prior to the semi-persistent scheduling downlink data transmission.

10. The method of claim 1, further comprising:
receiving third downlink control information activating semi-persistent scheduling downlink data transmissions including the semi-persistent scheduling downlink data transmission from the network device.

11. The method of claim 1, further comprising:
receiving a control message indicating that the inapplicable value for data-to-flow control feedback timing is configured in a set of data-to-flow control feedback timings for downlink data transmissions from the network device to the UE.

12. The method of claim 11, wherein the control message is a radio resource control (RRC) message comprising the set of data-to-flow control feedback timings.

13. The method of claim 1, wherein:
the second downlink control information indicates a same downlink data transmission group as indicated by the first downlink control information; and
the managing the flow control feedback for the first downlink data transmission comprises multiplexing the flow control feedback for the first downlink data transmission with flow control feedback for the second downlink data transmission in resources of the second uplink channel based at least in part on the second downlink control information indicating the same downlink data transmission group as the first downlink control information.

14. The method of claim 1, wherein the managing the flow control feedback for the first downlink data transmission comprises:
determining not to multiplex the flow control feedback for the first downlink data transmission in the second uplink channel based at least in part on the second uplink channel occurring within a duration of time configured for processing the first downlink data transmission.

15. The method of claim 1, wherein the managing the flow control feedback for the first downlink data transmission comprises:
multiplexing the flow control feedback for the first downlink data transmission with flow control feedback for the semi-persistent scheduling downlink data transmission in the resources of the first uplink channel based at least in part on the second uplink channel occurring after the first uplink channel.

16. The method of claim 1, further comprising:
receiving the first downlink data transmission and the second downlink data transmission in a first component carrier.

17. The method of claim 1, further comprising:
receiving the first downlink data transmission in a first component carrier; and
receiving the second downlink data transmission in a second component carrier different from the first component carrier.

18. The method of claim 1, further comprising:
receiving a configuration for a flow control feedback codebook, and wherein the managing the flow control feedback for the first downlink data transmission is based at least in part on the configuration for the flow control feedback codebook.

19. The method of claim 18, wherein the flow control feedback codebook comprises an enhanced dynamic flow control feedback codebook.

20. The method of claim 1, wherein the first uplink channel comprises a first uplink control channel, and the second uplink channel comprises a second uplink control channel or an uplink shared channel.

21. A method for wireless communication implemented by a network device, comprising:
transmitting, to a user equipment (UE), first downlink control information scheduling a first downlink data transmission, the first downlink control information indicating an inapplicable value for data-to-flow control feedback timing;
transmitting, to the UE, second downlink control information scheduling a second downlink data transmission, the second downlink control information indicating a numeric value for data-to-flow control feedback timing;
transmitting, to the UE, third downlink control information activating semi-persistent scheduling downlink data transmissions from the network device and indicating resources of a first uplink channel allocated for flow control feedback for a semi-persistent scheduling downlink data transmission of the semi-persistent scheduling downlink data transmissions; and
receiving flow control feedback for the first downlink data transmission based at least in part on a relative timing of a second uplink channel associated with the numeric value and the first uplink channel.

22. The method of claim 21, wherein the second downlink control information is transmitted in a downlink control channel monitoring occasion after the first downlink control information.

23. The method of claim 21, further comprising:
transmitting, to the UE, a control message indicating that the inapplicable value for data-to-flow control feedback timing is configured in a set of data-to-flow control feedback timings for downlink data transmissions from the network device to the UE.

24. The method of claim 21, further comprising:
transmitting, to the UE, a configuration for a flow control feedback codebook, and wherein the receiving the flow control feedback for the first downlink data transmission is based at least in part on the configuration for the flow control feedback codebook.

25. An apparatus for wireless communication implemented by a user equipment (UE), comprising:
a processor,
memory coupled with the processor; and
instructions stored in the memory and executable by the processor to cause the apparatus to:
receive, from a network device, first downlink control information scheduling a first downlink data transmission, the first downlink control information indicating an inapplicable value for data-to-flow control feedback timing;
receive, from the network device, second downlink control information scheduling a second downlink data transmission, the second downlink control information indicating a numeric value for data-to-flow control feedback timing;
identify resources of a first uplink channel allocated for flow control feedback for a semi-persistent scheduling downlink data transmission; and
manage a flow control feedback for the first downlink data transmission based at least in part on a relative timing of a second uplink channel associated with the numeric value and the first uplink channel.

26. The apparatus of claim 25, wherein the instructions to manage the flow control feedback for the first downlink data transmission are further executable by the processor to cause the apparatus to:
multiplex the flow control feedback for the first downlink data transmission with flow control feedback for the second downlink data transmission in resources of the second uplink channel based at least in part on the second uplink channel occurring at a same time as or before the first uplink channel.

27. The apparatus of claim 25, wherein the instructions to manage the flow control feedback for the first downlink data transmission are further executable by the processor to cause the apparatus to:
determine not to multiplex the flow control feedback for the first downlink data transmission with flow control feedback for the second downlink data transmission in resources of the second uplink channel based at least in part on the second uplink channel occurring after the first uplink channel.

28. The apparatus of claim 25, wherein the instructions to manage the flow control feedback for the first downlink data transmission are further executable by the processor to cause the apparatus to:
discard the flow control feedback for the first downlink data transmission based at least in part on the second uplink channel occurring after the first uplink channel.

29. An apparatus for wireless communication implemented by a network device, comprising:
a processor,
memory coupled with the processor; and
instructions stored in the memory and executable by the processor to cause the apparatus to:
transmit, to a user equipment (UE), first downlink control information scheduling a first downlink data transmission, the first downlink control information indicating an inapplicable value for data-to-flow control feedback timing;
transmit, to the UE, second downlink control information scheduling a second downlink data transmission, the second downlink control information indicating a numeric value for data-to-flow control feedback timing;
transmit, to the UE, third downlink control information activating semi-persistent scheduling downlink data transmissions from the network device and indicating resources of a first uplink channel allocated for flow control feedback for a semi-persistent scheduling downlink data transmission of the semi-persistent scheduling downlink data transmissions; and
receive flow control feedback for the first downlink data transmission based at least in part on a relative timing of a second uplink channel associated with the numeric value and the first uplink channel.

30. The apparatus of claim 29, wherein the instructions to transmit the second downlink control information scheduling the second downlink data transmission are further executable by the processor to cause the apparatus to:
transmit the second downlink control information in a downlink control channel monitoring occasion after a transmission the first downlink control information.

* * * * *